(12) United States Patent
Nook et al.

(10) Patent No.: US 12,157,381 B2
(45) Date of Patent: *Dec. 3, 2024

(54) JUMP STARTING APPARATUS

(71) Applicant: The Noco Company, Glenwillow, OH (US)

(72) Inventors: Jonathan Lewis Nook, Gates Mills, OH (US); William Knight Nook, Sr., Shaker Heights, OH (US); James Richard Stanfield, Glendale, AZ (US); Derek Michael Underhill, Tempe, AZ (US)

(73) Assignee: The NOCO Company, Glenwillow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,034

(22) Filed: Jul. 27, 2023

(65) Prior Publication Data

US 2023/0365011 A1   Nov. 16, 2023

Related U.S. Application Data

(60) Continuation of application No. 17/066,100, filed on Oct. 8, 2020, now Pat. No. 11,766,945, which is a
(Continued)

(51) Int. Cl.
*B60L 53/18* (2019.01)
*H02J 1/06* (2006.01)
(Continued)

(52) U.S. Cl.
CPC ............... *B60L 53/18* (2019.02); *H02J 1/06* (2013.01); *H02J 1/122* (2020.01); *H02J 7/0029* (2013.01);
(Continued)

(58) Field of Classification Search
CPC ... B60L 53/18; H02J 1/06; H02J 1/122; H02J 7/0029; H02J 7/00302; H02J 7/00306;
(Continued)

(56) References Cited

U.S. PATENT DOCUMENTS 2,838,739 A   6/1958   Winkler
3,085,187 A   4/1963   Godshalk
(Continued)

FOREIGN PATENT DOCUMENTS

AU         6997198 A       7/1998
AU         2011334615      12/2015
(Continued)

OTHER PUBLICATIONS

Report on the Filing or Determination of an Action Regarding a Patent or Trademark, filed Aug. 14, 2019, *The Noco Company, Inc. v. Shenzhen Lianfa Tong Technology Co., Ltd. and Shenzhen Meditek Tong Technology Co., Ltd.*, 1 page.
(Continued)

*Primary Examiner* — M Baye Diao
(74) *Attorney, Agent, or Firm* — Jones Day

(57) ABSTRACT

A jump starting apparatus for boosting or charging a depleted or discharged battery having a positive polarity battery terminal and a negative polarity battery terminal includes a rechargeable battery, an output port, a battery cable assembly, and a safety control system or circuit. The battery cable assembly includes a positive battery cable having a positive polarity battery terminal connector for connecting the jump starting apparatus to the positive polarity battery terminal of the depleted or discharged battery, a negative battery cable having a negative polarity battery terminal connector for connecting the jump starting apparatus to the negative polarity battery terminal of the depleted or discharged battery, and a plug connector coupled to the
(Continued)

positive battery cable and the negative battery cable, the plug connector configured to plug into the output port, wherein the output port and the plug connector are dimensioned so that the plug connector will fit into the output port only in one specific orientation. The safety control system is configured for detecting when the jump starting apparatus is properly connected to the depleted or discharged battery and then switching on power from the rechargeable battery to the depleted or discharged battery only when the jump starting apparatus is properly connected to the depleted or discharged battery.

41 Claims, 41 Drawing Sheets

Related U.S. Application Data continuation of application No. 16/101,020, filed on Aug. 10, 2018, now Pat. No. 11,458,851, which is a continuation-in-part of application No. 15/691,884, filed on Aug. 31, 2017, now Pat. No. 10,604,024, which is a continuation of application No. 14/619,655, filed on Feb. 11, 2015, now Pat. No. 9,770,992, which is a division of application No. 14/325,938, filed on Jul. 8, 2014, now Pat. No. 9,007,015, which is a continuation of application No. PCT/US2014/045434, filed on Jul. 3, 2014, said application No. 16/101,020 is a continuation-in-part of application No. 15/989,005, filed on May 24, 2018, now Pat. No. 11,788,500, which is a continuation of application No. PCT/US2017/017289, filed on Feb. 10, 2017, which is a continuation-in-part of application No. PCT/US2016/024680, filed on Mar. 29, 2016, and a continuation-in-part of application No. 15/137,626, filed on Apr. 25, 2016, now Pat. No. 11,601,004.

(60) Provisional application No. 62/424,297, filed on Nov. 18, 2016, provisional application No. 62/294,067, filed on Feb. 11, 2016.

(51) Int. Cl.
  *H02J 1/10* (2006.01)
  *H02J 7/00* (2006.01)
  *H02J 7/34* (2006.01)

(52) U.S. Cl.
  CPC ...... *H02J 7/00302* (2020.01); *H02J 7/00306* (2020.01); *H02J 7/00309* (2020.01); *H02J 7/0034* (2013.01); *H02J 7/0047* (2013.01); *H02J 7/0063* (2013.01); *H02J 7/00712* (2020.01); *H02J 7/342* (2020.01); *H02J 7/00* (2013.01); *H02J 7/0048* (2020.01); *H02J 7/007182* (2020.01); *H02J 2310/46* (2020.01)

(58) Field of Classification Search
  CPC .... H02J 7/00309; H02J 7/0034; H02J 7/0047; H02J 7/0063; H02J 7/00712; H02J 7/342; H02J 7/00; H02J 7/0048; H02J 7/007182; H02J 2310/46; Y02T 10/70; Y02T 10/7072; Y02T 90/14
  USPC ........................................................ 320/105
  See application file for complete search history.

(56) References Cited

U.S. PATENT DOCUMENTS

| | | |
|---|---|---|
| 3,091,746 A | 5/1963 | Winkler |
| 3,105,183 A | 9/1963 | Hysler et al. |
| 3,267,452 A | 8/1966 | Wolf |
| 3,590,357 A | 6/1971 | Reid |
| 3,638,108 A | 1/1972 | Channing |
| 3,933,140 A | 1/1976 | Gynn |
| 4,041,445 A | 8/1977 | Carter |
| 4,142,771 A | 3/1979 | Barnes |
| 4,396,881 A | 8/1983 | Cook et al. |
| 4,647,834 A | 3/1987 | Castleman |
| 4,654,575 A | 3/1987 | Castleman |
| 4,690,878 A * | 9/1987 | Nakamura .......... H01M 50/213 429/97 |
| 4,740,740 A | 4/1988 | Taranto et al. |
| 4,829,223 A | 5/1989 | Broberg et al. |
| 4,885,524 A * | 12/1989 | Wilburn ................ H01M 50/55 320/DIG. 15 |
| 4,910,628 A | 3/1990 | Minagawa et al. |
| 4,931,731 A | 6/1990 | Jenks |
| 4,972,135 A | 11/1990 | Bates et al. |
| 4,990,723 A | 2/1991 | Ziberna et al. |
| 5,083,076 A | 1/1992 | Scott |
| 5,111,130 A | 5/1992 | Bates |
| 5,189,359 A | 2/1993 | Kronberg |
| 5,194,799 A | 3/1993 | Tomantshger |
| 5,281,904 A | 1/1994 | Tomkins |
| 5,319,298 A | 6/1994 | Wanzong |
| 5,367,243 A | 11/1994 | Wells et al. |
| 5,486,434 A | 1/1996 | Aoyama |
| 5,496,658 A | 3/1996 | Hein et al. |
| 5,547,775 A | 8/1996 | Eguchi et al. |
| 5,589,292 A | 12/1996 | Rozon |
| 5,589,757 A | 12/1996 | Klang |
| 5,635,817 A | 6/1997 | Shiska |
| 5,635,818 A | 6/1997 | Quintero |
| 5,637,978 A | 6/1997 | Kellett |
| 5,650,974 A | 7/1997 | Yoshimura |
| 5,707,257 A | 1/1998 | Kotajima et al. |
| 5,716,735 A | 2/1998 | Muffoletto et al. |
| 5,793,185 A | 8/1998 | Prelec et al. |
| 5,795,182 A | 8/1998 | Jacob |
| 5,820,407 A | 10/1998 | Morse et al. |
| 5,831,350 A | 11/1998 | McConkey et al. |
| 5,867,007 A * | 2/1999 | Kim ..................... H02J 7/0024 320/118 |
| 5,897,973 A | 4/1999 | Stephenson et al. |
| 5,921,809 A | 7/1999 | Fink |
| 5,953,681 A | 9/1999 | Cantatore et al. |
| 5,965,998 A | 10/1999 | Whiting et al. |
| 6,002,235 A | 12/1999 | Clore |
| 6,037,778 A | 3/2000 | Makhija |
| 6,054,779 A | 4/2000 | Zubko |
| 6,057,667 A | 5/2000 | Mills |
| 6,130,519 A | 10/2000 | Whiting et al. |
| 6,140,796 A | 10/2000 | Martin et al. |
| 6,144,110 A | 11/2000 | Matsuda et al. |
| 6,147,471 A | 11/2000 | Hunter |
| 6,150,795 A | 11/2000 | Kutkut et al. |
| 6,160,381 A | 12/2000 | Peterzell |
| 6,178,514 B1 | 1/2001 | Wood |
| 6,201,370 B1 | 3/2001 | Reller et al. |
| 6,212,054 B1 | 4/2001 | Chan |
| 6,215,273 B1 | 4/2001 | Shy |
| 6,222,342 B1 | 4/2001 | Eggert et al. |
| 6,249,106 B1 | 6/2001 | Turner et al. |
| 6,262,492 B1 | 7/2001 | Sheng |
| 6,262,559 B1 | 7/2001 | Eggert et al. |
| 6,271,605 B1 | 8/2001 | Carkner et al. |
| 6,292,492 B1 | 9/2001 | Bonomi et al. |
| 6,300,742 B1 | 10/2001 | Hung |
| 6,362,599 B1 | 3/2002 | Turner et al. |
| 6,384,573 B1 | 5/2002 | Dunn |
| 6,386,907 B1 | 5/2002 | Ruffa |
| 6,344,733 B1 | 7/2002 | Crass |
| 6,424,158 B2 | 7/2002 | Klang |
| 6,426,606 B1 | 7/2002 | Purkey |
| 6,632,103 B1 | 10/2003 | Liu |
| 6,648,701 B2 | 11/2003 | Mouissie |
| 6,650,086 B1 | 11/2003 | Chang |
| 6,679,212 B2 | 1/2004 | Kelling |
| 6,679,708 B1 | 1/2004 | Depp et al. |

(56) References Cited

U.S. PATENT DOCUMENTS

| | | | |
|---|---|---|---|
| 6,756,764 B2 | 6/2004 | Smith et al. | |
| 6,759,833 B1 | 7/2004 | Chen | |
| 6,774,607 B2 | 8/2004 | Mosenender et al. | |
| 6,799,993 B2 | 10/2004 | Krieger | |
| 6,803,743 B2 | 10/2004 | George et al. | |
| 6,822,425 B2 | 11/2004 | Krieger et al. | |
| 6,856,764 B2 | 2/2005 | Higuma | |
| 6,919,704 B1 | 7/2005 | Healey | |
| 6,970,072 B1 | 11/2005 | Cregg et al. | |
| 7,015,674 B2 | 3/2006 | Vonderhaar | |
| 7,017,055 B1 | 3/2006 | Ho | |
| 7,095,339 B2 | 8/2006 | Peng et al. | |
| 7,116,078 B2 * | 10/2006 | Colombo | H02J 7/0032 320/104 |
| 7,126,310 B1 | 10/2006 | Barron | |
| 7,148,580 B2 | 12/2006 | Sodemann et al. | |
| 7,301,303 B1 | 11/2007 | Hulden | |
| 7,339,347 B2 | 3/2008 | Elder et al. | |
| 7,345,450 B2 | 3/2008 | Krieger et al. | |
| 7,508,165 B2 | 3/2009 | Sobue et al. | |
| 7,508,171 B2 | 3/2009 | Carrier et al. | |
| 7,514,900 B2 | 4/2009 | Sander et al. | |
| D597,029 S | 7/2009 | Li | |
| 7,579,811 B2 | 8/2009 | Satl et al. | |
| 7,609,031 B2 | 10/2009 | Benckenstein et al. | |
| 7,656,118 B2 | 2/2010 | Krieger et al. | |
| 7,675,261 B2 | 3/2010 | Elder et al. | |
| 7,679,317 B2 | 3/2010 | Veselic | |
| 7,749,031 B2 | 7/2010 | Detter | |
| 7,791,319 B2 | 9/2010 | Veselic et al. | |
| D625,265 S | 10/2010 | Dumelle et al. | |
| 7,847,520 B2 | 12/2010 | Veselic et al. | |
| 7,868,582 B2 | 1/2011 | Sander et al. | |
| 7,872,361 B2 | 1/2011 | McFadden | |
| 7,893,558 B2 | 2/2011 | Lee | |
| 7,893,655 B2 | 2/2011 | Veselic | |
| 7,893,657 B2 | 2/2011 | Chavakula | |
| 8,030,900 B2 | 10/2011 | Hussain et al. | |
| D649,116 S | 11/2011 | Nakatsuka | |
| 8,076,900 B1 * | 12/2011 | Brown | H02J 7/0042 320/105 |
| 8,125,181 B2 | 2/2012 | Gregg et al. | |
| 8,172,603 B1 | 5/2012 | Richardet, Jr. | |
| 8,199,024 B2 | 6/2012 | Baxter et al. | |
| 8,221,915 B2 | 7/2012 | Tikhonov et al. | |
| 8,362,745 B2 | 1/2013 | Tinaphong | |
| 8,376,775 B2 | 2/2013 | Rinehardt | |
| 8,493,021 B2 | 7/2013 | Richardson et al. | |
| D689,020 S | 9/2013 | Demirjian et al. | |
| 8,686,688 B2 | 4/2014 | Han et al. | |
| 8,736,227 B2 | 5/2014 | Chadbourne et al. | |
| 8,786,247 B2 | 7/2014 | Ishino et al. | |
| 8,975,870 B2 | 3/2015 | Maruyama et al. | |
| 8,994,327 B2 | 3/2015 | Kusch et al. | |
| D726,109 S | 4/2015 | Nook et al. | |
| D726,114 S | 4/2015 | Nook et al. | |
| D726,121 S | 4/2015 | Nook et al. | |
| 9,007,015 B1 | 4/2015 | Nook et al. | |
| 9,007,023 B2 | 4/2015 | Dao | |
| 9,035,599 B2 | 5/2015 | Amemiya et al. | |
| 9,041,244 B2 | 5/2015 | Graf | |
| 9,048,666 B2 | 6/2015 | Su | |
| 9,070,938 B2 | 6/2015 | Hashimoto et al. | |
| D735,665 S | 8/2015 | Nook et al. | |
| 9,153,978 B2 | 10/2015 | Reade | |
| 9,184,534 B1 | 11/2015 | Errato, Jr. et al. | |
| 9,197,079 B2 | 11/2015 | Yip et al. | |
| 9,219,372 B2 * | 12/2015 | Paparrizos | H02J 7/00 |
| D746,774 S | 1/2016 | Nook et al. | |
| 9,243,601 B2 | 1/2016 | Reichow | |
| 9,263,717 B2 | 2/2016 | Nakano et al. | |
| 9,263,907 B2 | 2/2016 | Richardson et al. | |
| 9,287,725 B2 | 3/2016 | Huffman et al. | |
| 9,391,467 B2 | 7/2016 | Zhao et al. | |
| 9,490,625 B2 * | 11/2016 | Tanimoto | H04M 1/18 |
| 9,506,446 B2 | 11/2016 | Xinfang | |
| 9,525,297 B2 | 12/2016 | Wang | |
| 9,537,136 B2 | 1/2017 | Ryu | |
| 9,601,800 B2 | 3/2017 | Nakamoto et al. | |
| 9,608,294 B2 | 3/2017 | Ko | |
| 9,718,419 B2 | 8/2017 | Proebstle | |
| 9,748,541 B2 | 8/2017 | Burke | |
| 9,748,778 B2 | 8/2017 | Toya | |
| 9,770,992 B2 | 9/2017 | Nook et al. | |
| 9,809,183 B2 | 11/2017 | Weflen | |
| 9,866,050 B2 | 1/2018 | Brandt et al. | |
| 9,871,392 B2 | 1/2018 | Durando et al. | |
| 9,874,611 B2 | 1/2018 | Whiting et al. | |
| 9,954,391 B2 | 4/2018 | Lei | |
| 10,084,173 B2 | 9/2018 | Ha | |
| 10,087,904 B2 * | 10/2018 | Butler | B60L 53/20 |
| 10,128,483 B2 | 11/2018 | Lee | |
| 10,141,755 B2 | 11/2018 | Miller et al. | |
| 10,218,172 B2 | 2/2019 | Chen et al. | |
| 10,328,806 B2 | 6/2019 | Wang et al. | |
| 10,328,808 B2 | 6/2019 | Nook et al. | |
| 10,461,545 B2 | 10/2019 | Inoue et al. | |
| 10,604,024 B2 | 3/2020 | Nook et al. | |
| 10,981,452 B2 | 4/2021 | Nook et al. | |
| 11,104,236 B2 | 8/2021 | Wang et al. | |
| 11,462,928 B2 * | 10/2022 | Nook | H02J 7/007 |
| 2001/0025618 A1 | 10/2001 | Kelling | |
| 2001/0003827 A1 | 11/2001 | Resch et al. | |
| 2002/0008523 A1 * | 1/2002 | Klang | H02J 7/0071 320/125 |
| 2002/0041174 A1 | 4/2002 | Purkey | |
| 2002/0007500 A1 | 6/2002 | Fridman et al. | |
| 2002/0007699 A1 | 6/2002 | Mouissie | |
| 2002/0121877 A1 | 9/2002 | Smith et al. | |
| 2002/0155752 A1 | 10/2002 | Winkle et al. | |
| 2003/0096158 A1 | 5/2003 | Takano et al. | |
| 2003/0141845 A1 | 7/2003 | Krieger | |
| 2004/0066168 A1 | 4/2004 | George | |
| 2004/0106038 A1 | 6/2004 | Shimamura et al. | |
| 2004/0124810 A1 | 7/2004 | Smallwood et al. | |
| 2004/0130298 A1 * | 7/2004 | Krieger | H02J 7/0034 320/165 |
| 2004/0150373 A1 | 8/2004 | Chan | |
| 2004/0239290 A1 | 12/2004 | Krieger | |
| 2005/0040788 A1 | 2/2005 | Tseng | |
| 2005/0077870 A1 | 4/2005 | Ha et al. | |
| 2005/0082833 A1 | 4/2005 | Sodemann et al. | |
| 2005/0110467 A1 | 5/2005 | Thomason | |
| 2005/0116688 A1 | 6/2005 | Yin | |
| 2005/0162124 A1 | 7/2005 | Bertness et al. | |
| 2005/0213867 A1 | 9/2005 | Rajendran et al. | |
| 2005/0252573 A1 | 11/2005 | Montani | |
| 2005/0255378 A1 | 11/2005 | Knight et al. | |
| 2006/0071631 A1 | 4/2006 | Cheung et al. | |
| 2006/0176011 A1 | 8/2006 | Lui | |
| 2006/0220610 A1 | 10/2006 | Solberg | |
| 2006/0244412 A1 | 11/2006 | Bonzer | |
| 2007/0132427 A1 | 6/2007 | Veselic | |
| 2007/0132537 A1 | 6/2007 | Osbun | |
| 2007/0178777 A1 | 8/2007 | Miekka | |
| 2007/0182363 A1 | 8/2007 | Yang | |
| 2007/0278990 A1 | 12/2007 | Raichle | |
| 2007/0285049 A1 | 12/2007 | Krieger et al. | |
| 2008/0131764 A1 | 6/2008 | Saiki | |
| 2008/0150473 A1 | 6/2008 | Wise | |
| 2008/0143290 A1 | 7/2008 | Chavakula | |
| 2008/0157732 A1 | 7/2008 | Williams | |
| 2008/0185996 A1 | 8/2008 | Krieger et al. | |
| 2009/0026837 A1 | 1/2009 | Lee | |
| 2009/0039712 A1 | 2/2009 | Czamyszka | |
| 2009/0108814 A1 | 4/2009 | Wilkins | |
| 2009/0174362 A1 * | 7/2009 | Richardson | H02J 7/0034 320/105 |
| 2009/0218988 A1 | 9/2009 | Richardson et al. | |
| 2009/0236859 A1 | 9/2009 | McFadden | |
| 2009/0253312 A1 | 10/2009 | Detter et al. | |
| 2010/0013302 A1 | 1/2010 | Howell et al. | |
| 2010/0052620 A1 | 3/2010 | Wong | |
| 2010/0055546 A1 | 3/2010 | Elder et al. | |

(56) References Cited

U.S. PATENT DOCUMENTS

| | | |
|---|---|---|
| 2010/0109607 A1 | 5/2010 | Zheng et al. |
| 2010/0129723 A1 | 5/2010 | Noda et al. |
| 2010/0001682 A1 | 7/2010 | Dickson et al. |
| 2010/0164439 A1 | 7/2010 | Ido |
| 2010/0173182 A1 | 7/2010 | Baxter et al. |
| 2010/0181959 A1 | 7/2010 | Gibbs et al. |
| 2010/0244766 A1 | 9/2010 | Olsberg |
| 2010/0283623 A1 | 11/2010 | Baxter et al. |
| 2010/0301800 A1 | 12/2010 | Inskeep |
| 2011/0068734 A1* | 3/2011 | Waldron ............ H01M 10/4285 320/107 |
| 2011/0076168 A1* | 3/2011 | Irving ................... F04B 17/06 320/107 |
| 2011/0117408 A1 | 5/2011 | Lennox |
| 2011/0127947 A1 | 6/2011 | Hunter et al. |
| 2011/0140651 A1 | 6/2011 | Dai |
| 2011/0163723 A1* | 7/2011 | Tan ......................... H02J 9/005 429/7 |
| 2011/0175461 A1 | 7/2011 | Tinaphong |
| 2011/0250473 A1 | 10/2011 | Kim |
| 2011/0268996 A1 | 11/2011 | Lee |
| 2011/0279089 A1 | 11/2011 | Yeo |
| 2011/0308856 A1 | 12/2011 | Park |
| 2012/0013189 A1 | 1/2012 | Jenkins |
| 2012/0025766 A1 | 2/2012 | Reade |
| 2012/0038365 A1 | 2/2012 | Nagata et al. |
| 2012/0068662 A1 | 3/2012 | Durando et al. |
| 2012/0074907 A1 | 3/2012 | Roeper |
| 2012/0091944 A1 | 4/2012 | Rogers |
| 2012/0126818 A1 | 5/2012 | Ishihara |
| 2012/0139498 A1 | 6/2012 | Chang |
| 2012/0169116 A1 | 7/2012 | Graf |
| 2012/0187897 A1 | 7/2012 | Lenk et al. |
| 2012/0270097 A1 | 10/2012 | Yasui et al. |
| 2012/0295150 A1 | 11/2012 | Gao et al. |
| 2012/0299533 A1 | 11/2012 | Huffman et al. |
| 2012/0319487 A1 | 12/2012 | Shah |
| 2013/0084471 A1 | 4/2013 | Han et al. |
| 2013/0104817 A1 | 5/2013 | Miller |
| 2013/0154543 A1 | 6/2013 | Richardson et al. |
| 2013/0154544 A1 | 6/2013 | Yokoyama et al. |
| 2013/0154550 A1 | 6/2013 | Balmefrizol et al. |
| 2013/0162029 A1 | 6/2013 | Reichow |
| 2013/0164613 A1 | 6/2013 | Hashimoto et al. |
| 2013/0241488 A1 | 9/2013 | Dao |
| 2013/0241498 A1 | 9/2013 | Koebler |
| 2013/0285596 A1 | 10/2013 | Zhou et al. |
| 2013/0295444 A1 | 11/2013 | Kim et al. |
| 2013/0314041 A1 | 11/2013 | Proebstle |
| 2014/0008093 A1 | 1/2014 | Patel et al. |
| 2014/0030558 A1 | 1/2014 | Ryu |
| 2014/0043780 A1 | 2/2014 | Tsai et al. |
| 2014/0045001 A1 | 2/2014 | Yang |
| 2014/0077755 A1 | 3/2014 | Zhang |
| 2014/0084844 A1 | 3/2014 | Weflen |
| 2014/0113463 A1 | 4/2014 | Peterson et al. |
| 2014/0127550 A1 | 5/2014 | Roh et al. |
| 2014/0139175 A1 | 5/2014 | Gonzalez |
| 2014/0159509 A1 | 6/2014 | Inskeep |
| 2014/0210399 A1 | 7/2014 | Urschel |
| 2014/0225622 A1 | 8/2014 | Kudo et al. |
| 2014/0368155 A1 | 12/2014 | Chen |
| 2015/0012174 A1 | 1/2015 | Kim et al. |
| 2015/0015184 A1 | 1/2015 | Su |
| 2015/0037658 A1 | 2/2015 | Maeda et al. |
| 2015/0037662 A1 | 2/2015 | Pinon et al. |
| 2015/0054336 A1 | 2/2015 | Liu |
| 2015/0087182 A1 | 3/2015 | Zhao et al. |
| 2015/0137740 A1 | 5/2015 | Allos et al. |
| 2015/0222060 A1 | 8/2015 | Kim et al. |
| 2015/0236329 A1 | 8/2015 | Okuda et al. |
| 2015/0306964 A1 | 10/2015 | Wang |
| 2015/0306967 A1 | 10/2015 | Cohen |
| 2015/0340907 A1 | 11/2015 | Lei |
| 2015/0366538 A1 | 12/2015 | McKenna |
| 2015/0380697 A1 | 12/2015 | Osborne et al. |
| 2015/0380952 A1 | 12/2015 | Brandt et al. |
| 2016/0001666 A1 | 1/2016 | Nook et al. |
| 2016/0049819 A1 | 2/2016 | Butler et al. |
| 2016/0111914 A1 | 4/2016 | Willard et al. |
| 2016/0141728 A1 | 5/2016 | Fauteux et al. |
| 2016/0155996 A1 | 6/2016 | Dai |
| 2016/0181587 A1 | 6/2016 | Koebler et al. |
| 2017/0012448 A1 | 1/2017 | Miller et al. |
| 2017/0084899 A1 | 3/2017 | Deng et al. |
| 2017/0222272 A1 | 8/2017 | Takami et al. |
| 2017/0309872 A1 | 10/2017 | Kuboki et al. |
| 2018/0069413 A1* | 3/2018 | Chen ..................... H02J 7/0045 |
| 2018/0090964 A1* | 3/2018 | Williams ................ H02J 7/342 |
| 2018/0111491 A1 | 4/2018 | Nook et al. |
| 2018/0215274 A1 | 8/2018 | Nook et al. |
| 2018/0269703 A1 | 9/2018 | Nook et al. |
| 2018/0342891 A1 | 11/2018 | Nook et al. |
| 2018/0345803 A1 | 12/2018 | Nook et al. |
| 2018/0369599 A1 | 12/2018 | Smith |
| 2019/0081472 A1 | 3/2019 | Guo et al. |
| 2019/0308518 A1 | 10/2019 | Nook et al. |

FOREIGN PATENT DOCUMENTS

| | | |
|---|---|---|
| AU | 2015258229 A1 | 1/2016 |
| AU | 2016269555 B2 | 1/2017 |
| AU | 2016392707 A1 | 11/2017 |
| AU | 2017217661 B2 | 11/2018 |
| AU | 2019201081 A1 | 3/2019 |
| AU | 2019201559 A1 | 3/2019 |
| AU | 2020001223 A1 | 3/2020 |
| CA | 107977 A | 10/1907 |
| CA | 105457 S | 6/2005 |
| CA | 2600512 | 9/2006 |
| CA | 118796 S | 1/2008 |
| CA | 137883 S | 6/2011 |
| CA | 145036 S | 2/2013 |
| CA | 2916782 A1 | 1/2016 |
| CA | 2957431 A1 | 8/2017 |
| CA | 3005971 A1 | 8/2017 |
| CN | 1440892 A | 9/2003 |
| CN | 201226449 | 4/2009 |
| CN | 201947042 U | 8/2011 |
| CN | 202058834 U | 11/2011 |
| CN | 102414923 | 4/2012 |
| CN | 102414923 A | 4/2012 |
| CN | 102447288 A | 5/2012 |
| CN | 202512152 | 10/2012 |
| CN | 202696190 U | 1/2013 |
| CN | 103035874 | 4/2013 |
| CN | 103035874 A | 4/2013 |
| CN | 103066662 A | 4/2013 |
| CN | 202918052 U | 5/2013 |
| CN | 203211234 U | 9/2013 |
| CN | 203504235 U | 3/2014 |
| CN | 103715737 A | 4/2014 |
| CN | 203522157 U | 4/2014 |
| CN | 203788026 | 8/2014 |
| CN | 104118374 A | 10/2014 |
| CN | 204113515 U | 1/2015 |
| CN | 104442429 A | 3/2015 |
| CN | 104488111 | 4/2015 |
| CN | 104488111 A | 4/2015 |
| CN | 104617250 | 5/2015 |
| CN | 104617250 A | 5/2015 |
| CN | 104795527 | 7/2015 |
| CN | 104795527 A | 7/2015 |
| CN | 204516832 | 7/2015 |
| CN | 204516832 U | 7/2015 |
| CN | 204966731 | 1/2016 |
| CN | 204966731 U | 1/2016 |
| CN | 205544443 U * | 8/2016 ................ H02J 7/00 |
| CN | 107852004 A | 3/2018 |
| CN | 108884801 A | 11/2018 |
| DE | 29507501 | 6/1995 |
| DE | 202009016260 | 3/2010 |
| DE | 102010062708 | 6/2012 |
| DE | 202013102599 | 8/2013 |

(56) References Cited

FOREIGN PATENT DOCUMENTS

| | | | | |
|---|---|---|---|---|
| DE | 102014114997 | | 1/2016 | |
| DE | 112016002206 | | 3/2018 | |
| DE | 202014011413 | | 4/2020 | |
| EP | 2105980 | | 9/2009 | |
| EP | 2239464 | A2 * | 10/2010 | .............. F04B 17/03 |
| EP | 2388845 | | 11/2011 | |
| EP | 2398090 | A2 * | 12/2011 | .............. H01M 2/20 |
| EP | 2472698 | A2 | 7/2012 | |
| EP | 2575189 | | 4/2013 | |
| EP | 2605313 | | 6/2013 | |
| EP | 2670036 | | 12/2013 | |
| EP | 2388845 | B1 | 3/2014 | |
| EP | 0616409 | | 9/2014 | |
| EP | 3286429 | A1 | 2/2018 | |
| EP | 3308446 | A1 | 4/2018 | |
| EP | 3407405 | A1 | 11/2018 | |
| FR | 2814001 | | 3/2002 | |
| GB | 2265267 | A | 9/1993 | |
| GB | 2527858 | A | 1/2016 | |
| GB | 2557733 | A | 6/2018 | |
| GB | 2562950 | A | 11/2018 | |
| GB | 2527848 | A | 1/2019 | |
| GB | 2584424 | A | 12/2020 | |
| JP | 2001-069673 | A | 3/2001 | |
| JP | 2002-141056 | | 5/2002 | |
| JP | 2002-141056 | A | 5/2002 | |
| JP | 2003-112586 | | 4/2003 | |
| JP | 2003-112586 | A | 4/2003 | |
| JP | 2006-286385 | | 10/2006 | |
| JP | 2008-146998 | | 6/2008 | |
| JP | 2008-146998 | A | 6/2008 | |
| JP | 2010-251052 | | 11/2010 | |
| JP | 2011-023249 | | 2/2011 | |
| JP | 2011-023249 | A | 2/2011 | |
| JP | 2012-004106 | | 1/2012 | |
| JP | 2012-004106 | A | 1/2012 | |
| JP | 2012-077160 | | 4/2012 | |
| JP | 2012-169161 | A | 9/2012 | |
| JP | 2012-230962 | | 11/2012 | |
| JP | 2012-230962 | A | 11/2012 | |
| JP | 3182855 | U | 4/2013 | |
| JP | 3185027 | U | 7/2013 | |
| JP | 2014-523623 | | 9/2014 | |
| JP | 2014-523623 | A | 9/2014 | |
| JP | 2014-232666 | A | 12/2014 | |
| JP | 2015-072878 | | 4/2015 | |
| JP | 2015-115979 | | 6/2015 | |
| JP | 2015-115979 | A | 6/2015 | |
| JP | 2015-153676 | | 8/2015 | |
| JP | 2018-534892 | A | 11/2018 | |
| JP | 2018-536789 | A | 12/2018 | |
| PH | 1-2013-500793 | | 1/2017 | |
| WO | WO 2000/024108 | A1 | 4/2000 | |
| WO | WO 2004/036714 | A1 | 4/2004 | |
| WO | WO 2005/038952 | A2 | 4/2005 | |
| WO | WO 2006/057497 | | 6/2006 | |
| WO | WO 2006/057497 | A1 | 6/2006 | |
| WO | WO 2009/059852 | A2 | 5/2009 | |
| WO | WO 2010/129723 | A2 | 11/2010 | |
| WO | WO 2011/113734 | A1 | 9/2011 | |
| WO | WO 2012/036556 | A1 | 3/2012 | |
| WO | WO 2012/068635 | A1 | 5/2012 | |
| WO | WO 2012/074548 | | 6/2012 | |
| WO | WO 2012/074548 | A1 | 6/2012 | |
| WO | WO 2012/080996 | A1 | 6/2012 | |
| WO | WO 2012/081140 | | 6/2012 | |
| WO | WO 2012/081140 | A1 | 6/2012 | |
| WO | WO 2012/160292 | A2 | 11/2012 | |
| WO | WO 2013/137873 | A1 | 9/2013 | |
| WO | WO 2014/106407 | A1 | 10/2014 | |
| WO | WO 2014/206323 | A1 | 12/2014 | |
| WO | WO 2015/195321 | | 12/2015 | |
| WO | WO 2015/195321 | A1 | 12/2015 | |
| WO | WO 2016/003471 | A1 | 1/2016 | |
| WO | WO 2016/025869 | A1 | 2/2016 | |
| WO | WO 2017/138963 | A1 | 8/2017 | |
| WO | WO 2017/139524 | A1 | 8/2017 | |
| WO | WO 2019/021007 | A1 | 1/2019 | |
| WO | WO 2021/242833 | A1 | 12/2021 | |

OTHER PUBLICATIONS

Report on the Filing or Determination of an Action Regarding a Patent or Trademark, filed Aug. 14, 2019, *The Noco Company, Inc. v. Sictec Instruments Company Limited*, 1 page.
Decision Granting Institution of Inter Partes Review, U.S. Pat. No. 9,007,015, U.S. Appl. No. 14/325,938 on Nov. 12, 2020, IPR2020-00944, 70 pages.
Report on the Filing or Determination of an Action Regarding a Patent or Trademark, filed May 28, 2020, *The Noco Company, Inc. v. Shenzhen Yike Electronics*, 1 page.
Report on the Filing or Determination of an Action Regarding a Patent or Trademark, filed May 28, 2020, *The Noco Company, Inc. v. Guangzhou Unique Electronics Co., Ltd. and Sui Cheng Limited*, 1 page.
Report on the Filing or Determination of an Action Regarding a Patent or Trademark, filed May 28, 2020, *The NOCO Company, Inc. v. Zhejiang Quingyou Electronic Commerce Co., Ltd.*, 1 page.
Report on the Filing or Determination of an Action Regarding a Patent or Trademark, filed May 28, 2020, *The Noco Company, Inc. v. Shenzhen Gooloo E-commerce Co.*, Ltd., 1 page.
Report on the Filing or Determination of an Action Regarding a Patent or Trademark, filed May 28, 2020, *The Noco Company, Inc. v. Nice Team Enterprise Limited*, 1 page.
Report on the Filing or Determination of an Action Regarding a Patent or Trademark, filed May 28, 2020, *The Noco Company, Inc. v. Aukey Technology Co., Ltd.*, 1 page.
Report on the Filing or Determination of an Action Regarding a Patent or Trademark, filed Mar. 16, 2020, *The Noco Company, Inc. v. Nekteck, Inc.*, 1 page.
Report on the Filing or Determination of an Action Regarding a Patent or Trademark, filed Mar. 13, 2020, *The Noco Company, Inc. v. Medcursor, Inc.*, 1 page.
Australian Patent Opposition #2, Notice of Opposition, Australian Patent Application No. 2019201559, Brown & Watson International Pty Ltd., Feb. 21, 2020, 1 page.
The offering for sale and sale by ATD Tools, Inc of a product identified as the ADT 5900 Jump Starter prior to Jul. 2014.
Australian Patent Opposition #3, Notice of Opposition, Australian Patent Application No. 2020201223, Brown & Watson International Pty Ltd., Aug. 7, 2020.
German Patent Opposition_ German Patent Application No. 102014114997.
D21 advertisement brochure of the opponent transmitted on Dec. 22, 2013.
D22 advertisement brochure of the opponent transmitted on Apr. 23, 2014.
D23 SGS test report relating to jump start devices of the opponent dated Apr. 21, 2014.
D24 TWM417714U1.
D24a machine translation of D24.
D25 data sheet of TopcomTechnology Co., Ltd., for the product "Universal Power Bank", dated Nov. 15, 2011.
D28 affidavit of the manager of the requesting party, 2013.
German Nullity Action, German Patent Application No. 202014011347.5.
*The Noco Company v. Ring Automotive Limited*, HP-2020-000022, Grounds of Invalidity, In the High Court pf Justice Business And Property Courts of England and Wales Intellectual Property List (Ch □) Patents Court, 2 pages.
The making available to the public by supply, description and/or use of the HP2200 jump starter described in the manual dated Aug. 2013 at Annex A Before Jul. 3, 2014 including in and after Aug. 2013('HP2200') (cited on p. 1 of reference *The Noco Company v. Ring Automotive Limited*, HP-2020-000022, Grounds of Invalidity).
The Carku E-Power 21 device in so far as it is established to have been made available to the public in the Earlier Proceedings (Carku

(56) References Cited

OTHER PUBLICATIONS

E-Power 21) (cited on p. 2 of reference *The Noco Company v. Ring Automotive Limited*, HP-2020-000022, Grounds of Invalidity).
*The Noco Company v. Shenzhen Valuelink E-Commerces Co., Ltd*, Case No. 1:17-cv-02210, Defendants' Amended Final Invalidity and Unenforceability Contents, Sep. 23, 2019, 5 pages.; The Powerall PBJS12000RD Jump Starter ("Powerall Jump Starter"), offered For sale by Gryphon Mobile Electronics early as Nov. 5, 2013; The Lightning 12V Jump Starter (Lightning Jump Starter), offered for sale by Pilot, Inc. early as Mar. 2014; The L3 Model Jump Starter, offered for sale by Shenzhen Tsevie Company early as May 19, 2019.
*The Noco Company, Inc. v. Shenzhen Changxinyang Technology Co., Ltd.*, Case No. 1:17-cv-02209, Defendants' Amended Final Invalidity and Unenforceability Contents, In the US District Court of Northern Ohio, Eastern District.
The Powerall PBJS12000RD Jump Starter ("Powerall Jump Starter"), offered For sale by Gryphon Mobile Electronics early Nov. 5, 2013; The Lightning 12V Jump Starter (Lightning Jump Starter), offered for sale by Pilot, Inc. early Mar. 2014; The L3 Model Jump Starter, offered for sale by Shenzhen Tsevie Co early May 19, 2019.
Notification of Material filed under Section 27, Australian Government IP Australia, Nov. 8, 2016 (3 pages); Declaration of Sheridan Lee (8 pages); Annexure SL-1 (8 pages); Annexure SL-2 (10 pages); Annexure SL-3 (9 pages); Annexure SL-4 (18 pages); Annexure SL-5, JP 3185027 (14 pages); Annexure SL-6 of English Translation of UP 3185027 (17 pages) and US 2004/0130298 (14 pages).
This Portable USB Charger Battery Pack Can Also Jump Start Your Car (viewed on Internet on Oct. 27, 2020] <URL: https://www.howtogeek.com/179499/this-portable-usb-charger-battery-pack-can-also-jump-start-your-car/>, published on Jan. 13, 2014.
Clore Automotive, LLC, U.S. International Trade Commission, Investigation No. 337-TA-1256, Response of Clore Automotive, LLC to the Amended Complaint and Notice of Investigation, pp. 150-151.
Deltran USA, LLC, U.S. International Trade Commission, Investigation No. 337-TA-1256 Del Tran USA, LLC's Response to the Amended Complaint and Notice of Investigation, pp. 196-219.
Schumaker Electric Corporation and Schumacher Power Technology (Binhai) Co. Ltd., U.S. International Trade Commission, Investigation No. 337-TA-1256, Response of Schumacher Electric Corporation and Schumacher Power Technology (Binhai) Co. Ltd., to the Complaint of the Noco Company Under Section 337 of the Tariff Act of 1930 And Notice of Investigation, pp. 180-184.
Best Buy Co., Inc .. , U.S. International Trade Commission, Investigation No. 337-TA-1256, Response of Best Buy Co., Inc. to the First Amended Complaint and the Notice of Investigation, pp. 69-71.
Guangdong Boltpower Energy Co, Ltd., U.S. International Trade Commission, Investigation No. 337-TA-1256, 35 Response of Guangdong Boltpower Energy Co., Ltd. to the First Amended Complaint and the Notice of Investigation, pp. 73-74.
Winplus North America, Inc. U.S. International Trade Commission, Investigation No. 337-TA-1256, Response of Winplus North America, Inc. to the Amended Complaint and the Commissioner's Notice of Investigation, Exhibit B, pp. 1-5.
Autozone, Inc.,, U.S. International Trade Commission, Investigation No. 337-TA-1256, Respondents Autozone, Inc. and Best Parts, Inc.'S Response to the Amended Complaint and Notice of Investigation.
Snenznen Carku Technology Co., Ltd. 70MAI Co., Ltd. Antigravity Batteness LLC, Gooloo Tecnologies LLC, Great Neck Saw Manufacturers, Inc., Horizon Tool, Inc. Matco Tools Corporation, Nekleck, Inc., Paris Corporation, Powermax Battery (U.S.A.), Inc., and Shenzhen Gooloo E-Commerce Co., Ltd. U.S. International Trade Commission, Investigation No. 337-TA-1256, Response to the Amended Complaint and Notice of Investigation, Exhibit B, pp. 1-3.
Walmart Inc., U.S. International Trade Commission, Investigation No. 337-TA-1256, Response of Walmart Inc., to the Complaint of the Noco Company Under Section 337 of the Tariff Act of 1930 and Notice of Investigation.
Smartech Products, Inc., U.S. International Trade Commission, Investigation No. 337-TA-1256, Respondent Smartech Products, Inc.'s Response to the Complaint Under 337 of the Tariff Act of 1930, as Amended, and Notice of Investigation, pp. 98-102.
Halo2Cloud, LLC and Zagg Inc., U.S. International Trade Commission, Investigation No. 337-TA-1256, Response of Halo2Cloud, LLC and Zagg Inc to the Second Amended Complaint and Notice of Investigation, pp. 141-142.
QVC, Inc., U.S. International Trade Commission, Investigation No. 337-1256, Response of QVC, Inc. to the Second Amended Complaint and Notice of Investigation, pp. 144-145.
In re Certain Portable Battery Jumpstarters and Components Thereof, 3370TA01256, United States International Trade Commission (Mar. 17, 2021).
Fairchild MC78XX/LM78XX/MC78XXA 3-Terminal 1A Positive Voltage Regulator.
USB Battery Charging 1.2 Compliance Plan, Rev. 1.0.
Xysemi XR3403.
Texas Instruments LM2621.
USB Implementers Forum, Inc., Battery Charging Specification, Revision 1.1.
Carku Epower-20B catalog information.
USB Power Delivery Specification 1.0, Jul. 16, 2012, Exhibit 1045.
Exhibit 1008, www.xcar360.com.
Exhibit 1009, www.electronicshub.org.
Petition for Inter Partes Review of U.S. Pat. No. 9,007,015; IPR 2020-00944, filed May 14, 2020, 105 pages.
Exhibit 1013, Model: Epower-21 brochure, 2 pages.
Report on the filing or determination of an action regarding a patent or trademark, filed Oct. 19, 2017, *The Noco Company, Inc. v. Shenzhen Valuelink E-commerce Co., Ltd.*, U.S. District Court for the Northern District of Ohio, Eastern Division, 1 page.
Report on the filing or determination of an action regarding a patent or trademark, filed Oct. 19, 2017, *The Noco Company, Inc. v. Shenzhen ChangXin Yang Technology Co., Ltd.*, U.S. District Court for the Northern District of Ohio, Eastern Division, 1 page.
Report on the filing or determination of an action regarding a patent or trademark, filed Oct. 19, 2017, *The Noco Company, Inc. v. SZ Jingxinghui Electronics Technology Co., Ltd.*, U.S. District Court for the Northern District of Ohio, Eastern Division, 1 page.
Report on the filing or determination of an action regarding a patent or trademark, filed Oct. 19, 2017, *The Noco Company, Inc. v. Shenzhen Anband Technology Co., Ltd.*, U.S. District Court for the Northern District of Ohio, Eastern Division, 1 page.
Report on the filing or determination of an action regarding a patent or trademark, filed Oct. 30, 2017, *The Noco Company, Inc. v. Shenzhen Dika Na'er E-commerce Co., Ltd.*, U.S. District Court for the Northern District of Ohio, Eastern Division, 1 page.
PTAB notice regarding petition filed in U.S. Pat. No. 9,007,015, U.S. Appl. No. 14/325,938, filed Jan. 15, 2018, IPR2018-00503, 1 page.
Report on the filing or determination of an action regarding a patent or trademark, filed Sep. 13, 2018, *The Noco Company, Inc. v. Halo2 Cloud, LLC, QVC, Inc.*, U.S. District Court Delaware, 1 page.
Notice of Filing Date Accorded to Petition and Time for Filing Patent Owner Preliminary Response, mailed May 21, 2020, *Shenzhen Carku Technology Co., Ltd. v. The Noco Company*, IPR2020-00944, U.S. Pat. No. 9,007,015, 4 pages.
International Search Report in corresponding PCT/US2014/045434, Nov. 3, 2014.
Australian Patent Opposition #1, Australian Patent Application No. 2016269555, Statement of Grounds of Particulars, Brown & Watson International Pty Ltd., Jun. 6, 2019, 6 pages; particular (e), the offering for sale and sale by Asia Bright Industrial (Hong Kong) Co, Ltd_ of products identified as the JPS Jump Starter and the JPR Jump Starter prior to Jul. 2014.
Australian Patent Opposition #1, Australian Patent Application No. 2016269555, Evidence in Support, filed Sep. 6, 2019, 24 pages.
Declaration of Max Dirnberger.

(56) References Cited

OTHER PUBLICATIONS

Australian Patent Opposition #1, Australian Patent Application No. 2016269555, Evidence in Support—Exhibits, filed Sep. 6, 2019, 166 pages; Declaration of Max Dirnberger—Annexure MD-1, early specification sheets for "the BW Jumpstarter", 4 pages; Annexure MD-2, product manual for "the BW Jumpstarter", Project A; "2×22 Amp Hour High Performance Jumpstarter"; 2013; 20 pages.
Australian Patent Opposition #2, Australian Patent Application No. 2019201559, Statement of Grounds and Particulars, filed May 21, 2020, 8 pages.
*The Noco Company* v. *Deltona Transformer Corporation and Del Tran USA, LLC*, Defendant Peltran USA, LLC's Invalidity Contentions, In the United States District Court for the Middle District of Florida, Orlando Division, USB Implementers Forum, Inc., Battery Charging Specification, Revision 1.1, Apr. 15, 2009 on p. 8, Prior Art Offered for Sale or Publicly Used or Known on pp. 8-10, Micro-Start/PPS, E-Power, Battery Tender Power Pack, PowerAll, and Electromate 400 on p. 10; 141 pages.
*The Noco Co., Inc.* v. *Smartech Products, Inc., et al.*, Smartech, Inc.'s Invalidity and Unenforceability Contents, Bestek 2400A Peak Current Portable Car Jump Starter Power Bank with 1 000mAh Capacity (Smartech 00062-00069((Bestek) on p. 2; Halo 7800 mAh Portable Charger for Cell Phones & Tablets (Smartech 00070-00071)("Halo") on p. 2; Schumacher Lithium Iron Jump Starter—SL 1 Red Fuel (Smartech 00072-00073)("Schumacher") on p. 2, filed Jun. 19, 2019, 8 pages.
Farah et al., New Analog Li-ion Battery Charger Using Pulsed Charging Method, 2018, IEEE, pp. 1-4 (Year: 2018).
Mubdir et al. "Smart Charger for Sealed Lead Acid Batteries Based on Parallel Port PC Interfacing", Dec. 1, 2010, IEEE International Conference on Power and Energy, pp. 119-124 (Year: 2010).
Petition for Inter Partes Review of U.S. Pat. No. 9,007,015; 49 pages; filed Jan. 15, 2018.
Defendants' Invalidity and Unenforceability Contentions— Defendant: Shenzhen Lianfa Tong Technology Co., Ltd., et al., Judge Christopher A. Boyko, 5 pages, Sep. 18, 2020; U.S. Pat. No. 9,007,015.
Statement of Defense and Counterclaim—Defendant: Canadian Tire Corporation, Limited, Court File No. T-343-20, 17 pages, Aug. 4, 2020.
XP 55517268A 1, Noco Product Brochure, Jump Starter, Lithium GB70 2000A 12V.
XP 55517270A 1, Noco Product Brochure, Jump Starter, Lithium GB40 1000A 12V.
USB Battery Charging Specification Version 1.2 (EX1009).
Grounds of Invalidity: Annex A to the Grounds of Invalidity; Projecta product manual for 2200A Jumpstarter, P/No.s HP 2012, HP 2200.; Carku E-Power 21 device.
Grounds of Invalidity: Prior use of the Carku E-Power 21 device (Carku E-Power 2n.; User manual for Carku E-Power 21 (Ann 1).; Specification sheet for Carku E-Power 21 (Ann 2).; Claimant's E-catalogue dated Apr. 22, 2014, Which included Carku E-Power 21 (Ann 3).; Photograph of claimants' booth at 115th 2014 Canton Fair (Ann 4).; Photographs and quotation sheet rcvd by Edelbert Lenz GmbH & Co. KG {Ann 5).; User manuals and specification sheets rovd bv Kaz Coro. of Jaoan (Ann 6).; E-Cataloaue rcvd bv email bv Krautli (Schweiz) AG (Ann 7).
Defendant Deltona Transformer Corporation's Invalidity Contentions: USB Implementers Forum, Inc, Battery Charging Specification, Rev 1.1, Apr. 15, 2009.; Micro-Start/PPS, offered for sale as late as Jul. 29, 2013, by Antigravity Batteries.; E-Power, offered for sale as late as Apr. 15, 2013 by Carku.; Battery Tender Power Pack, offered for sale prior to Jul. 3, 2014 by Carku/Deltran USA LLC.; PowerAll, offered for sale as late as Mar. 26, 2014 bv Gryphon Mobile Electronics LLC.; Electromate 400, offered for sale as late as 2013 by Black & Decker.
Defendant TII Trading Inc.'s Invalidity Contentions.
Defendant's Invalidity and Unenforceability Contentions: USB Battery Charging Spec Ver 1.2.; E-flite EC Connector Assembly Instruct w 2008.; Datasheet for LM7805 Voltage Regulator from Fairchild Semiconductor.; Carku Product Brochure for Epower-20 jump starter product.; Carku Product Brochure for Epower-21 jump starter product.; MC78XX/LM78XX/MC78XXA 3-Terminal 1A Positive Voltage Regulator from Fairchild Semiconductor Coro. 2001.; Patent Owner The Noco Companv's Preliminary Response in Dongguan IPR.
Memo Opin and Order of US Dist Ct Jud Barker construing disputed terms of claims 1, 9 and 19 of the '015 issued *Noco* v. *SmarTech Products, Inc.*, 1 :18-cv-2780 (N.D. Ohio Apr. 2, 2020; Noco Amend Campl *Noco* v *Shenzhen Lianfa Tong Tech Co., Ltd., et al.*, 1:19-cv-01855 (N.D. Ohio Apr. 2, 2020; Dec Wan; Dec Hartup; Dec Kirtley; Special Master Report on Prop Claim Const For U.S. Pat. No. 9,007,015 issued *Noco* v. *Shenzhen Dika Na'Er E-commerce Co.*, 1:17CV2282 (N.D. Ohio Jun. 28, 2018) ace/adopt by US Dist CI Jud Boyko, 2019 WL 1723358.
Defendants' Amended Final Invalidity and Unenforceability Contentions: The Powerall PBJS12000RD Jump Starter, offered for sale by Gryphon Mobile Electronics at least as early as Nov. 5, 2013.; The Lightning 12V Jump Starter, offered for sale by Pilot, Inc. at least as early as Mar. 2014.; The L3 Model Jump Starter, offered for sale by Shenzhen Tsevie Company at least as early as May 19, 2019.
Australian Office Action for AU Patent Application No. AU2020201224, mailed Oct. 26, 2021.
Declaration by Cory Seligman (30 Pages) and Annexure marked CS-1 (137 Pages), in the matter of AU 019201559 and Opposition by Brown & Watson; Nov. 23, 2020.
Petition for Inter Partes Review of U.S. Pat. No. 9007015 for *Shenzhen Mediatek Tong Technology* v. *Noco Company* (69 Pages); IPR2020-01387; Jul. 29, 2020.
Petition for Inter Partes Review of U.S. Pat. No. 9,007,015 for *Guangdong Boltpower Energy Co., Ltd.* v. *Noco Company* (106 Pages); IPR2021-00309; Dec. 11, 2020.
Exhibit 1004 from IPR2021-00309; PTAB Decision Denying Institution of Inter Partes Review of the '015 patent in Case IPR2018-00503.
Exhibit 1016 from IPR2020-01387; *The Noco Company, Inc_* v. *Shenzhen Lianfa Tong Technology Co. Ltd., et al.*, Case No. 1: 19-cv-0 1855, (N. D. Ohio) First Amended Complaint for Patent Infringement.
Projecta; "2×22 Amp Hour High Performance Jumpstarter"; 2013; pp. 1-20.
Exhibit 1012, Model: Epower-208 brochure, 1 page.
Exhibit 1015, Fairchild Semiconductor brochure, MC78XX/LM78XX/MC78XXA, 28 pages.
*The Noco Company* v. *Shenzhen Dika Na'er E-Commerce* (Lead Case No. 1:17-cv-02282), *The Noco Company* v. *Shenzhen Changxinyang Technology Co., Ltd* (Case No. 1:117-cv-02209). *The Noco Company* v. *Shenzhen Valuelink E-Commerces Co., Ltd* (Case No. 1:17-cv-02210), Defendants' Amended Final Invalidity and Unenforceability Contents, The Powerall PBJS12000RD Jump Starter ("Powerall Jump Starter"), offered for sale by Gryphon Mobile Electronics at least as early as Nov. 5, 2013, on p. 2, The Lightning 12V Jump Starter ("Lightning Jump Starter"), offered for sale by Pilot, Inc. at least as early as Mar. 2014, on p. 2, and The L3 Model Jump Starter, offered for sale by Shenzhen Tsevie Company at least as early as May 19, 2019, on p. 2, Sep. 23, 2019, 5 pages.
Report on the filing or determination of an action regarding a patent; U.S. Pat. No. 9,007,015; issued on Feb. 27, 2018; 1 page.
Report on the filing or determination of an action regarding a patent; U.S. Pat. No. 9,007,015; issued on Dec. 5, 2017; 1 page.
IP Australia, Appl. No. 2022200746, Examination Report No. 1, Nov. 3, 2022.
IP Australia, Appl. No. 2022201338, Examination Report No. 1, Feb. 7, 2023.
IP Australia, Application No. 2021254622, Examination Report No. 1, dated Oct. 19, 2022.
IP Australia, Application No. 2020200268, Examination Report No. 2, dated Mar. 31, 2021.
Canadian Patent Office, Application No. 3,107,432, Examination Report, dated Jan. 19, 2022.
China Intellectual Property Office, Appl. 201680002479.X, First Office Action, dated Apr. 20, 2020.

(56) References Cited

OTHER PUBLICATIONS

China Intellectual Property Office, Appl. 201680002479.X, Second Office Action, dated Feb. 3, 2021.
China Intellectual Property Office, Appl. 201680002479.X, Third Office Action, dated May 18, 2021.
European Patent Office, Application No. 16831887.1, Article 94(3) Communication, dated Sep. 20, 2022.
European Patent Office, Application No. 16831887.1, Extended European Search Report, dated Feb. 26, 2020.
Japan Patent Office, Appl. 2020-056227, First Office Action, dated Apr. 6, 2021.
Japan Patent Office, Appl. 2020-056227, Second Office Action, dated Dec. 14, 2021.
Japan Patent Office, Appl. 2020-056227, Decision of Refusal, dated Jul. 4, 2022.
Patent Cooperation Treaty, PCT/US2016/024680, International Preliminary Report on Patentability, dated Aug. 14, 2018.
United Kingdom Patent Office, Combined Search and Examination Report, Application No. GB2018012.1, dated May 3, 2021.
Nicastri, and Huang, 1999, "Jump Starting 42V Powernet Vehicles," Gateway to the New Millennium, 18th Digital Avionics Systems Conference Proceedings, St. Louis, MO, pp. 8.A.6-8.A.6.
Patent Cooperation Treaty, PCT/US2021/071685, International Preliminary Report on Patentability, Mar. 28, 2023.
IP Australia, Appl. 2023200471, Examination Report No. 1, Mar. 23, 2023.
Patent Cooperation Treaty, Appl. PCT/US2016/024680, International Search Report, dated Jun. 24, 2016.
Patent Cooperation Treaty, Appl. PCT/US2017/017289, International Search Report and Written Opinion, dated May 4, 2017.
IP Australia, Appl. 2021254622, Examination Report, Oct. 19, 2022.
IP Australia, Appl. 2020200268, Examination Report, Mar. 31, 2021.
IP Australia, Appl. 2020277175, Examination Report, Nov. 18, 2021.
IP Australia, Appl. 2020277175, Examination Report, Aug. 12, 2022.
Canadian Patent Office, Appl. 3,005,971, Examination Report, Nov. 29, 2019.
Canadian Patent Office, Appl. 3,005,971, Examination Report, Aug. 18, 2020.
Canadian Patent Office, Appl. 3,005,971, Examination Report, Apr. 21, 2021.
Canadian Patent Office, Appl. 3,107,432, Examination Report, Jan. 19, 2022.
Canadian Patent Office, Appl. 3,107,432, Examination Report, Oct. 5, 2022.
Canadian Patent Office, Examination Report, Application No. 3,107,432, dated Oct. 5, 2022.
Chinese Patent Office, Appl. 201680002479.X, Office Action, dated Apr. 20, 2020.
Chinese Patent Office, Appl. 201680002479.X, Office Action, dated Feb. 3, 2021.
Chinese Patent Office, Appl. 201680002479.X, Office Action, dated May 18, 2021.
Chinese Patent Office, Appl. 201680002479.X, Office Action, dated Apr. 3, 2023.
Chinese Patent Office, Appl. 201780010937.9, Office Action, dated Dec. 19, 2019.
Chinese Patent Office, Appl. 201780010937.9, Office Action, dated Jul. 13, 2020.
Chinese Patent Office, Appl. 201780010937.9, Office Action, dated Jan. 5, 2021.
Chinese Patent Office, Appl. 201780010937.9, Office Action, dated Jul. 1, 2021.
European Patent Office, Appl. 16831887.1, Extended European Search Report, Feb. 26, 2020.
European Patent Office, Appl. 16831887.1, Communication Pursuant to Article 94(3), Sep. 20, 2022.
European Patent Office, Appl. 17750799.3, Communication Pursuant to Article 94(3), Jan. 28, 2022.
European Patent Office, Appl. 19209245.0, Extended European Search Report, Apr. 20, 2020.
European Patent Office, Appl. 18181486.4, Communication Pursuant to Article 94(3), dated Jan. 28, 2022.
German Patent Office, Appl. 11 2016 007 604.5, Office Action, Feb. 14, 2022.
Japan Patent Office, Appl. 2017-561919, Office Action, Nov. 30, 2020.
Japan Patent Office, Appl. 2017-561919, Office Action, Apr. 6, 2021.
Japan Patent Office, Appl. 2020-056227, Office Action, Apr. 6, 2021.
Japan Patent Office, Appl. 2020-056227, Office Action, Dec. 14, 2021.
Japan Patent Office, Appl. 2020-056227, Office Action, Jul. 4, 2022.
Japan Patent Office, Appl. 2020-167183, Office Action, Aug. 10, 2021.
Japan Patent Office, Appl. 2020-167183, Office Action, Apr. 12, 2022.
UK Patent Office, Appl. GB1718653.7, Examination Report, May 29, 2020.
UK Patent Office, Appl. GB1813107.8, Search and Examination Report, Sep. 7, 2020.
UK Patent Office, Appl. GB2018012.1, Search and Examination Report, May 13, 2021.
UK Patent Office, Appl. GB2100281.1, Search and Examination Report, Feb. 22, 2021.
UK Patent Office, Appl. GB2100281.1, Examination Report, Apr. 30, 2021.
UK Patent Office, Appl. GB2108126.0, Search and Examination Report, Jul. 5, 2021.
IP Australia, Appl. 2023251544, Examination Report No. 1, Jul. 2, 2024.
IP Australia, Appl. 2023251550, Examination Report No. 1, Jul. 4, 2024.
European Patent Office, Appl. 18857693.8, Notice of Opposition, Jun. 5, 2024.
EPower Product Catalog (CAR-RPA-ITC_II-002147-002157), Apr. 23, 2014.
USB Implementers Forum (USB-IF), USB Power Delivery—1.0 Introduction, Jul. 16, 2012.
Isaacson et al.; 2000; Advanced Lithium Ion Battery Charger; in $15^{th}$ Annual Battery Conference on Applications and Advances (Cat. No. 00TH8490); pp. 193-198.
Uno; 2013; Single-and Double-Switch Cell Voltage Equalizers for Series-Connected Lithium-Ion Cells and Supercapacitors; Energy Storage—Technologies and Applications; pp. 149-176.
Horowitz, et al.; 1994; The Art of Electronics, the second edition; Cambridge University Press; pp. 229-232.
Vishay; 2010; Optocoupler, Phototransistor Output, with Base Connection (Datasheet for 4N25, 4N26, 4N27, 4N28).
Current-Limited DC/DC Converter Simplifies USB Power Supplies; 2014.
Defensive Driving; 2009; How to jump start your car without blowing up your battery; https://www.youtube.com/watch?v=nv1oT_GnjYw.
Howcast; 2008; How to Jumpstart your Car.
Holtek; 2012; HT67F30/HT67F40/HT67F50/HT67F60; Holtek Datasheet.
The Wellington Advertiser; 2014; It's important to use jumper cables safely when boosting a dead battery; https://www.wellingtonadvertiser.com/it%C2%99s-important-to-use-jumper-cables-safely-when-boosting-a-dead-battery/.
SAE International; 1989; Battery Booster Cables SAE Recommended Practice; SAE J1494; Jun. 1989.
Analog Devices; 2007; USB Type-C Charger; MAX14748 Datasheet.
UL; 1978; Battery Chargers (UL 1236).
EE Web; USB 5V to 12V DC-DC Steip-Up Converter by LT1618.
SemiAccurate; 2012; Finally we can use a USB port for just about everything.

(56) References Cited

OTHER PUBLICATIONS

AnandTech; 2013; USB-IF Announces USB 3.0 10Gbps Development, Demos Power Delivery and Display Driving.
Colognese; 2013; USB Power Delivery: PHY explained.
USB 3.0 Promoter Group Announces Availability of USB Power Delivery Specification; Jul. 18, 2012.
Engadget; 2012; USB Power Delivery spec upped to 100W, aims to make proprietary power connectors obsolete.
Not Rocket Science; 2013; Use your USB powered step up converter to charge your small 12v battery; https://www.youtube.com/watch?v=H-FDVXZbo-o.
USB-IF; 2009; USB Battery Charging Rev. 1.1.
USB-IF; 2010; USB Battery Charging Rev. 1.2.
USB-IF; 2012; USB Power Delivery—1.0 Introduction.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. A—Declaration of Yingchun Wan.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. B—Declaration of Michael Prelec, Jr.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. C—Complaint for Damages and Injunctive Relief.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. D—Oct. 29, 2019 Order.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. E—Complaint for Patent Infringement and Demand for Jury Trial.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. F—Amended Complaint for Patent Infringement and Demand for Jury Trail.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. G—Plaintiff's Disclosure of Asserted Claims and Preliminary Infringement Contentions.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. H—Jul. 7, 2020 Order.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. I—Oct. 30, 2020 Order.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. J—U.S. Pat. No. 9,007,015 Invalidity Chart.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. K—U.S. Pat. No. 10,604,024 Invalidity Chart.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. L—Order No. 46 (Initial Determination).
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. M—Verdict Form.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. N—Verdict Form.
*The Noco Company* v. *Deltona Transformer Corp. et al.*; USDC WDFL 6:23-cv-2194; Defendants Deltran USA, LLC and Deltran Operations USA, Inc.'s First Amended Answer to the Complaint, Defenses, Counterclaims, and Demand for Jury Trial; Ex. O—Judgment in a Civil Case.
*The Noco Company* v. *Deltona Transformer Corp et al.*; USDC WDFL 6:23-cv-2194; Jun. 17, 2024 Order.
*The Noco Company* v. *Shenzhen Carku Technology Co., Ltd.*; CAFC 2022-1646; Feb. 12, 2024 Judgment.
German Patent Office; Patent 10 2014 114 997 Opposition, Interim Decision.
German Patent Office; 20 2014 011 347.5 Opposition Submission by Carku Technology Co., Ltd.
German Patent Office; 20 2014 011 347.5 Opposition Submission by Osram GmbH.
German Patent Office; 20 2014 011 347.5 Opposition Submission.
ITC-337-TA-1359, Aukey Technology Co., Ltd.'s Response to the Amended Complaint and Notice of Investigation.
ITC-337-TA-1359, Shenzhen Carku Technology Co., Ltd., Metasee LLC, Ace Farmer LLC, Gooloo Technologies LLC f/k/a Shenzhen Gooloo e-Commerce Co., Ltd., Hulkman LLC, Shenzhenshi Xinmeitemuxiangbao Zhuangyouxiangongsi's Response to the Amended Complaint and Notice of Investigation.
ITC-337-TA-1359, ChangShaHogMaoKai Kejiyouxiangongsi's Response to the Amended Complaint and Notice of Investigation.
ITC-337-TA-1359, Order No. 20: Construing Certain Terms of the Asserted Claims of the Patents at Issue.
ITC-337-TA-1359, Complainant's Opening Markman Brief.
ITC-337-TA-1359, Complainant Noco's Prehearing Brief.
ITC-337-TA-1359, Final Initial Determination on Violation of Section 337.
ITC-337-TA-1359, Joint Claim Construction Statement, Sep. 15, 2023.
ITC-337-TA-1359, Joint Claim Construction Statement, Nov. 1, 2023.
ITC-337-TA-1359, Noco's Markman Presentation.
ITC-337-TA-1359, Notice of Commission Determination Not to Review an Initial Determination Terminating the Investigation as to Two Asserted Patents.
ITC-337-TA-1359, Prior Art Identification, Part 1.
ITC-337-TA-1359, Prior Art Identification, Part 2.
ITC-337-TA-1359, Verified Complaint of The Noco Company Under Section 337 of the Tariff Act of 1930, As Amended.
ITC-337-TA-1359, Amended Complaint of The Noco Company Under Section 337 of the Tariff Act of 1930, As Amended.
ITC-337-TA-1359, Respondents' Joint Notice of Prior Art.
ITC-337-TA-1359, Respondents' Opening Claim Construction Brief, Public Version.
ITC-337-TA-1359, Respondents' Post-Hearing Brief, Public Version.
ITC-337-TA-1359, Respondents' Post-Hearing Reply Brief, Public Version.

(56) References Cited

OTHER PUBLICATIONS

ITC-337-TA-1359, Respondents' Pre-Hearing Brief, Public Version.
ITC-337-TA-1359, Respondents' Rebuttal Claim Construction Brief.
ITC-337-TA-1359, Second Amended Complaint of The Noco Company Under Section 337 of the Tariff Act of 1930, as Amended.
ITC-337-TA-1359, Shenzhen Konghui Trading Co., Ltd.'s Response to the Second Amended Complaint and Notice of Investigation.
ITC-337-TA-1359, Shenzhenshi Daosishangmao Youxiangongsi's Response to the Second Amended Complaint and Notice of Investigation.
ITC-337-TA-1359, Commission Investigative Staff's Initial Markman Brief.
ITC-337-TA-1359, Commission Investigative Staff's Initial Post-Hearing Brief, Public Version.
ITC-337-TA-1359, Commission Investigative Staff's Markman Hearing Presentation.
ITC-337-TA-1359, Commission Investigative Staff's Post-Hearing Reply Brief, Public Version.
ITC-337-TA-1359, Commission Investigative Staff's Pre-Hearing Brief, Public Version.
ITC-337-TA-1359, Commission Investigative Staff's Rebuttal Markman Brief.
ITC-337-TA-1359, Response of Winplus North America, Inc., Winplus NA, LLC, ADC Solutions Auto LLC (d/b/a Type S), and Shenzhen Pinwang Industry Co. Ltd. to the Second Amended Complaint and Notice of Investigation.
ITC-337-TA-1359, Response of Winplus North America, Inc., Winplus NA, LLC, ADC Solutions Auto, LLC (d/b/a Type S), and Shezhen Pinwang industry Co. Ltd. to the Amended Complaint and Notice of Investigation.
PTAB, IPR2024-00577, Corrected Petition for Inter Partes Review of U.S. Pat. No. 11,447,023 Under 35 U.S.C. § 311-319 and 37 C.F.R. § 42.
PTAB, IPR2024-00577, Declaration of C. Arthur MacCarley, Ph.D., P.E. in Support of Petition for Inter Partes Review of U.S. Pat. No. 11,447,023.
PTAB, IPR2024-00577, Patent Owner's Preliminary Response.
PTAB, IPR2024-00671, Petition for Inter Partes Review of U.S. Pat. No. 11,584,243 Under 35 U.S.C. § 311-319 and 37 C.F.R. § 42.
PTAB, IPR2024-00671, Declaration of C. Arthur MacCarley, Ph.D., P.E. in Support of Petition for Inter Partes Review of U.S. Pat. No. 11,584,243.
PTAB, IPR2024-00671, Ex. 1006, U.S. Pat. No. 9,391,467.
PTAB, IPR2024-00671, Ex. 1009, U.S. Pat. No. 9,219,372.
PTAB, IPR2024-00671, Ex. 1012, Xysemi; 1.2MHZ, 26V Step-up DC/DC Converter (Datasheet for XR3403).
PTAB, IPR2024-00671, Ex. 1016, U.S. Publication 2013/0285596.
PTAB, IPR2024-00671, Ex. 1017, U.S. Pat. No. 9,035,599.
PTAB, IPR2024-00671, Ex. 1024, Declaration of Jeffrey L. Ravencraft of USB Implementers Forum, Inc. (ITC-337-TA-1359).
PTAB, IPR2024-00671, Ex. 1025, Battery Charging Specification, Revision 1.0, Mar. 8, 2007.
PTAB, IPR2024-00671, Ex. 1026, Deposition of Bryan A. Legates, Sep. 25, 2023.
PTAB, IPR2024-00671, Ex. 1027, Respondents' Subpoena Ad Testificanum to Bryan Legates (ITC-337-TA-1359).
PTAB, IPR2024-00671, Ex. 1029, Brents, Automotive Electronics Drive That Need for Circuit Protection, May 7, 2014.
PTAB, IPR2024-00671, Ex. 1030, Healey, Newest VW Lacks USB, only iPhones Welcome, Jul. 8, 2014.
PTAB, IPR2024-00671, Ex. 1032, U.S. Publication 2014/0139175.
PTAB, IPR2024-00671, Ex. 1033, U.S. Publication 2007/0285049.
PTAB, IPR2024-00671, Ex. 1034, U.S. Publication 2010/0301800.
PTAB, IPR2024-00671, Ex. 1035, WIPO Publication WO 2008/106447.
PTAB, IPR2024-00671, Ex. 1036, U.S. Publication 2002/0193015.
PTAB, IPR2024-00671, Ex. 1037, U.S. Publication 2005/0170699.
PTAB, IPR2024-00671, Ex. 1038, U.S. Pat. No. 9,368,966.
PTAB, IPR2024-00671, Ex. 1039, U.S. Publication 2013/0257346.
PTAB, IPR2024-00671, Ex. 1040, U.S. Pat. No. 9,954,391.
PTAB, IPR2024-00671, Ex. 1041, U.S. Publication 2007/0108940.
PTAB, IPR2024-00671, Ex. 1042, U.S. Publication 2013/0241496.
PTAB, IPR2024-00671, Ex. 1043, WIPO Publication WO 2001/091208.
PTAB, IPR2024-00671, Patent Owner's Preliminary Response.
German Patent Office, Federal Patent Court, *The NOCO Company v. Shenzhen CARKU Technology Co., Ltd.* and others, Opinion, Aug. 22, 2024.
PTAB, IPR2024-00577, Decision.
PTAB, IPR2024-00671, Decision.
PTAB, IPR2024-01219, Petition for Inter Partes Review of U.S. Pat. No. 11,667,203 Under 35 U.S.C. § 311-319 and 37 C.F.R. § 42.
PTAB, IPR2024-01219, Ex. 1003, Declaration of C. Arthur MacCarley, Ph.D., E.E. in Support of Petition for Inter Partes Review of U.S. Pat. No. 11,667,203.
PTAB, IPR2024-01219, Ex. 1010, U.S. Publication 2004/0130298.
PTAB, IPR2024-01219, Ex. 1011, U.S. Publication 2013/0241488.
PTAB, IPR2024-01219, Ex. 1012, Carku—E-Power-20B Datasheet.
PTAB, IPR2024-01219, Ex. 1013, Carku—E-Power-21 Datasheet.
PTAB, IPR2024-01219, Ex. 1014, Declaration of Xingliang (Leon) Lei, IPR2020-00944.
PTAB, IPR2024-01219, Ex. 1015, Deposition of Xiangliang Lei, Mar. 26, 2021, IPR2020-00944.
PTAB, IPR2024-01219, Ex. 1016, U.S. Publication 2013/0285596.
PTAB, IPR2024-01219, Ex. 1017, U.S. Pat. No. 9,035,599.
PTAB, IPR2024-01219, Ex. 1018, CN Patent 202512152.
PTAB, IPR2024-01219, Ex. 1019, Certified English Translation of CN Patent 202512152.
PTAB, IPR2024-01219, Ex. 1020, CN Patent 201226449.
PTAB, IPR2024-01219, Ex. 1021, Certified English Translation of CN Patent 201226449.
PTAB, IPR2024-01219, Ex. 1022, CN Patent 203788026.
PTAB, IPR2024-01219, Ex. 1023, Certified English Translation of CN Patent 203788026.
PTAB, IPR2024-01219, Ex. 1024, Declaration of Jeffrey L. Ravencraft of USB Implementers Forum, Inc., 337-TA-1359.
PTAB, IPR2024-01219, Ex. 1025, Battery Charging Specification, Revision 1.0, Mar. 8, 2007.
PTAB, IPR2024-01219, Ex. 1026, Deposition of Bryan A. Legates, Sep. 25, 2023, 337-TA-1359.
PTAB, IPR2024-01219, Ex. 1027, Bryan Legates, Current-Limited DC/DC Converter Simplifies USB Power Supplies.
PTAB, IPR2024-01219, Ex. 1029, Xysemi, XR3403, 1.2MHz, 26V Step-Up DC/DC Converter.
PTAB, IPR2024-01219, Ex. 1031, Electronic Design, Automotive Electronics Drive The Need for Circuit Protection, May 7, 2014.
PTAB, IPR2024-01219, Ex. 1032, Healey, Newest VW Lacks USB, only iPhones Welcome, Jul. 8, 2014.
PTAB, IPR2024-01219, Ex. 1036, U.S. Pat. No. 5,793,185.
PTAB, IPR2024-01219, Ex. 1040, U.S. Pat. No. 9,954,391.
PTAB, IPR2024-01219, Ex. 1041, U.S. Publication 2007/0108940.
PTAB, IPR2024-01219, Ex. 1042, Frontier Economics, The Development of the USB Standard, An Interoperability Case Study.
PTAB, IPR2024-01219, Ex. 1043, Wikipedia, Universal Serial Bus (USB).
PTAB, IPR2024-01219, Ex. 1044, Disk Manufacturer, USB Versions Differences and Development History.
PTAB, IPR2024-01219, Ex. 1045, Wikipedia, Boost Converter.
PTAB, IPR2024-01219, Ex. 1046, U.S. Pat. No. 4,451,743.
PTAB, IPR2024-01219, Ex. 1049, Bruzek, Chevrolet, GMC Pack USB Ports Into 2014 Pickups, Sep. 9, 2013.
PTAB, IPR2024-01219, Ex. 1050, Sherman, The Basics of USB Battery Charging: A Survival Guide, Dec. 9, 2010.
PTAB, IPR2024-01219, Ex. 1052, Wayback Machine, Bestbuy.com USB Chargers, Jun. 15, 2012.
PTAB, IPR2024-01219, Ex. 1053, Declaration of Yunghun Wan.

\* cited by examiner

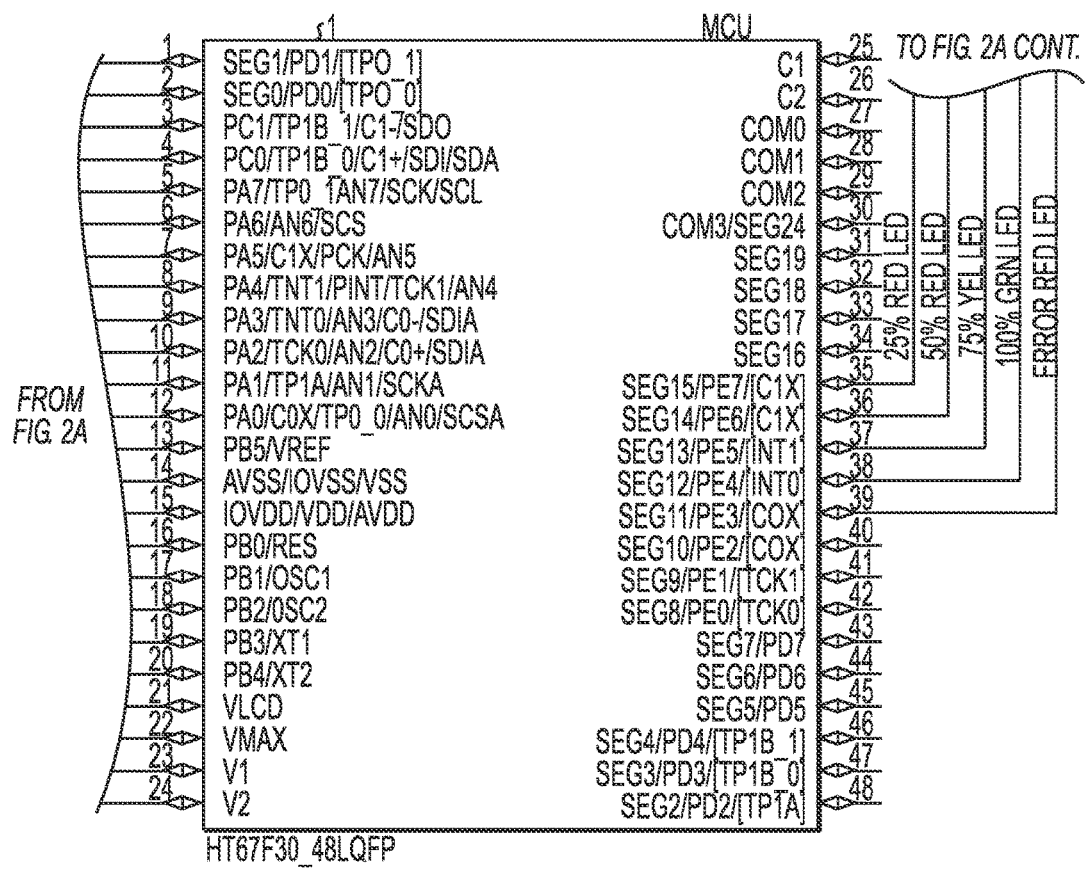
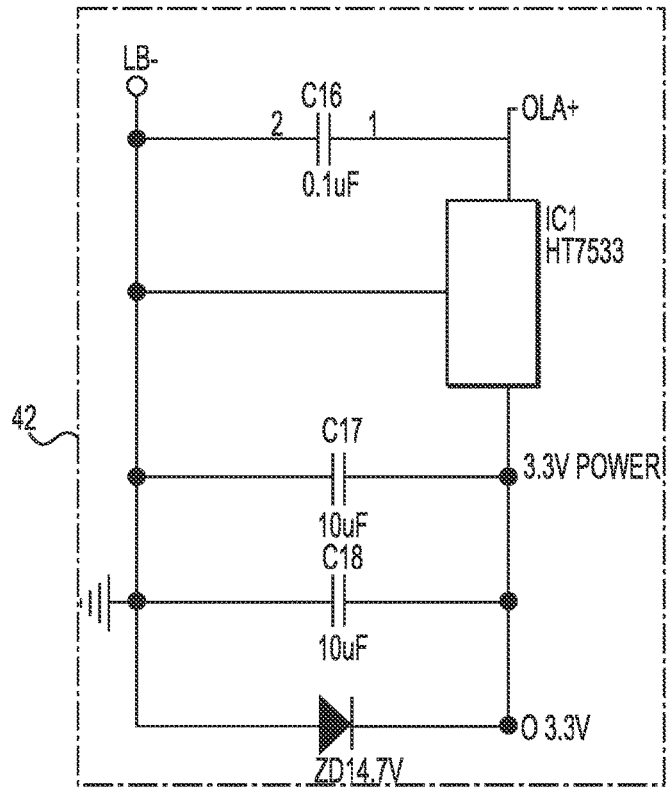
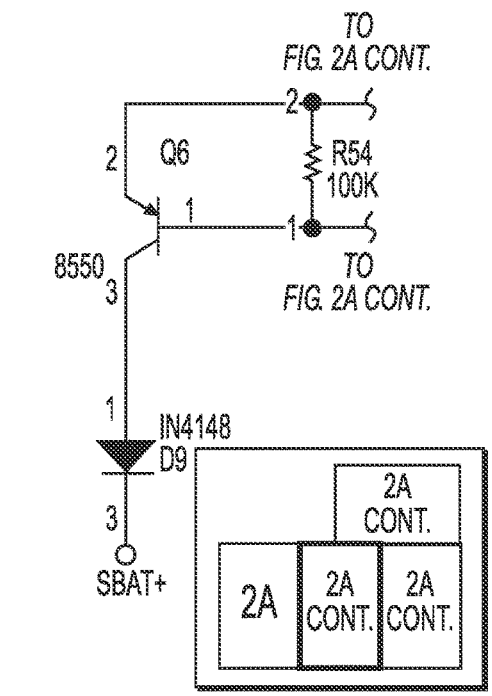
*FIG. 2A CONT.*

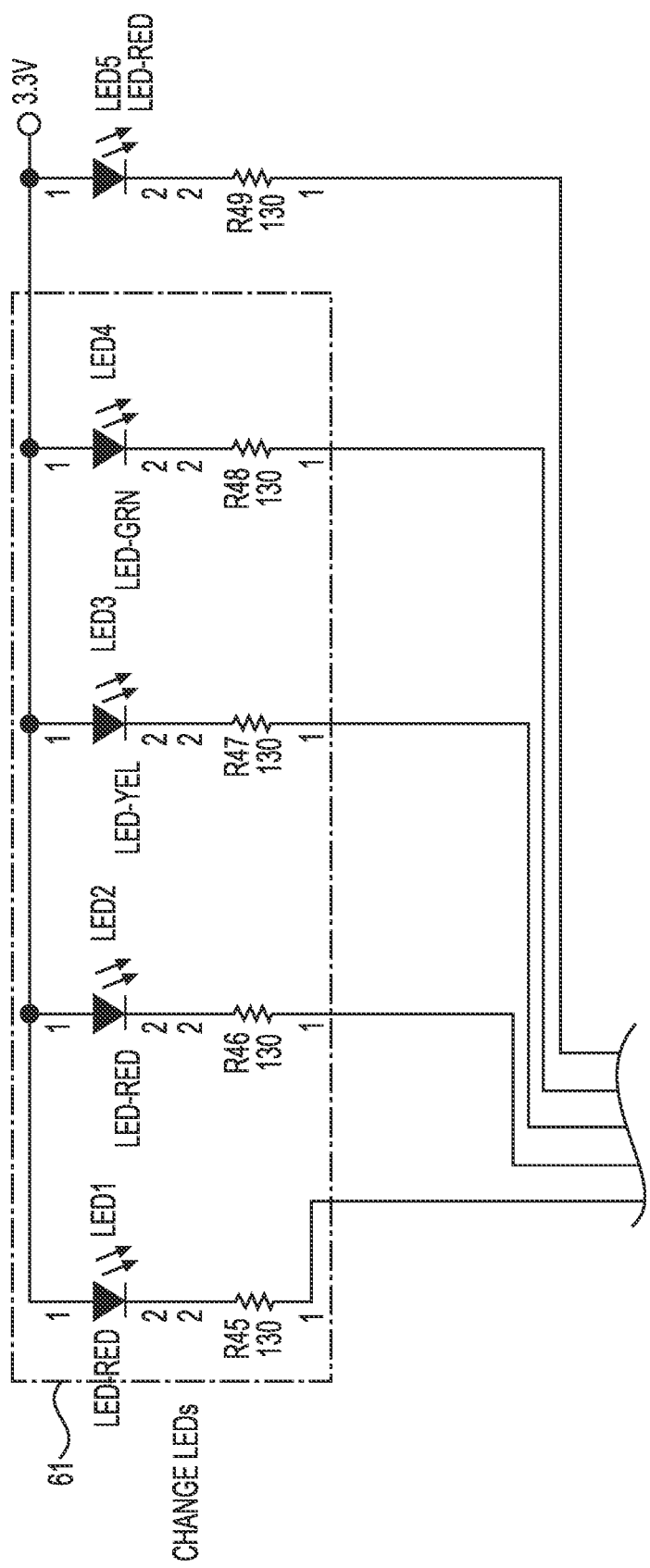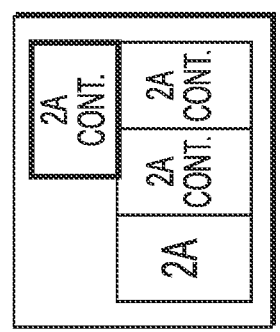
FIG. 2A CONT.

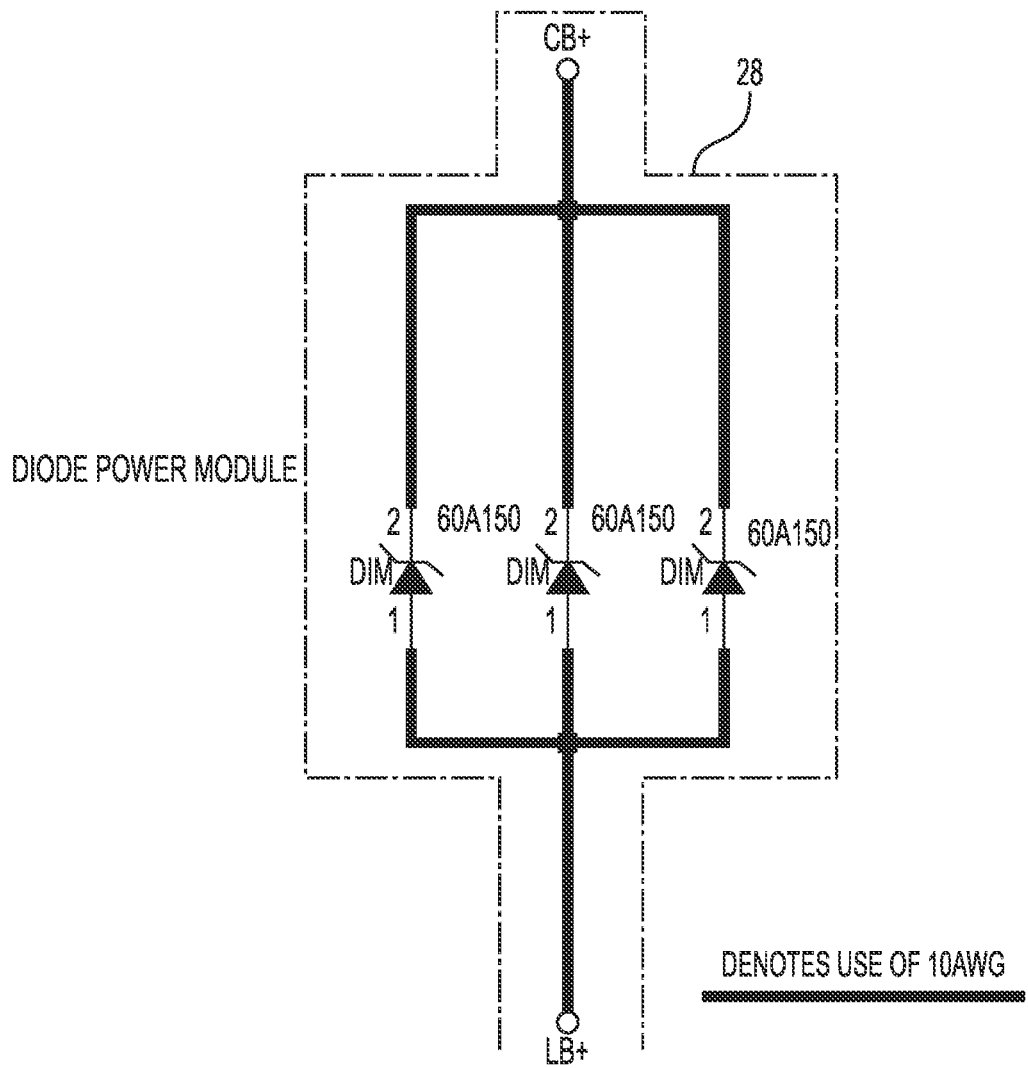
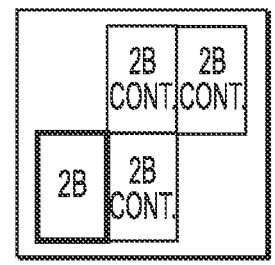
FIG. 2B

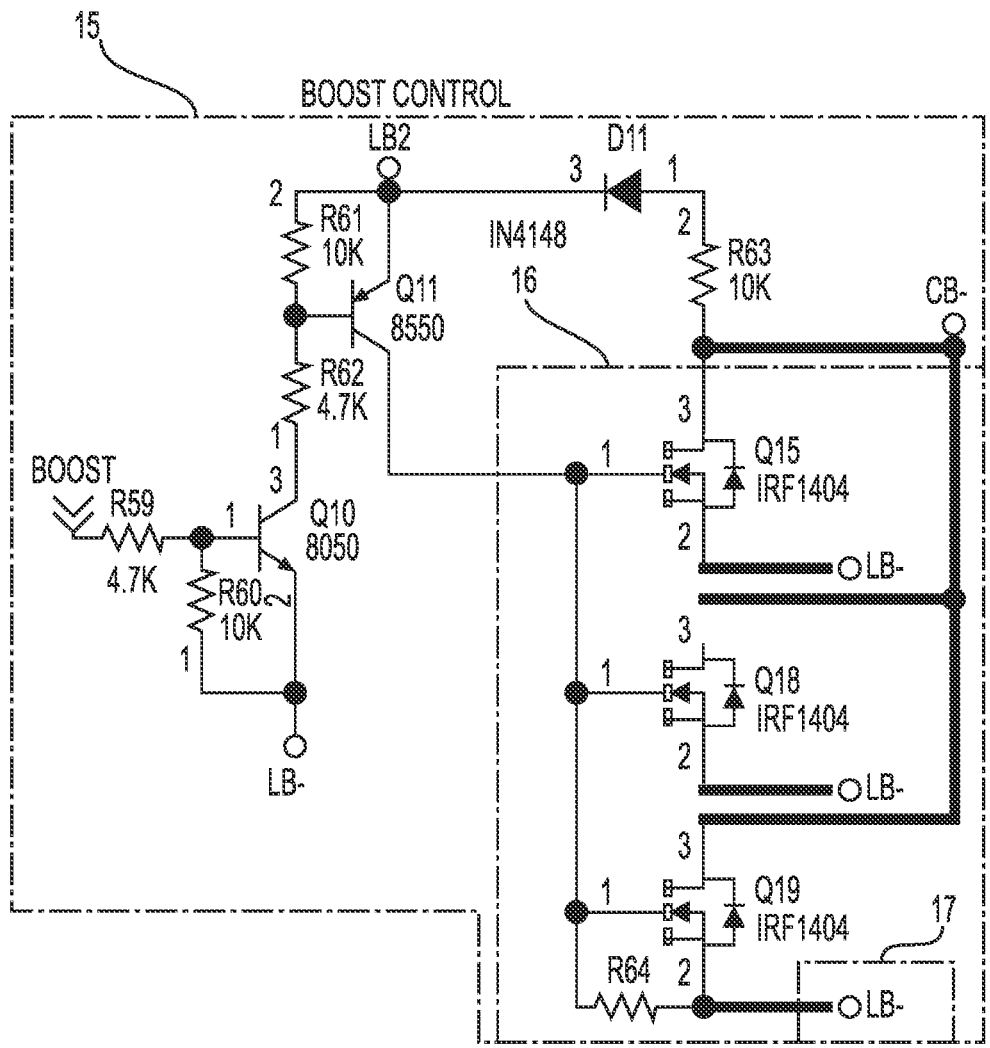
FIG. 2B CONT.
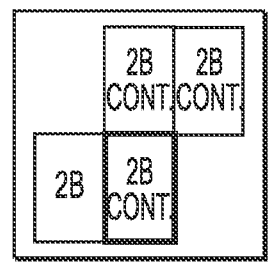

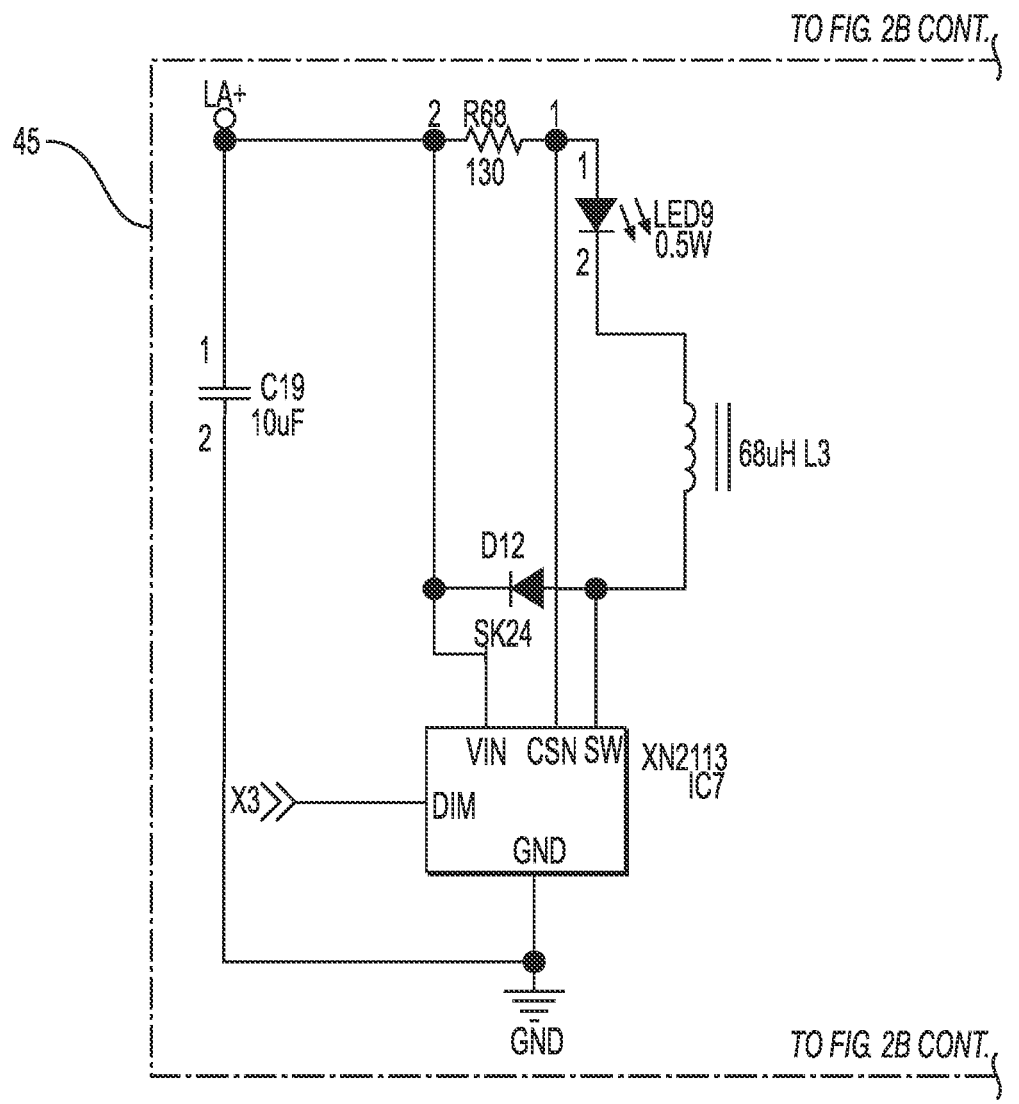
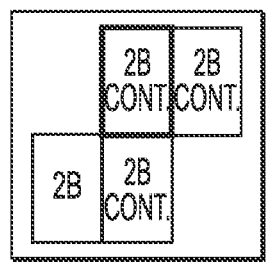
FIG. 2B CONT.

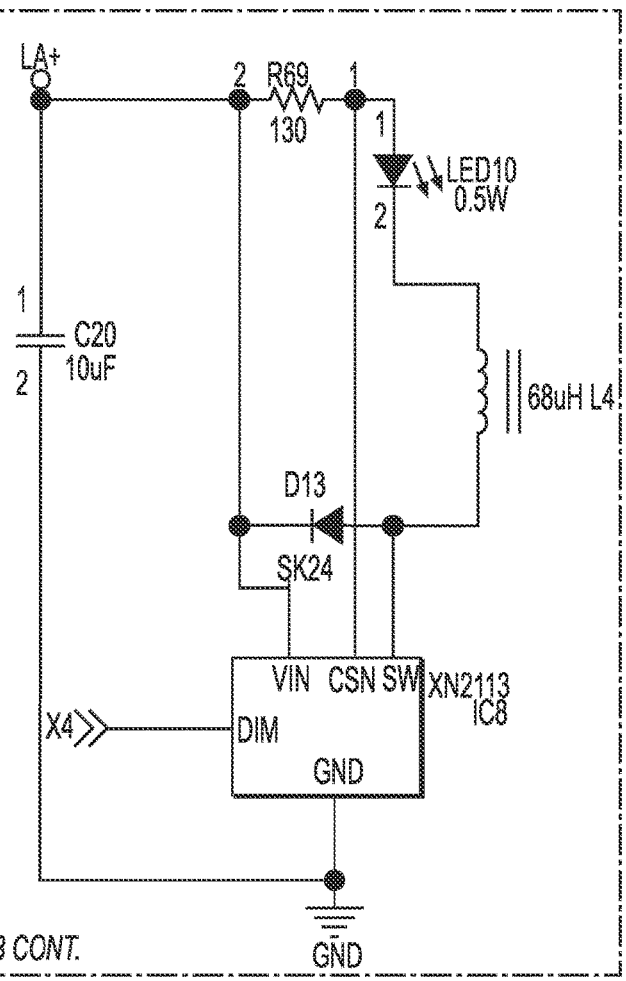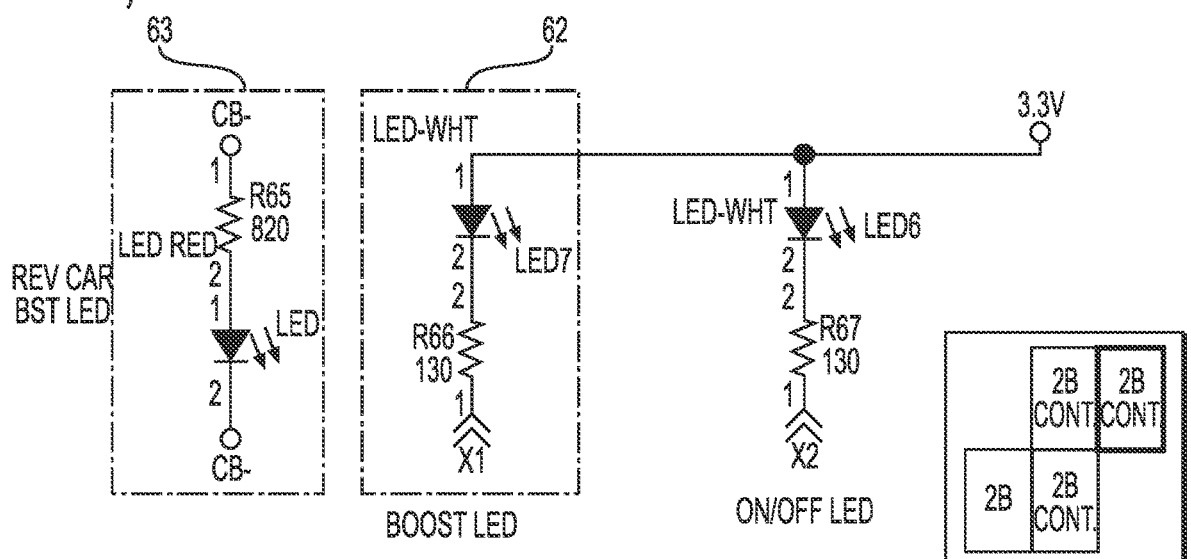
FIG. 2B CONT.

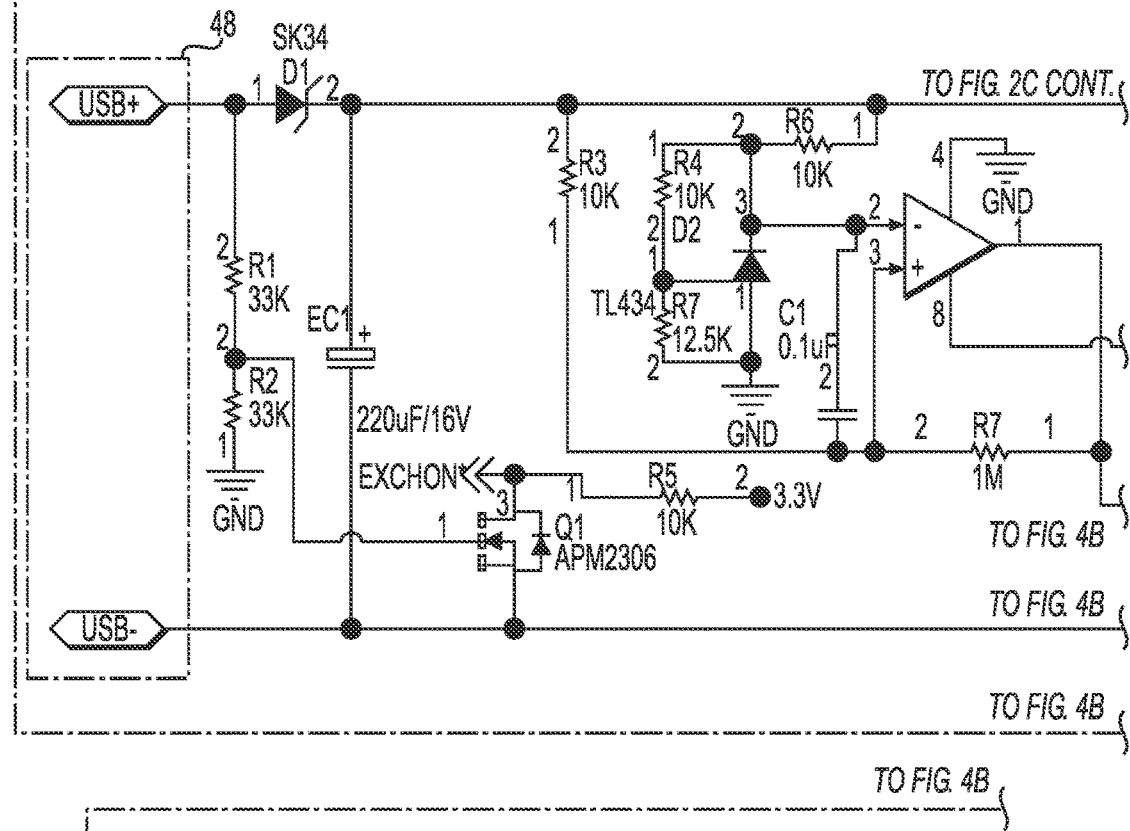
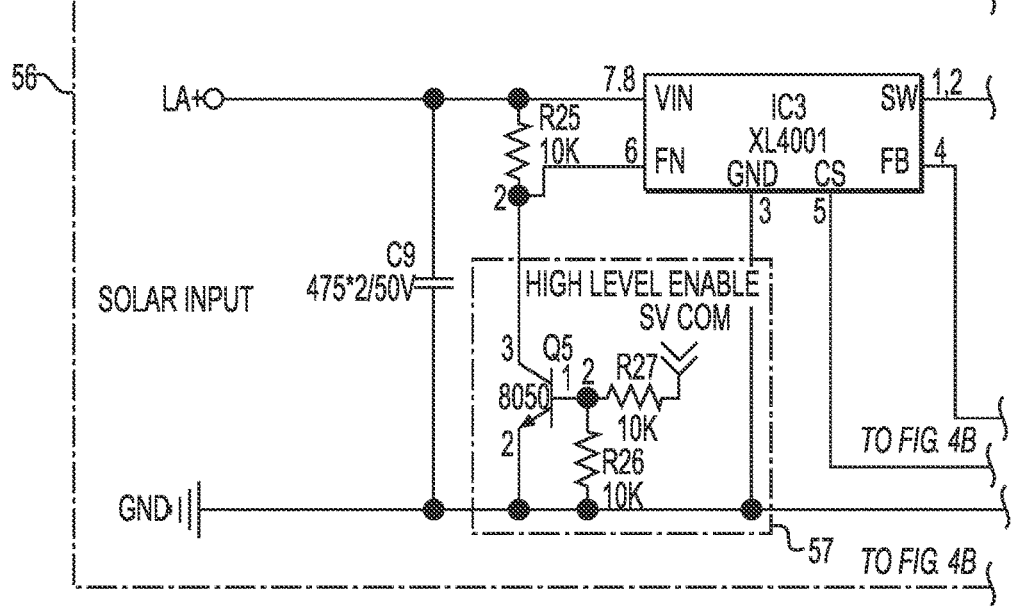
FIG. 2C

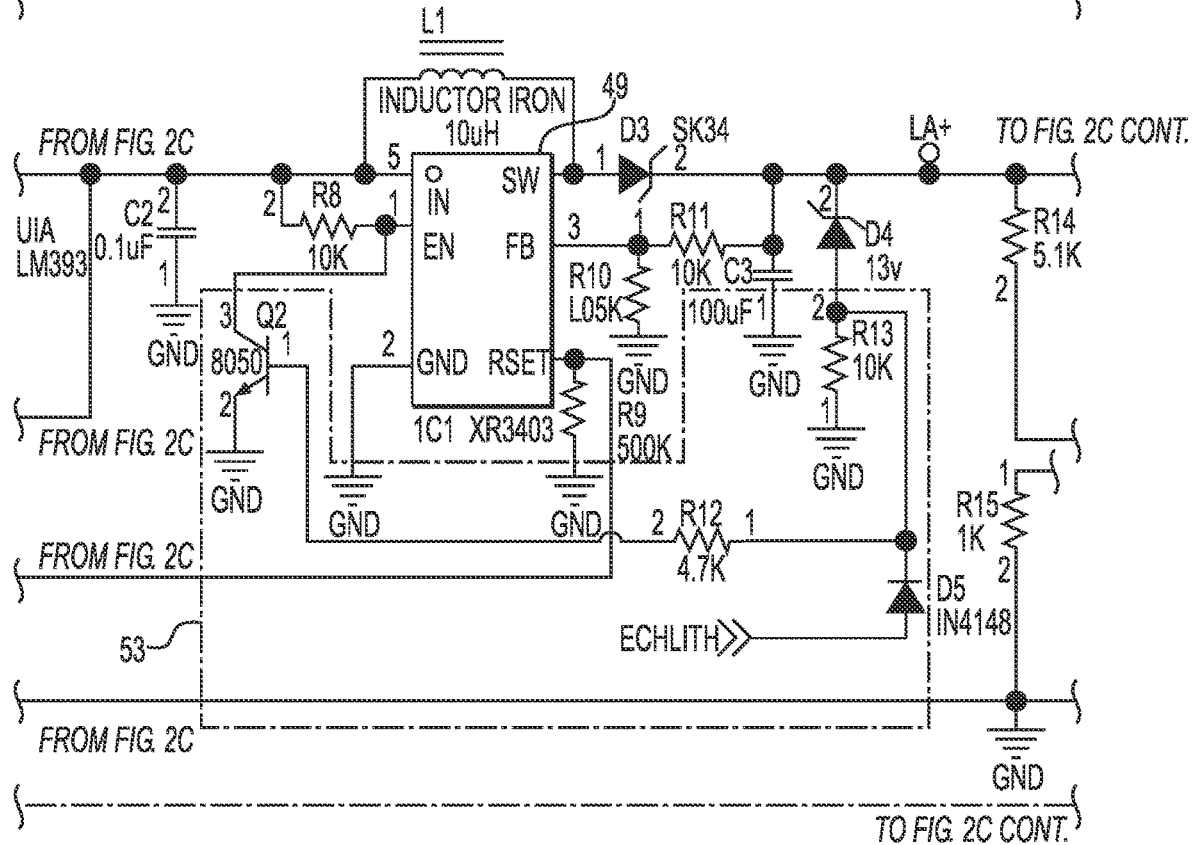
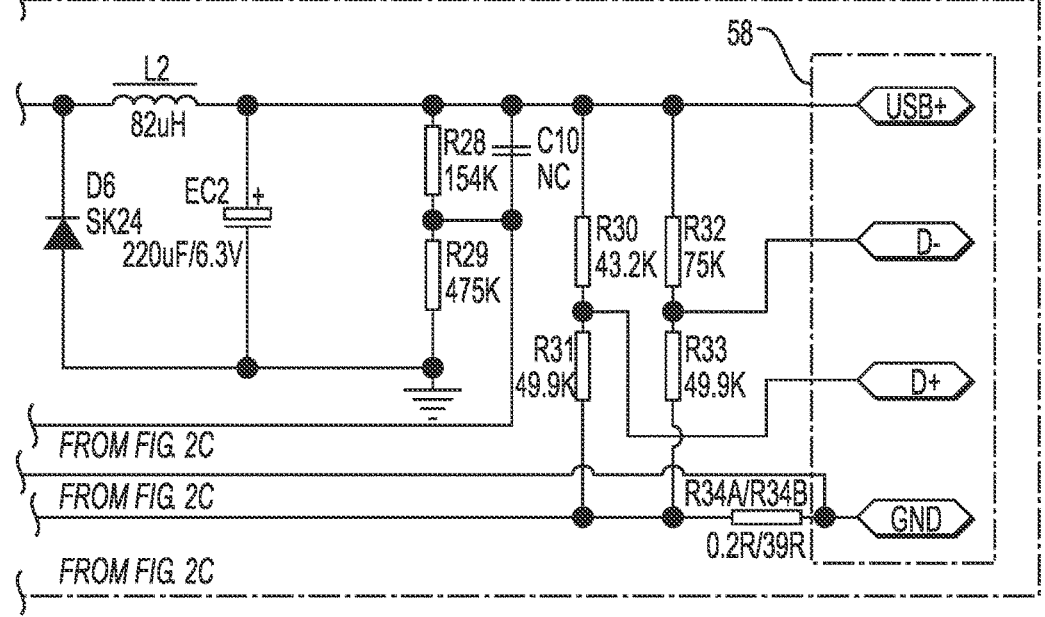
FIG. 2C CONT.
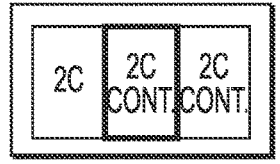

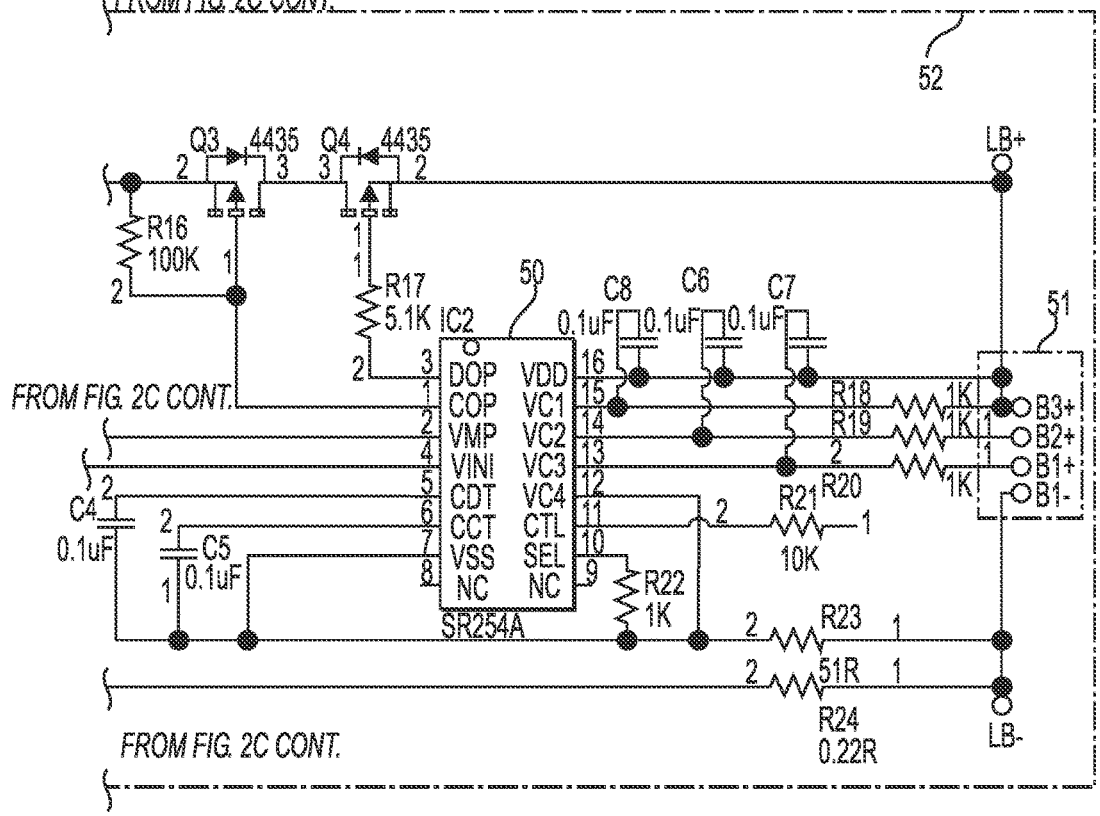
FIG. 2C CONT.
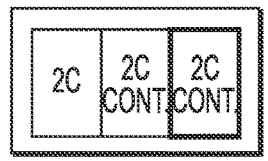

JUMP STARTING APPARATUS

RELATED APPLICATIONS

This application is a continuation of U.S. patent application Ser. No. 17/066,100, filed Oct. 8, 2020, which is a continuation of U.S. patent application Ser. No. 16/101,020, filed Aug. 10, 2018 (now U.S. Pat. No. 11,458,851), which is a continuation-in-part (CIP) of U.S. patent application Ser. No. 15/691,884 filed Aug. 31, 2017 (now U.S. Pat. No. 10,604,024), which is a continuation of Ser. No. 14/619,655 filed Feb. 11, 2015 (now U.S. Pat. No. 9,770,992 issued on Sep. 26, 2017), which is a division of Ser. No. 14/325,938 filed Jul. 8, 2014 (now U.S. Pat. No. 9,007,015 issued on Apr. 14, 2015), which is a continuation of PCT/US2014/045434 filed Jul. 3, 2014. U.S. application Ser. No. 16/101,020 is also a continuation-in-part (CIP) of U.S. patent application Ser. No. 15/989,005 filed May 24, 2018, which is a continuation of PCT/US2017/017289 filed Feb. 10, 2017, which claims priority from U.S. Provisional Application No. 62/294,067 filed Feb. 11, 2016, claims priority to PCT/US2016/024680 filed Mar. 29, 2016, is a continuation-in-part (CIP) of U.S. patent application Ser. No. 15/137,626 filed on Apr. 25, 2016, and claims priority from U.S. Provisional Application No. 62/424,297 filed Nov. 18, 2016. Each of these priority applications are incorporated by reference herein in their entirety.

BACKGROUND

The present invention relates generally to apparatus for jump-starting a vehicle having a depleted or discharged vehicle battery. Prior art devices are known, which provide either a pair of electrical connector cables that connect a fully-charged battery of another vehicle to the engine start circuit of the depleted or discharge vehicle battery, or portable booster devices which include a fully-charged battery which can be connected in circuit with the vehicle's engine starter through a pair of cables.

Problems with the prior art arose when either the jumper terminals or clamps of the cables were inadvertently brought into contact with each other while the other ends were connected to a charged battery, or when the positive and negative terminals were connected to the opposite polarity terminals in the vehicle to be jumped, thereby causing a short circuit resulting in sparking and potential damage to batteries and/or bodily injury.

Various attempts to eliminate these problems have been made in the prior art.

U.S. Pat. No. 6,212,054 issued Apr. 3, 2001, discloses a battery booster pack that is polarity sensitive and can detect proper and improper connections before providing a path for electric current flow. The device uses a set of LEDs connected to optical couplers oriented by a control circuit. The control circuit controls a solenoid assembly controlling the path of power current. The control circuit causes power current to flow through the solenoid assembly only if the points of contact of booster cable clamp connections have been properly made.

U.S. Pat. No. 6,632,103 issued Oct. 14, 2003, discloses an adaptive booster cable connected with two pairs of clips, wherein the two pairs of clips are respectively attached to two batteries to transmit power from one battery to the other battery. The adaptive booster cable includes a polarity detecting unit connected to each clip, a switching unit and a current detecting unit both provided between the two pairs of clips. After the polarity of each clip is sensed by the polarity detecting unit, the switching unit generates a proper connection between the two batteries. Therefore, the positive and negative terminals of the two batteries are correctly connected based on the detected result of the polarity detecting unit.

U.S. Pat. No. 8,493,021 issued Jul. 23, 2013, discloses apparatus that monitors the voltage of the battery of a vehicle to be jump started and the current delivered by the jump starter batteries to determine if a proper connection has been established and to provide fault monitoring. Only if the proper polarity is detected can the system operate. The voltage is monitored to determine open circuit, disconnected conductive clamps, shunt cable fault, and solenoid fault conditions. The current through the shunt cable is monitored to determine if there is a battery explosion risk, and for excessive current conditions presenting an overheating condition, which may result in fire. The system includes an internal battery to provide the power to the battery of the vehicle to be jump started. Once the vehicle is started, the unit automatically electrically disconnects from the vehicle's battery.

U.S. Pat. No. 5,189,359 issued Feb. 23, 1993, discloses a jumper cable device having two bridge rectifiers for developing a reference voltage, a four-input decoder for determining which terminals are to be connected based on a comparison of the voltage at each of the four terminals to the reference voltage, and a pair of relays for effecting the correct connection depending on the determination of the decoder. No connection will be made unless only one terminal of each battery has a higher voltage than the reference voltage, indicating "positive" terminals, and one has a lower voltage than the reference voltage, indicating "negative" terminals, and that, therefore, the two high voltage terminals may be connected and the two lower voltage terminals may be connected. Current flows once the appropriate relay device is closed. The relay device is preferably a MOSFET combined with a series array of photodiodes that develop MOSFET gate-closing potential when the decoder output causes an LED to light.

U.S. Pat. No. 5,795,182 issued Aug. 18, 1998, discloses a polarity independent set of battery jumper cables for jumping a first battery to a second battery. The apparatus includes a relative polarity detector for detecting whether two batteries are configured cross or parallel. A three-position high current capacity crossbar pivot switch is responsive to the relative polarity detector for automatically connecting the plus terminals of the two batteries together and the minus terminals of the two batteries together regardless of whether the configuration detected is cross or parallel, and an under-current detector and a delay circuit for returning the device to its ready and unconnected state after the device has been disconnected from one of the batteries. The crossbar pivot switch includes two pairs of contacts, and a pivot arm that pivots about two separate points to ensure full electrical contact between the pairs of contacts. The invention can also be used to produce a battery charger that may be connected to a battery without regard to the polarity of the battery.

U.S. Pat. No. 6,262,492 issued Jul. 17, 2001, discloses a car battery jumper cable for accurately coupling an effective power source to a failed or not charged battery, which includes a relay switching circuit connected to the power source and the battery by two current conductor pairs. First and second voltage polarity recognition circuits are respectively connected to the power source and the battery by a respective voltage conductor pair to recognize the polarity of the power source and the battery. A logic recognition circuit produces a control signal subject to the polarity of the power source and the battery, and a driving circuit controlled by the control signal from the logic recognition circuit drives the relay switching circuit, enabling the two poles of the power source to be accurately coupled to the two poles of the battery.

U.S. Pat. No. 5,635,817 issued Jun. 3, 1997, discloses a vehicle battery charging device that includes a control housing having cables including a current limiting device to prevent exceeding of a predetermined maximum charging current of about 40 to 60 amps. The control housing includes a polarity detecting device to verify the correct polarity of the connection of the terminals of the two batteries and to electrically disconnect the two batteries if there is an incorrect polarity.

U.S. Pat. No. 8,199,024 issued Jun. 12, 2012, discloses a safety circuit in a low-voltage connecting system that leaves the two low-voltage systems disconnected until it determines that it is safe to make a connection. When the safety circuit determines that no unsafe conditions exist and that it is safe to connect the two low-voltage systems, the safety circuit may connect the two systems by way of a "soft start" that provides a connection between the two systems over a period of time that reduces or prevents inductive voltage spikes on one or more of the low-voltage systems. When one of the low-voltage systems has a completely-discharged battery incorporated into it, a method is used for detection of proper polarity of the connections between the low-voltage systems. The polarity of the discharged battery is determined by passing one or more test currents through it and determining whether a corresponding voltage rise is observed.

U.S. Pat. No. 5,793,185 issued Aug. 11, 1998, discloses a hand-held jump starter having control components and circuits to prevent overcharging and incorrect connection to batteries.

While the prior art attempted solutions to the abovementioned problems as discussed above, each of the prior art solutions suffers from other shortcomings, either in complexity, cost or potential for malfunction. Accordingly, there exists a need in the art for further improvements to vehicle jump start devices.

Further, there exists a portable vehicle battery jump start apparatus as disclosed in U.S. Pat. No. 9,007,015 to Nook et al. The apparatus utilizes a lithium ion battery pack. In this type of apparatus, there exists a need to maximize conductivity from the battery pack to the vehicle battery of the vehicle being jump started.

For successful car jump-starts, there are two main factors dictating the results. The first factor is the amount of power provided by the lithium ion battery pack, and the second factor is the maximum conductivity. You need both factors to have the best chance to jump-start big engines. One factor without the other factor is not enough.

SUMMARY

In accordance with an aspect of the invention, apparatus is provided for jump starting a vehicle engine, including: an internal power supply; an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs; a power FET switch connected between said internal power supply and said output port; and a microcontroller configured to receive input signals from said vehicle isolation sensor and said reverse polarity sensor, and to provide an output signal to said power FET switch, such that said power FET switch is turned on to connect said internal power supply to said output port in response to signals from said sensors indicating the presence of a vehicle battery at said output port and proper polarity connection of positive and negative terminals of said vehicle battery with said positive and negative polarity outputs.

In accordance with another aspect of the invention, the internal power supply is a rechargeable lithium ion battery pack.

In accordance with yet another aspect of the invention, a jumper cable device is provided, having a plug configured to plug into an output port of a handheld battery charger booster device having an internal power supply; a pair of cables integrated with the plug at one respective end thereof; said pair of cables being configured to be separately connected to terminals of a battery at another respective end thereof.

The presently described subject matter is directed to a battery device, for example, a battery connector, battery connector arrangement, or battery conductor assembly for use in a device for jump starting a vehicle, and a device for jump starting a vehicle comprising the battery connector device.

The presently described subject matter is directed to a battery connector device comprising or consisting of a battery having at least one battery conductor connected to a terminal of the battery.

The presently described subject matter is directed to a battery connector device comprising or consisting of a battery having at least one battery conductor or cable connected to a battery tab of the battery.

The presently described subject matter is directed to a battery connector device comprising or consisting of a battery having a positive conductor and a negative conductor connected to the battery.

The presently described subject matter is directed to a battery connector device comprising or consisting of a battery having a positive conductor plate and/or a negative conductor plate connected to the battery.

The presently described subject matter is directed to a battery connector device comprising or consisting of a battery having a positive conductor plate and/or a negative conductor plate connected to the battery, and a positive cable connected to the positive conductor plate and/or a negative cable connected to the negative conductor plate.

The presently described subject matter is directed to a battery connector device comprising or consisting of a battery having a positive battery conductor connected to a positive terminal of the battery and/or a negative battery conductor connected to a negative terminal of the battery.

The presently described subject matter is directed to a battery connector device comprising or consisting of a battery having a positive battery conductor connected to a positive terminal contact of the battery and/or a negative battery conductor connected to a negative terminal contact of the battery, the battery conductors being soldered to the respective terminals of the battery.

The presently described subject matter is directed to a battery connector device comprising or consisting of a battery having a positive battery conductor connected to a positive terminal of the battery and/or a negative battery conductor connected to a negative terminal contact of the battery, and a relay connected to one of the battery conductors of the battery.

The presently described subject matter is directed to a battery connector device comprising or consisting of a battery having a positive battery conductor connected to a positive terminal contact of the battery and/or a negative battery conductor connected to a negative terminal contact of the battery, and a relay connected to the negative battery conductor.

The presently described subject matter is directed to a battery connector device comprising or consisting of a battery having a positive battery conductor connected to a positive terminal contact of the battery and/or a negative battery conductor connected to a negative terminal contact of the battery, and a relay connected to the negative battery conductor.

The presently described subject matter is directed to a battery connector device comprising or consisting of a battery having a positive battery conductor connected to a positive terminal contact of the battery and/or a negative battery conductor connected to a negative terminal contact of the battery, and multiple relays connected to the negative battery conductor.

The presently described subject matter is directed to a battery connector device comprising or consisting of a battery having a positive battery conductor connected to a positive terminal contact of the battery and/or a negative battery conductor connected to a negative terminal contact of the battery, and a positive cable connected to the positive battery conductor.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the output of the jump starting apparatus to the vehicle battery is provided by the connection between the positive battery terminal connector and the positive terminal of the vehicle battery and the connection between the negative battery terminal connector and the negative terminal of the vehicle battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the positive battery terminal connector is a positive battery clamp releasably connectable to the positive terminal of the vehicle battery, and wherein the negative battery terminal connector is a negative battery clamp releasably connectable to the negative terminal of the vehicle battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the positive battery terminal connector is a positive ring terminal connected to an end of the positive battery cable and configured to connect with a positive battery clamp connectable to the positive terminal of the vehicle battery or directly to the positive terminal itself of the vehicle battery, and wherein the negative battery terminal connector is a negative ring terminal connected to an end of the negative battery cable and configured to connect with a negative battery clamp connectable to the negative terminal of the vehicle battery or directly to the negative terminal itself of the vehicle battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the lithium ion battery comprises a battery pack of multiple lithium ion batteries.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector;

a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the power switch is a FET switch.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the power switch is an FET switch, and wherein the FET switch comprises a plurality of FETs in parallel.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the vehicle isolation sensor and reverse polarity sensor comprise optically coupled isolator phototransistors.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, further comprising a plurality of power diodes coupled between the output of the jump starting apparatus to the vehicle battery and the internal power supply to prevent back-charging of said internal power supply from an electrical system connected to said output port.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, further comprising a temperature sensor configured to detect temperature of said internal power supply and to provide a temperature signal to said microcontroller.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, further comprising a voltage measurement circuit configured to measure output voltage of said internal power supply and to provide a voltage measurement signal to said microcontroller.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, further comprising a voltage regulator configured to convert output voltage of said internal power supply to a voltage level appropriate to provide operating power to internal components of the apparatus.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, further comprising a manual override switch configured to activate a manual override mode to enable a user to connect jump start power to said output port when said vehicle battery isolation sensor is unable to detect presence of a vehicle battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, further comprising a manual override switch configured to activate a manual override mode to enable a user to connect jump start power to said output port when said vehicle battery isolation sensor is unable to detect presence of a vehicle battery, wherein said microcontroller is configured to detect actuation of said manual override switch for at least a predetermined period of time before activation of said manual override mode.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the positive battery cable and negative battery cable together form a jumper cable device comprising a plug connected to one of the cables and configured to plug into an output port on the battery jump starting apparatus.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the positive battery cable and negative battery cable together form a jumper cable device comprising a plug connected to one of the cables and configured to plug into an output port on the battery jump starting apparatus, wherein said output port and said plug are dimensioned so that the plug will fit into the output port only in one specific orientation.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, further comprising a separate tab connected to the positive tab of the at least one cell of the rechargeable battery to extend a length of the positive tab of the at least one cell of the rechargeable battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, wherein the positive tab wraps around and connects to the conductor of the positive cable.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, wherein the negative tab wraps around the negative conductor bar to electrically connect the at least one battery cell of the rechargeable battery to the negative conductor bar.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, wherein the conductor of the positive cable is soldered to the positive tab of the at least one battery cell of the rechargeable battery and the negative terminal conductor bar is soldered to the negative tab of the at least one battery cell of the rechargeable battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, wherein the rechargeable battery is rectangular-shaped, and the negative terminal conductor bar is L-shaped and wraps around a respective corner of the rechargeable battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, wherein the positive tab and the negative tab of the at least one battery cell of the rechargeable battery extend from opposite sides of the rechargeable battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, wherein the positive tab and negative tab of the at least one battery cell of the rechargeable battery extend along opposite edges along a width of the at least one battery cell of the rechargeable battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, further comprising a separate tab connected to the positive tab of the at least one cell of the rechargeable battery to extend a length of the positive tab of the at least one cell of the rechargeable battery, wherein the separate tab has a same width as the positive tab of the at least one battery cell of the rechargeable battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, further comprising a separate tab connected to the positive tab of the at least one cell of the rechargeable battery to extend a length of the positive tab of the at least one cell of the rechargeable battery, wherein the separate tab overlaps the positive tab of the at least one battery cell of the rechargeable battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, further comprising a separate tab connected to the positive tab of the at least one cell of the rechargeable battery to extend a length of the positive tab of the at least one cell of the rechargeable battery, further comprising another separate tab connected to the negative tab of the at least one cell of the rechargeable battery to extend a length of the negative tab of the at least one cell of the rechargeable battery.

The presently described subject matter is directed to a jump starting apparatus for jump starting a vehicle having a vehicle battery with a positive terminal and negative terminal, the apparatus comprising or consisting of an internal power supply; a positive battery cable having a positive battery terminal connector; a negative battery cable having a negative battery terminal connector; a vehicle battery isolation sensor connected in circuit with said positive battery terminal connector and the negative battery terminal connector, the vehicle battery isolation sensor configured to detect a presence of the vehicle battery connected between the positive battery terminal connector and the negative battery terminal connector; a reverse polarity sensor connected in circuit with the positive battery terminal connector and the negative battery terminal connector, the reverse polarity sensor configured to detect a polarity of the vehicle battery connected between the positive battery terminal connector and negative battery terminal connector and to provide an output signal indicating whether the positive terminal and the negative terminal of the vehicle battery are properly connected with the positive battery terminal connector and the negative battery terminal connector; a power switch connected between the internal power supply and an output of the jump starting apparatus to the vehicle battery; and a microcontroller configured to receive input signals from the vehicle isolation sensor and the reverse polarity sensor, and to provide an output signal to the power switch such that the power switch is turned on to cause the internal power supply to be connected to the vehicle battery in response to signals from the sensors indicating the presence of the vehicle battery connected between the positive battery terminal connector and the negative battery terminal connector and a proper polarity connection of positive terminal and the negative terminal of the vehicle battery with the positive battery terminal connector and the negative terminal connector, and is not turned on when signals from the sensors indicate either the absence of the vehicle battery connected between the positive battery terminal connector and the negative battery terminal connector or an improper polarity connection of the positive terminal and the negative terminal of the vehicle battery with the positive battery terminal connector and the negative battery terminal connector, wherein the internal power supply comprises a rechargeable battery, wherein the rechargeable battery comprises at least one battery cell having a positive tab and a negative tab, wherein the positive battery cable has a conductor connected to the positive tab of the at least one battery cell of the rechargeable battery; and wherein the negative tab of the at least one cell of the rechargeable battery is connected to a negative terminal conductor bar, further comprising a separate tab connected to the positive tab of the at least one cell of the rechargeable battery to extend a length of the positive tab of the at least one cell of the rechargeable battery, further comprising another separate tab connected to the negative tab of the at least one cell of the rechargeable battery to extend a length of the negative tab of the at least one cell of the rechargeable battery, wherein the another separate tab wraps more than one time around the negative conductor bar to enhance the electrical connection between the negative conductor bar and the negative tab of the at least one battery cell of the rechargeable battery.

BRIEF DESCRIPTION OF THE DRAWINGS

FIGS. 2A-2C are schematic circuit diagrams of an example embodiment of a handheld vehicle battery boost apparatus in accordance with an aspect of the invention;

DETAILED DESCRIPTION

Figure 1:
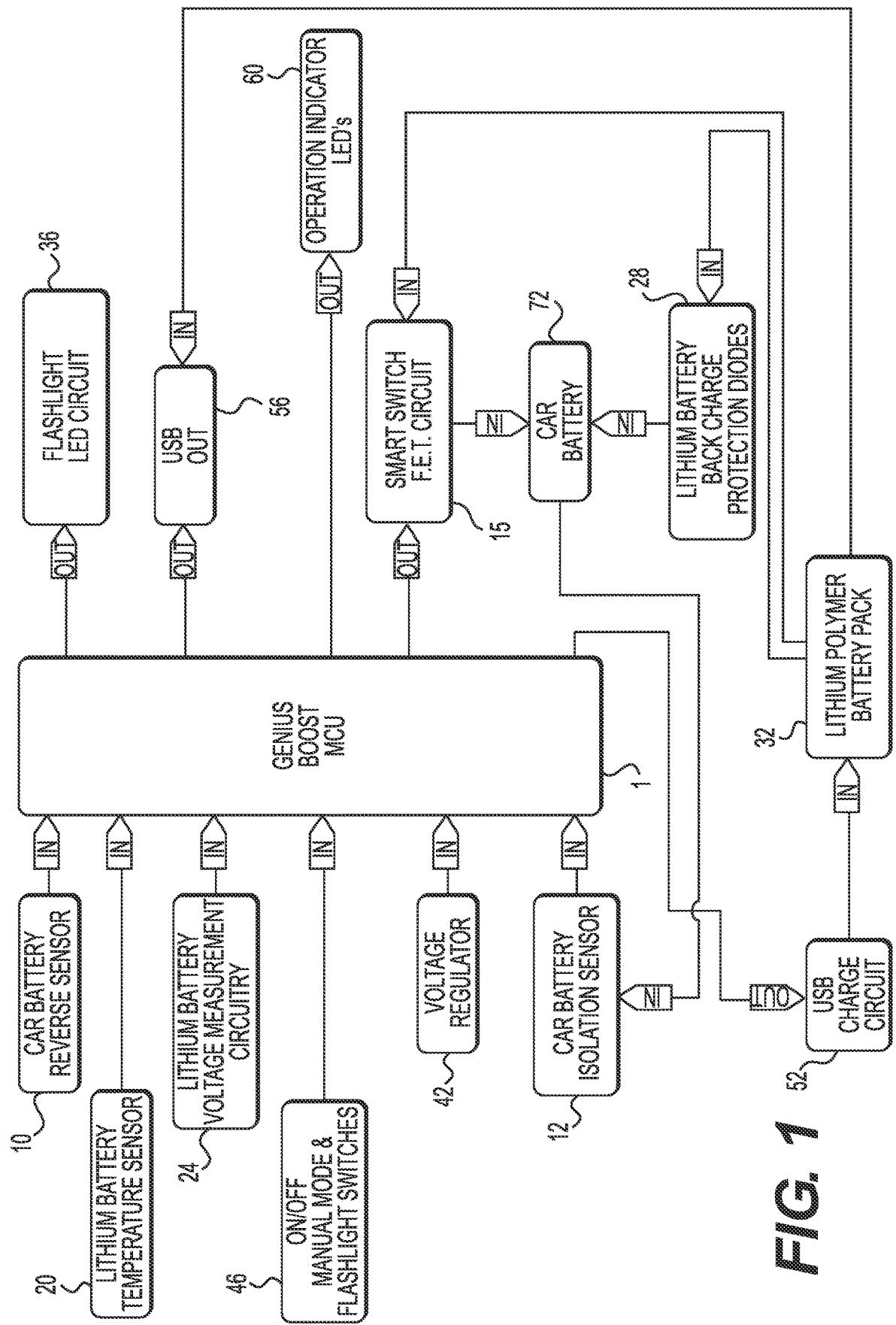
FIG. 1 is a functional block diagram of a handheld vehicle battery boost apparatus in accordance with one aspect of the present invention.

FIG. 1 is a functional block diagram of a vehicle jump starting apparatus or a handheld battery booster according to one aspect of the invention. At the heart of the handheld battery booster is a lithium polymer battery pack 32, which stores sufficient energy to jump start a vehicle engine served by a conventional 12 volt lead-acid or valve regulated lead-acid battery. In one example embodiment, a high-surge lithium polymer battery pack includes three 3.7V, 2666 mAh lithium polymer batteries in a 3S1P configuration. The resulting battery pack provides 11.1V, 2666 Ah (8000 Ah at 3.7V, 29.6 Wh). Continuous discharge current is 25 C (or 200 amps), and burst discharge current is 50 C (or 400 amps). The maximum charging current of the battery pack is 8000 mA (8 amps).

A programmable microcontroller unit (MCU) 1 receives various inputs and produces informational as well as control outputs. The programmable MCU 1 further provides flexibility to the system by allowing updates in functionality and system parameters, without requiring any change in hardware. According to one example embodiment, an 8 bit microcontroller with 2K×15 bits of flash memory is used to control the system. One such microcontroller is the HT67F30, which is commercially available from Holtek Semiconductor Inc.

A car battery reverse sensor 10 monitors the polarity of the vehicle battery 72 when the handheld battery booster device is connected to the vehicle's electric system. As explained below, the booster device prevents the lithium battery pack from being connected to the vehicle battery 72 when the terminals of the battery 72 are connected to the wrong terminals of the booster device. A car battery isolation sensor 12 detects whether or not a vehicle battery 72 is connected to the booster device, and prevents the lithium battery pack from being connected to the output terminals of the booster device unless there is a good (e.g. chargeable) battery connected to the output terminals.

A smart switch FET circuit 15 electrically switches the handheld battery booster lithium battery to the vehicle's electric system only when the vehicle battery is determined by the MCU 1 to be present (in response to a detection signal provided by isolation sensor 12) and connected with the correct polarity (in response to a detection signal provided by reverse sensor 10). A lithium battery temperature sensor 20 monitors the temperature of the lithium battery pack 32 to detect overheating due to high ambient temperature conditions and overextended current draw during jump starting. A lithium battery voltage measurement circuit 24 monitors the voltage of the lithium battery pack 32 to prevent the voltage potential from rising too high during a charging operation and from dropping too low during a discharge operation.

Lithium battery back-charge protection diodes 28 prevent any charge current being delivered to the vehicle battery 72 from flowing back to the lithium battery pack 32 from the vehicle's electrical system. Flashlight LED circuit 36 is provided to furnish a flashlight function for enhancing light under a vehicle's hood in dark conditions, as well as providing SOS and strobe lighting functions for safety purposes when a vehicle may be disabled in a potentially dangerous location. Voltage regulator 42 provides regulation of internal operating voltage for the microcontroller and sensors. On/Off manual mode and flashlight switches 46 allow the user to control power-on for the handheld battery booster device, to control manual override operation if the vehicle has no battery, and to control the flashlight function. The manual button functions only when the booster device is powered on. This button allows the user to jump-start vehicles that have either a missing battery, or the battery voltage is so low that automatic detection by the MCU is not possible. When the user presses and holds the manual override button for a predetermined period time (such as three seconds) to prevent inadvertent actuation of the manual mode, the internal lithium ion battery power is switched to the vehicle battery connect port. The only exception to the manual override is if the car battery is connected in reverse. If the car battery is connected in reverse, the internal lithium battery power shall never be switched to the vehicle battery connect port.

USB charge circuit 52 converts power from any USB charger power source, to charge voltage and current for charging the lithium battery pack 32. USB output 56 provides a USB portable charger for charging smartphones, tablets, and other rechargeable electronic devices. Operation indicator LEDs 60 provides visual indication of lithium battery capacity status as well as an indication of smart switch activation status (indicating that power is being provided to the vehicle's electrical system).

Figure 2A:
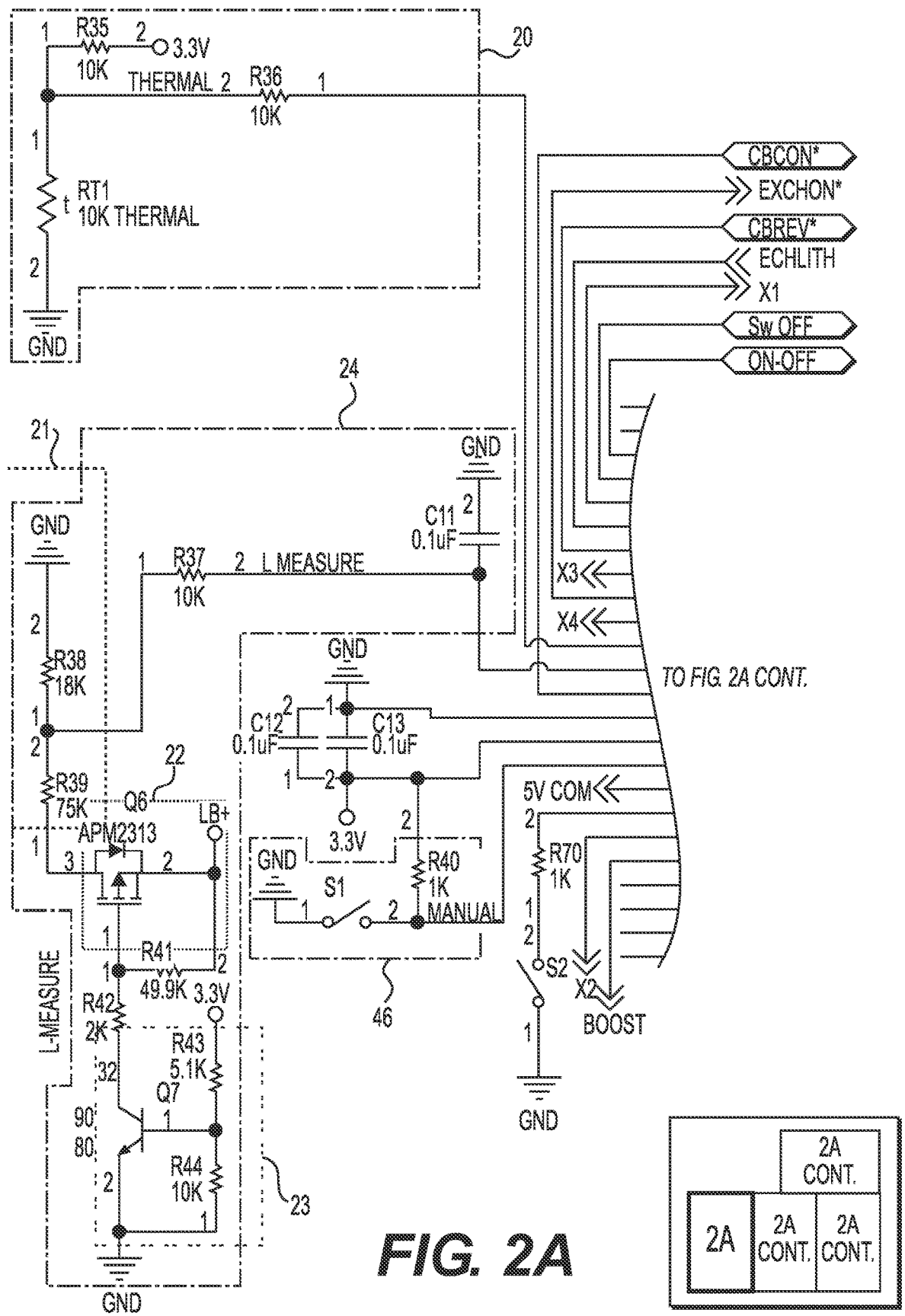

Detailed operation of the handheld booster device will now be described with reference to the schematic diagrams of FIGS. 2A-2C. As shown in FIG. 2A, the microcontroller unit 1 is the center of all inputs and outputs. The reverse battery sensor 10 comprises an optically coupled isolator phototransistor (4N27) connected to the terminals of vehicle battery 72 at input pins 1 and 2 with a diode D8 in the lead conductor of pin 1 (associated with the negative terminal CB−), such that if the battery 72 is connected to the terminals of the booster device with the correct polarity, the optocoupler LED 11 will not conduct current, and is therefore turned off, providing a "1" or high output signal to the MCU 1. The car battery isolation sensor 12 comprises an optically coupled isolator phototransistor (4N27) connected to the terminals of vehicle battery 72 at input pins 1 and 2 with a diode D7 in the lead conductor of pin 1 (associated with the positive terminal CB+), such that if the battery 72 is connected to the terminals of the booster device with the correct polarity, the optocoupler LED 11A will conduct current, and is therefore turned on, providing a "0" or low output signal to the MCU, indicating the presence of a battery across the jumper output terminals of the handheld booster device.

If the car battery 72 is connected to the handheld booster device with reverse polarity, the optocoupler LED 11 of the reverse sensor 10 will conduct current, providing a "0" or low signal to microcontroller unit 1. Further, if no battery is connected to the handheld booster device, the optocoupler LED 11A of the isolation sensor 12 will not conduct current, and is therefore turned off, providing a "1" or high output signal to the MCU, indicating the absence of any battery connected to the handheld booster device. Using these specific inputs, the microcontroller software of MCU 1 can determine when it is safe to turn on the smart switch FET 15, thereby connecting the lithium battery pack to the jumper terminals of the booster device. Consequently, if the car battery 72 either is not connected to the booster device at all, or is connected with reverse polarity, the MCU 1 can keep the smart switch FET 15 from being turned on, thus prevent sparking/short circuiting of the lithium battery pack.

As shown in FIG. 2B, the FET smart switch 15 is driven by an output of the microcontroller 1. The FET smart switch 15 includes three FETs (Q15, Q18, and Q19) in parallel, which spreads the distribution of power from the lithium battery pack over the FETs. When that microcontroller output is driven to a logic low, FETs 16 are all in a high resistance state, therefore not allowing current to flow from the internal lithium Battery negative contact 17 to the car battery 72 negative contact. When the microcontroller output is driven to a logic high, the FETs 16 (Q15, Q18, and Q19) are in a low resistant state, allowing current to flow freely from the internal lithium battery pack negative contact 17 (LB−) to the car battery 72 negative contact (CB−). In this way, the microcontroller software controls the connection of the internal lithium battery pack 32 to the vehicle battery 72 for jumpstarting the car engine.

Referring back to FIG. 2A, the internal lithium battery pack voltage can be accurately measured using circuit 24 and one of the analog-to-digital inputs of the microcontroller 1. Circuit 24 is designed to sense when the main 3.3V regulator 42 voltage is on, and to turn on transistor 23 when the voltage of regulator 42 is on. When transistor 23 is conducting, it turns on FET 22, thereby providing positive contact (LB+) of the internal lithium battery a conductive path to voltage divider 21 allowing a lower voltage range to be brought to the microcontroller to be read. Using this input, the microcontroller software can determine if the lithium battery voltage is too low during discharge operation or too high during charge operation, and take appropriate action to prevent damage to electronic components.

Still referring to FIG. 2A, the temperature of the internal lithium battery pack 32 can be accurately measured by two negative temperature coefficient (NTC) devices 20. These are devices that reduce their resistance when their temperature rises. The circuit is a voltage divider that brings the result to two analog-to-digital (A/D) inputs on the microcontroller 1. The microcontroller software can then determine when the internal lithium battery is too hot to allow jumpstarting, adding safety to the design.

The main voltage regulator circuit 42 is designed to convert internal lithium battery voltage to a regulated 3.3 volts that is utilized by the microcontroller 1 as well as by other components of the booster device for internal operating power. Three lithium battery back charge protection diodes 28 (see FIG. 2B) are in place to allow current to flow only from the internal lithium battery pack 32 to the car battery 72, and not from the car battery to the internal lithium battery. In this way, if the car electrical system is charging from its alternator, it cannot back-charge (and thereby damage) the internal lithium battery, providing another level of safety. The main power on switch 46 (FIG. 2A) is a combination that allows for double pole, double throw operation so that with one push, the product can be turned on if it is in the off state, or turned off if it is in the on state. This circuit also uses a microcontroller output 47 to "keep alive" the power when it is activated by the on switch. When the switch is pressed the microcontroller turns this output to a high logic level to keep power on when the switch is released. In this way, the microcontroller maintains control of when the power is turned off when the on/off switch is activated again or when the lithium battery voltage is getting too low. The microcontroller software also includes a timer that turns the power off after a predefined period of time, (such as, e.g. 8 hours) if not used.

The flashlight LED circuit 45 shown in FIG. 2B controls the operation of flashlight LEDs. Two outputs from the microcontroller 1 are dedicated to two separate LEDs. Thus, the LEDs can be independently software-controlled for strobe and SOS patterns, providing yet another safety feature to the booster device. LED indicators provide the feedback the operator needs to understand what is happening with the product. Four separate LEDs 61 (FIG. 2A) are controlled by corresponding individual outputs of microcontroller 1 to provide indication of the remaining capacity of the internal lithium battery. These LEDs are controlled in a "fuel gauge" type format with 25%, 50%, 75% and 100% (red, red, yellow, green) capacity indications. An LED indicator 63 (FIG. 2B) provides a visual warning to the user when the vehicle battery 72 has been connected in reverse polarity. "Boost" and on/off LEDs 62 provide visual indications when the booster device is provide jump-start power, and when the booster device is turned on, respectively.

A USB output 56 circuit (FIG. 2C) is included to provide a USB output for charging portable electronic devices such as smartphones from the internal lithium battery pack 32. Control circuit 57 from the microcontroller 1 allows the USB output 56 to be turned on and off by software control to prevent the internal lithium battery getting too low in capacity. The USB output is brought to the outside of the device on a standard USB connector 58, which includes the standard voltage divider required for enabling charge to certain smartphones that require it. The USB charge circuit 52 allows the internal lithium battery pack 32 to be charged using a standard USB charger. This charge input uses a standard micro-USB connector 48 allowing standard cables to be used. The 5V potential provided from standard USB chargers is up-converted to the 12.4 VDC voltage required for charging the internal lithium battery pack using a DC-DC converter 49. The DC-DC converter 49 can be turned on and off via circuit 53 by an output from the microcontroller 1.

In this way, the microcontroller software can turn the charge off if the battery voltage is measured to be too high by the A/D input 22. Additional safety is provided for helping to eliminate overcharge to the internal lithium battery using a lithium battery charge controller 50 that provides charge balance to the internal lithium battery cells 51. This controller also provides safety redundancy for eliminating over discharge of the internal lithium battery.

Figure 3:
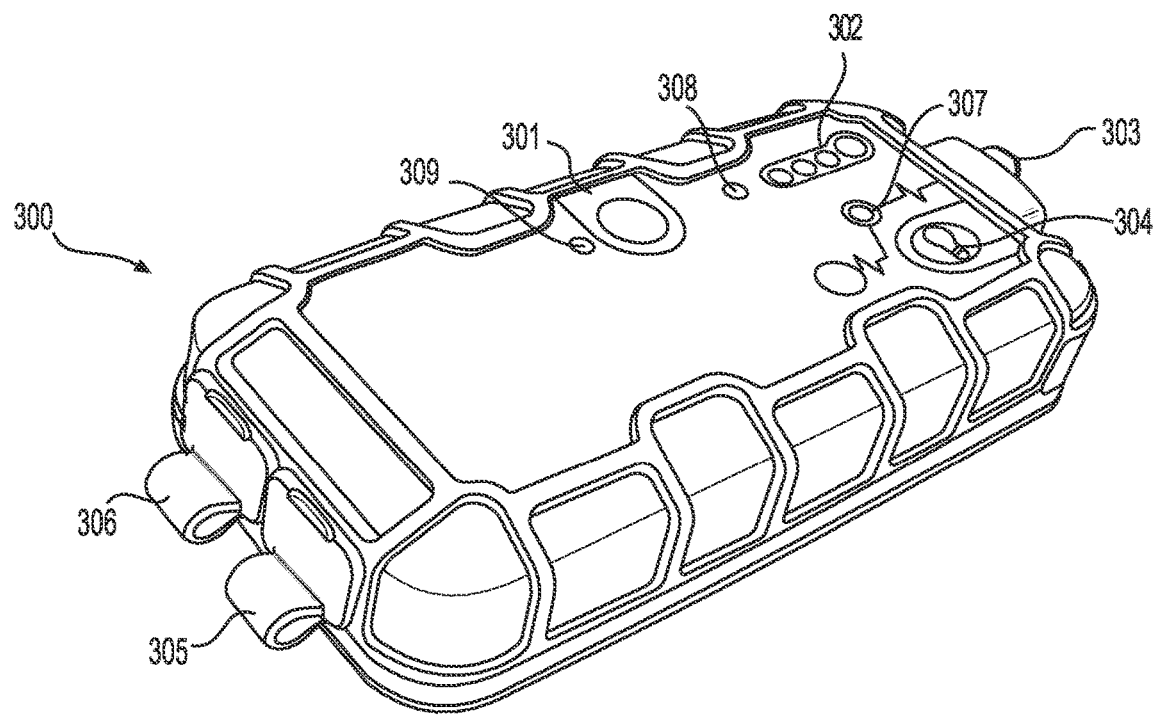
FIG. 3 is a perspective view of a handheld jump starter booster device in accordance with one example embodiment of the invention.

FIG. 3 is a perspective view of a handheld device 300 in accordance with an exemplary embodiment of the invention. 301 is a power on switch. 302 shows the LED "fuel gauge" indicators 61. 303 shows a 12 volt output port connectable to a cable device 400, described further below. 304 shows a flashlight control switch for activating flashlight LEDs 45. 305 is a USB input port for charging the internal lithium battery, and 306 is a USB output port for providing charge from the lithium battery to other portable devices such as smartphones, tablets, music players, etc. 307 is a "boost on" indicator showing that power is being provided to the 12V output port. 308 is a "reverse" indicator showing that the vehicle battery is improperly connected with respect to polarity. 309 is a "power on" indicator showing that the device is powered up for operation.

Figure 4:
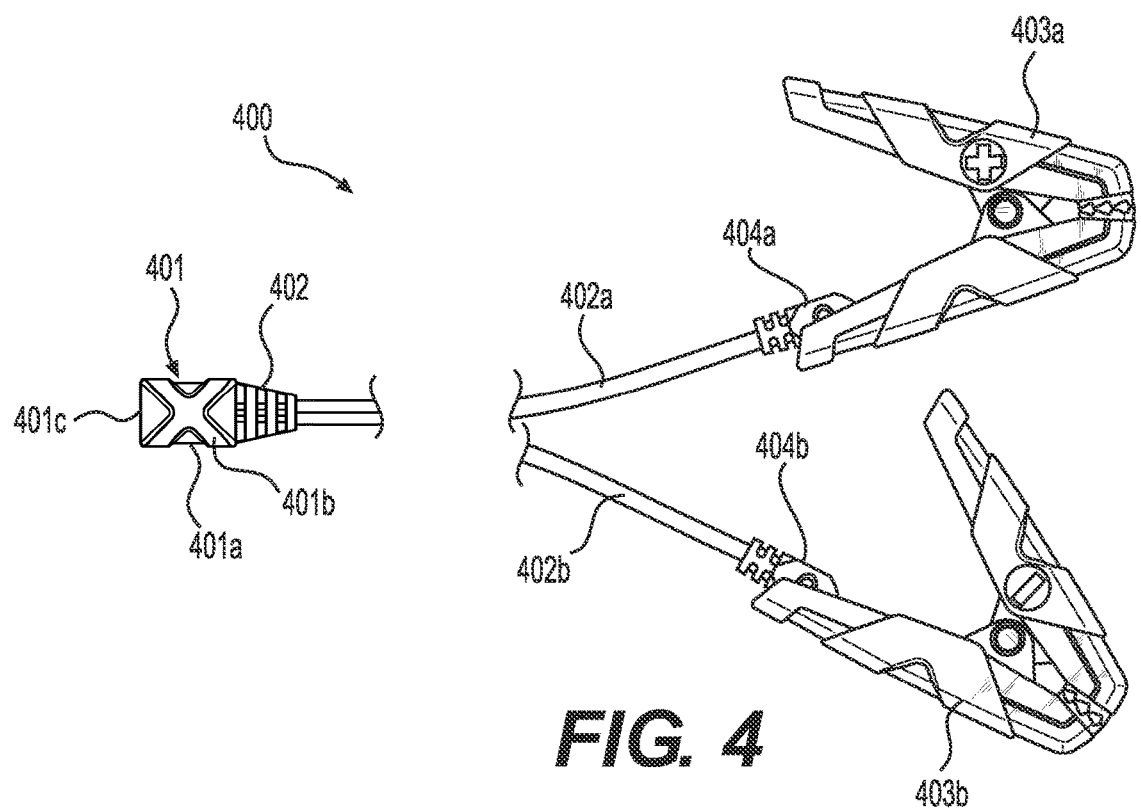
FIG. 4 is a plan view of a jumper cable usable with the handheld jump starter booster device in accordance with another aspect of the invention.

FIG. 4 shows a jumper cable device 400 specifically designed for use with the handheld device 300. Device 400 has a plug 401 configured to plug into 12 volt output port 303 of the handheld device 300. A pair of cables 402a and 402b are integrated with the plug 401, and are respectively connected to vehicle battery terminal connectors, for example, battery terminal clamps 403a and 403b via ring terminals 404a and 404b. The port 303 and plug 401 may be dimensioned so that the plug 401 will only fit into the port 303 in a specific orientation, thus ensuring that clamp 403a will correspond to positive polarity, and clamp 403b will correspond to negative polarity, as indicated thereon.

Additionally, the ring terminals 404a and 404b may be disconnected from the clamps and connected directly to the terminals of a vehicle battery. This feature may be useful, for example, to permanently attach the cables 302a-302b to the battery of a vehicle. In the event that the battery voltage becomes depleted, the handheld booster device 300 could be properly connected to the battery very simply by plugging in the plug 401 to the port 303.

Jump Starting Device with Battery Connection Device

Figure 2A:
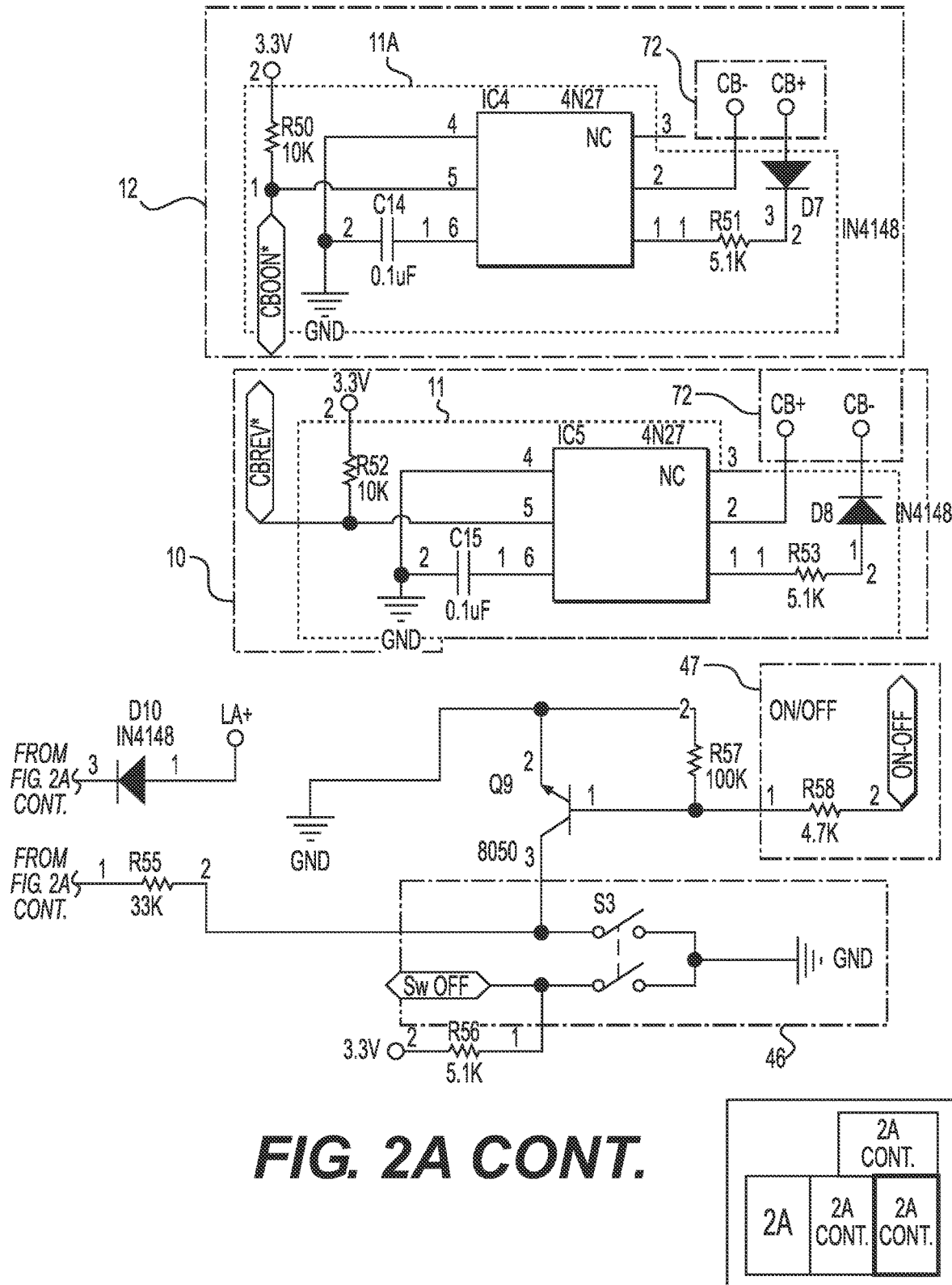
Figure 5:
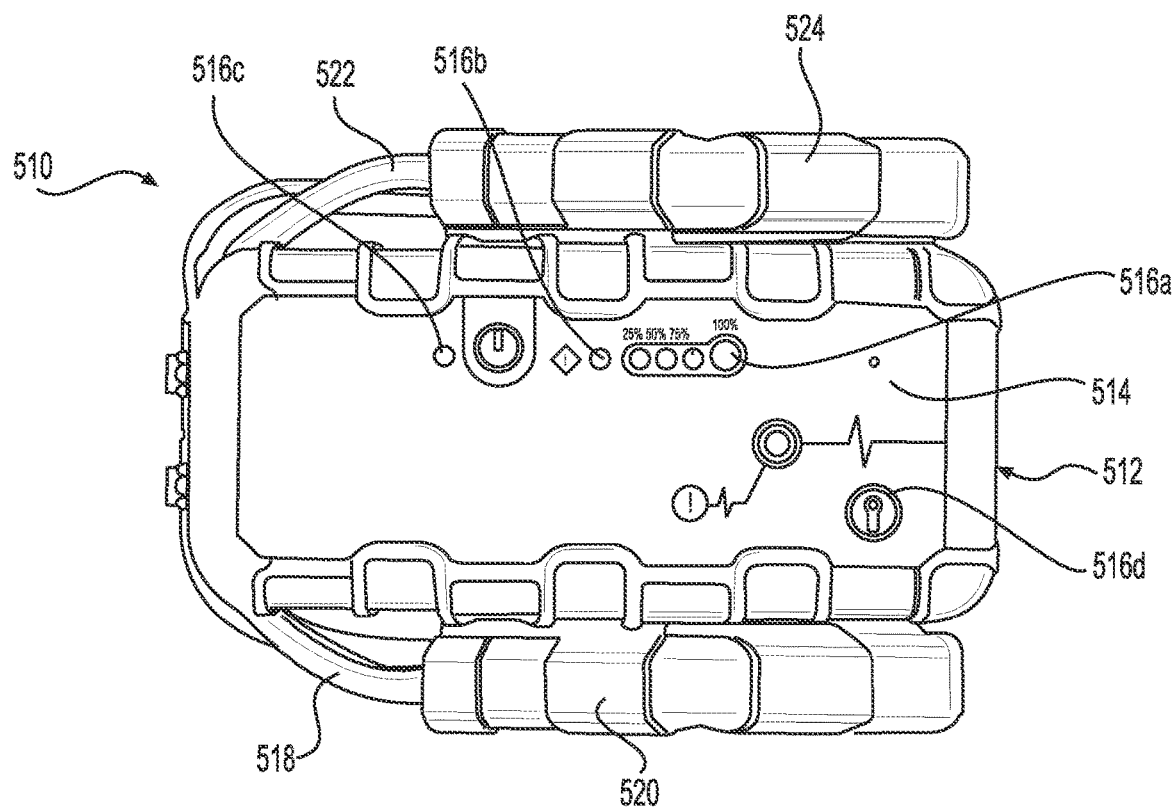
FIG. 5 is a front view of the battery jump starting device with the battery terminal clamps un-deployed.
Figure 6:
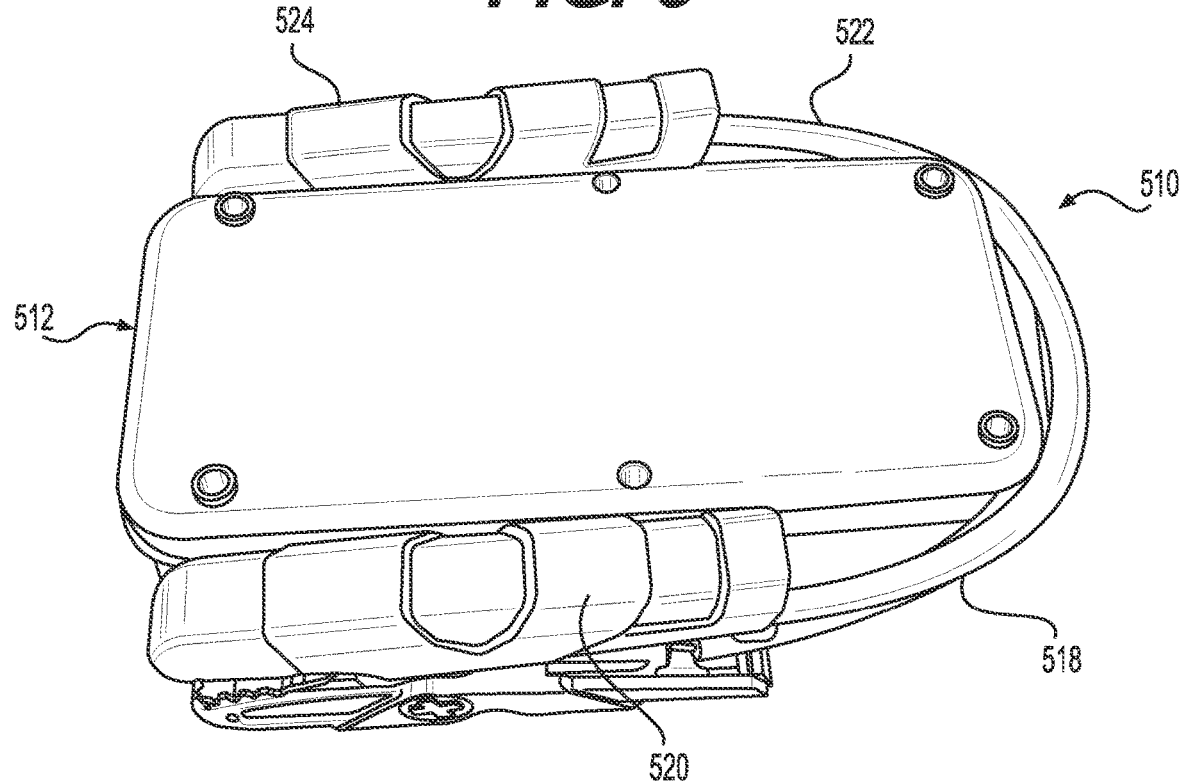
FIG. 6 is a rear perspective view of the battery jump starting device shown in FIG. 5.

Another jump starting apparatus or device 510 is shown in FIGS. 5 and 6. The battery jump starting device 510 comprises the electronic components or parts of the handheld battery booster apparatus shown in FIGS. 1-3 and the handheld device 300 shown in FIG. 4, and described above, in combination with a battery connection device 600 according to the present invention.

The jump starting apparatus 510 comprises a casing 512 having a display 514 provided with an arrangement of light emitting diodes (LEDs) 516a-d, as shown in FIG. 5.

The jump starting device 510 further comprises a positive cable 518 having a positive clamp 520 and a negative cable 522 having a negative clamp 524. The positive cable 518 and negative cable 522 pass through openings 512a, 512b, respectively, in the casing 512.

Figure 8:
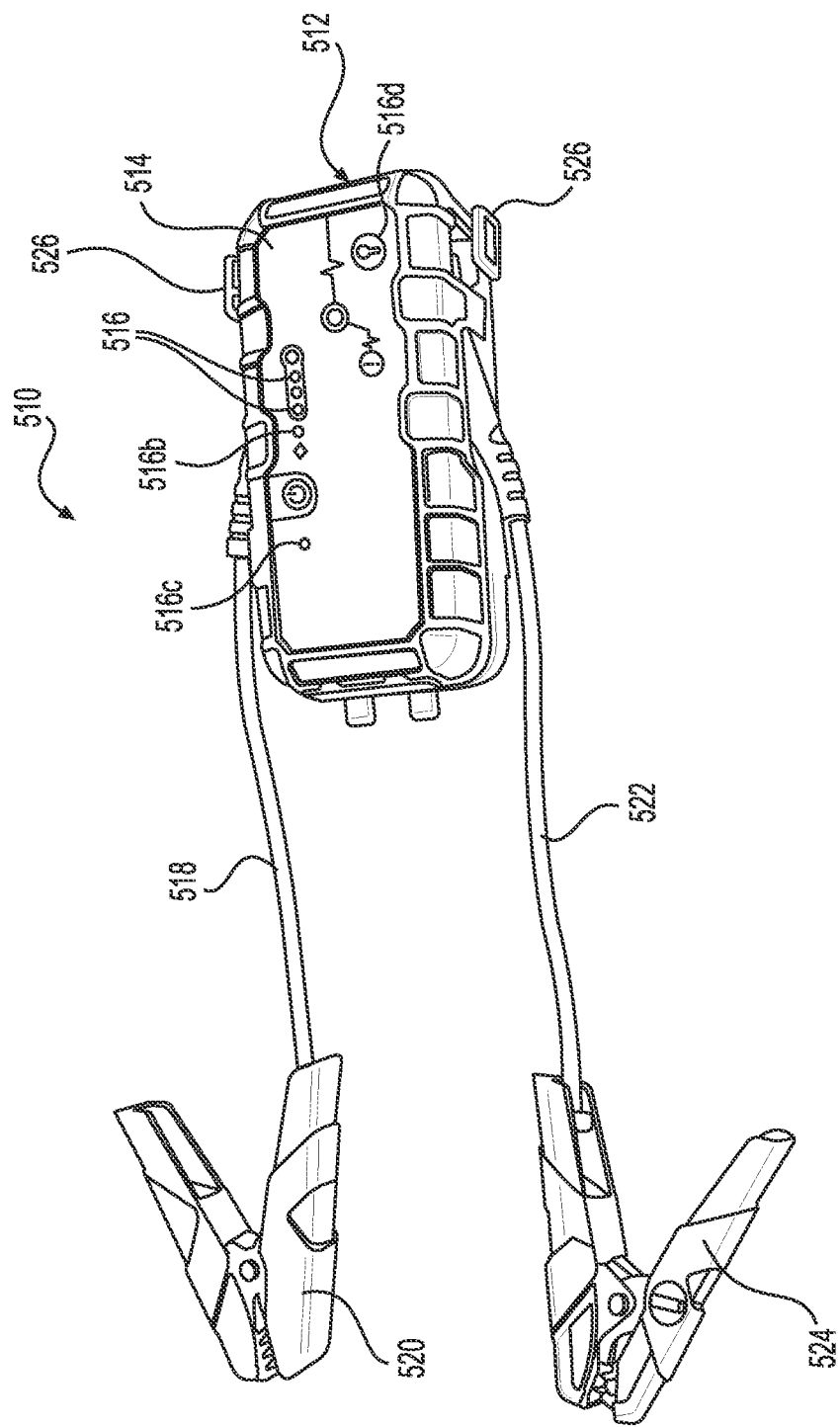
FIG. 8 is a front perspective view of the battery jump starting device shown in FIG. 5, however, with the battery terminal clamps deployed.

The clamps 520, 524 are stowed away or docked in an un-deployed mode by clamping each to a respective side posts 526 extending outwardly on opposite sides of the casing 512, as shown in FIGS. 5 and 6. The side posts 526 are shown in FIG. 8. The clamps 520, 524 are docked when the jump starting device 510 is in non-use, and then unclamped from the side post 526 during use.

The jump starting device 510 is configured to jump start a vehicle battery. For example, the jump starting device 510 can be the PORTABLE VEHICLE JUMP START APPARATUS WITH SAFETY PROTECTION disclosed in U.S. Pat. No. 9,007,015, which is fully incorporated herein by reference, or a device or apparatus similar thereto.

The jump starting device 510 comprises electrical components or parts located inside the casing 512. For example, the jump starting device 510 comprises a battery connector device 600 shown in FIGS. 7-13.

The battery connector device 600 comprises a battery assembly 610 having a battery 612. For example, the battery 612 is a lithium-ion rechargeable type battery. The battery connector device 600 is configured to maximize conductivity from the battery 612 to the cables 518, 522 and clamps 520, 524 of the jump starting device 510. The battery 612 comprises a battery casing 612a, for example, a rectangular-shaped battery casing 612a.

The battery 612 comprises a positive tab or terminal at one end (e.g. width) of the battery 612, and a negative terminal tab or terminal at an opposite end (e.g. width) of the battery 612. For example, the battery 612 comprises one or more battery cells each having a positive and negative tab. For example, the positive tab or terminal from the battery cell(s) is located at the one end of the battery 612 and the negative tab or terminal from the battery cell(s) is located at the opposite end of the battery 612. A positive terminal conductor plate 614 is connected (e.g. soldered, welded, or sonically welded) at the one end of the battery 612 to the positive tab (i.e. contact) or terminal of the battery 612. The positive terminal conductor plate 614 extends along the one end (e.g. width) of the battery 612.

The positive cable 518 can be connected (e.g. directly connected by soldering) to the positive terminal conductor plate 614 and/or the positive tab of the battery 612. For example, the positive terminal conductor bar 614 can be provided with a conductive loop 616 wrapping around (e.g. entirely wrapping around) and connected (e.g. crimped and/or soldered) to an exposed conductor end 518a of the positive cable 518. For example, the positive terminal conductor plate 614 is made from heavy gauge copper or aluminum sheet (e.g. machined, cut, or stamped therefrom).

Figure 9:
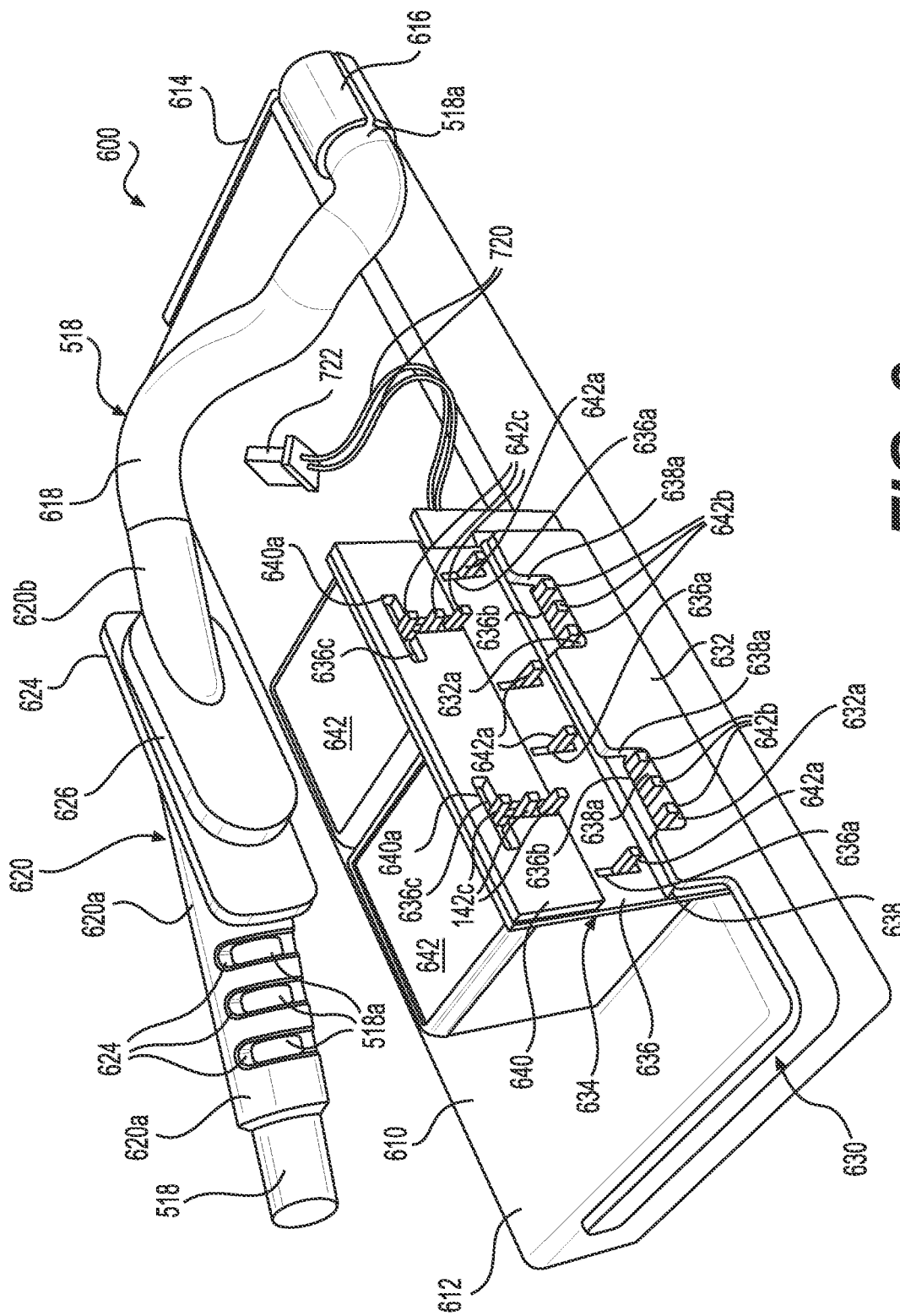
FIG. 9 is a front perspective view of a battery connector device contained within the battery jump starting device shown in FIG. 5, however, with the negative cable not yet installed.
Figure 10:
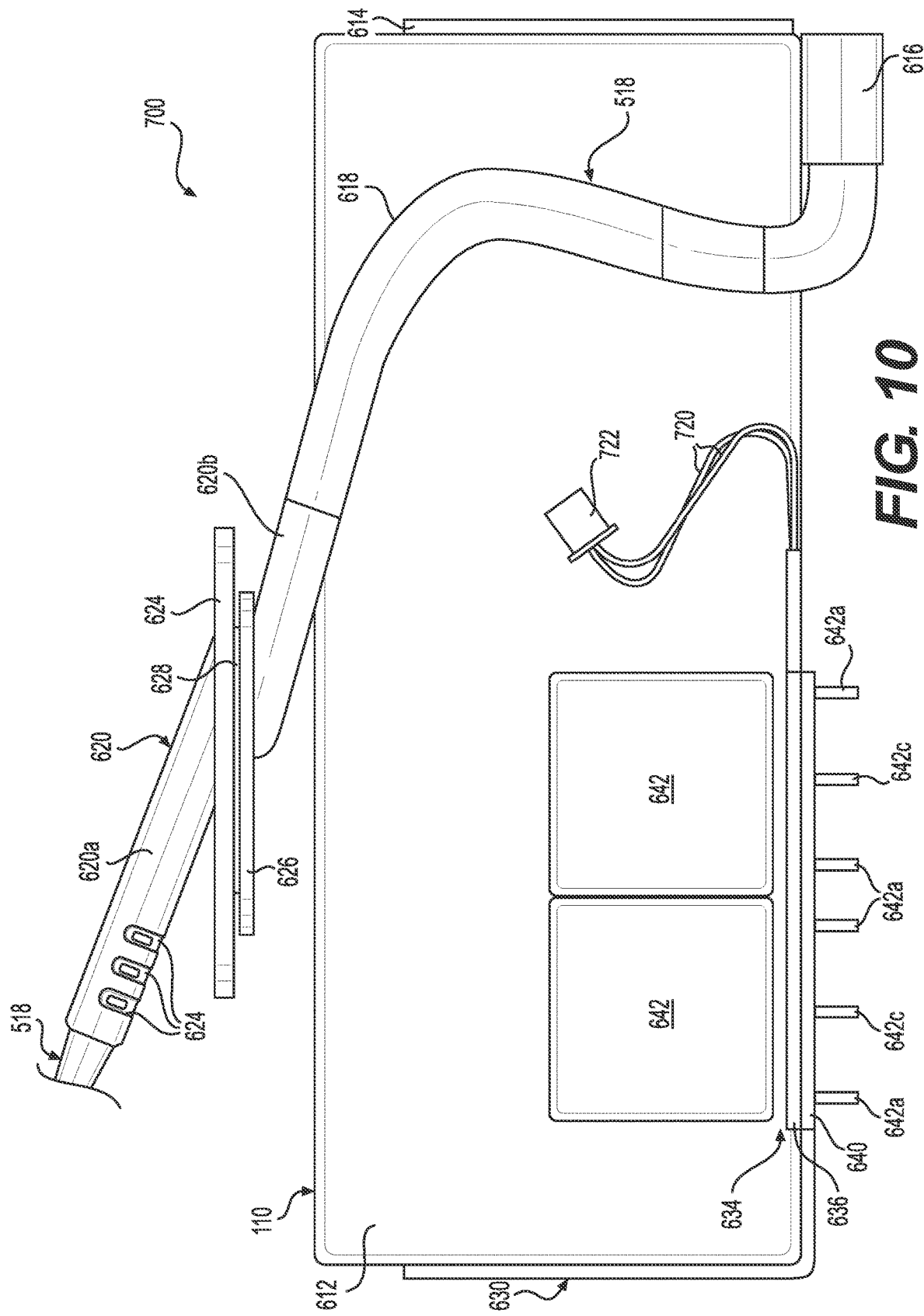
FIG. 10 is a top planer view of the battery connector device shown in FIG. 9.

As shown in FIGS. 9 and 10, the positive terminal conductor plate 614 can be configured (e.g. bent) to wrap around one of the square-shaped corners of the rectangular-shaped casing 612a of the battery 612 (e.g. L-shaped). The L-shaped positive terminal conductor plate 614 can extend along an end of the battery 612 and along at least a portion of the side of the battery 612, as shown in FIG. 9.

The positive terminal conductor plate 614 can also be mechanically coupled and/or adhered to the outer surface of the battery casing 612a to provide additional support and stability thereof (e.g. assembled to survive mechanical shock when drop testing the battery jump starter device 510). For example, the positive terminal conductor bar 614 can be mechanically connected to the battery casing 612 by adhesive (e.g. silicon adhesive), double sided tape, double sided foam tape, insulated plastic or ceramic connector with snap fit connection and/or adhesive connection, and/or the battery casing 612 can be formed (e.g. molded) to mechanically connect (e.g. snap fit or interference connection) with the positive terminal conductor plate 614.

The positive cable 518 can be a single piece of wire or a cable (e.g. twisted or braided wires) extending from the battery 612 to the positive clamp 520. Specifically, one end of the positive cable 518 is connected to the positive terminal conductor plate 614 connected to the battery 612, and the opposite end of the positive cable 518 is connected to the positive clamp 520.

More specifically, the positive cable 518 can comprise a flexible or bent cable portion 518 (FIG. 9) for changing the direction of the positive cable 518 within the device casing 512. The positive cable 518 can be fitted with a flexible outer sleeve portion 620 transitioning into a flexible inner sleeve portion 622 to flexibly accommodate the positive cable 518 passing through the device casing 512. The flexible outer sleeve portion 620 is externally located relative to the device casing 512 of the battery jump starter device 510, and the flexible inner sleeve portion 622 is internally located relative to the casing 512 of the battery jump starter device 510.

The flexible outer sleeve portion 620 is configured to reinforce the connection between the positive cable 518 and the device casing 512 of the jump starting device 510 while remaining flexible. For example, the flexible outer sleeve portion 620 is provided with one or more grooves 618a (e.g. three (3) grooves 624 shown in FIG. 9) exposing portions 518a of the positive cable 518. The one or more grooves 624 act as hinges to ease bending of the positive cable 518 within the flexible outer sleeve portion 620.

The flexible sleeve 620 comprises an outer flange 624 spaced apart (e.g. a small distance equal to about a wall thickness of the device casing 512 of the jump starting device 510) from an in inner flange 626. The flanges 624, 626 further anchor the positive cable 518 to the device casing 512 of the jump starting device 510.

The flexible sleeve 620 comprises a sleeve portion 628 (FIG. 10) connecting together the outer flange 624 and inner flange 626. For example, the flexible outer sleeve portion 620 is molded or applied onto and around the positive cable 518 as a single unit (e.g. the flexible sleeve 620 is molded onto a portion of the positive cable 518 inserted within the mold during the molding process). Alternatively, the flexible sleeve 620 is made (e.g. molded) separately, and then installed or assembled onto a portion of the positive cable 518.

The positive cable 518 comprises an inner conductor (e.g. single wire conductor, twisted wires, or braided wires) disposed within an outer insulating sheath (e.g. extruded plastic sheath). The inner conductor, for example, can be a solid wire conductor or a multi-strand metal wire conductor comprising bundle of wires. The inner conductor can be made of copper or aluminum. The flexible sleeve 620 can be applied (e.g. molded or installed or assembled) onto and surrounding the outer insulating sheath of the positive cable 518.

The battery connector device 600 further comprises a negative terminal conductor plate 630 (FIG. 9) connected (e.g. soldered, welded, or sonically welded) at an opposite end of the battery 612 to the negative tab or terminal (i.e. contact) of the battery 612. The negative terminal conductor plate 630 can extend along the opposite end of the battery 612.

The other end of the negative terminal conductor plate 630 is provided with a negative terminal conductor plate connector portion 632, as shown in FIGS. 9 and 10. The negative terminal conductor plate 630 can be configured to wrap around one of the corners of the rectangular-shaped battery 612 (e.g. L-shaped). The L-shaped negative terminal conductor plate 630 can extend along an end of the battery 612 and along at least a portion of the side of the battery 612, as shown in FIGS. 9 and 10.

The negative terminal conductor bar 630 can also be mechanically coupled and/or adhered to the outer surface of the battery casing 612a to provide additional support and stability thereof (e.g. to survive mechanical shock when drop testing the battery jump starter device 510). For example, the negative terminal conductor bar 614 can be mechanically connected to the battery casing 612a by adhesive (e.g. silicon adhesive), double sided tape, double sided foam tape, insulating plastic or ceramic connector with snap fit connection and/or adhesive connection, and/or the battery casing 612 can be formed (e.g. molded) to mechanically connect (e.g. snap fit or interference connection) with the positive terminal conductor plate 614.

The battery connector device 600 further comprises a smart switch battery interface 634. The smart switch battery interface 634 comprises a relay printed circuit board (PCB) 636 having a first circuit board conductor bar 638 spaced apart from a second circuit board conductor bar 640 located on one side of the circuit board 636, as shown in FIGS. 9 and 10.

Figure 11:
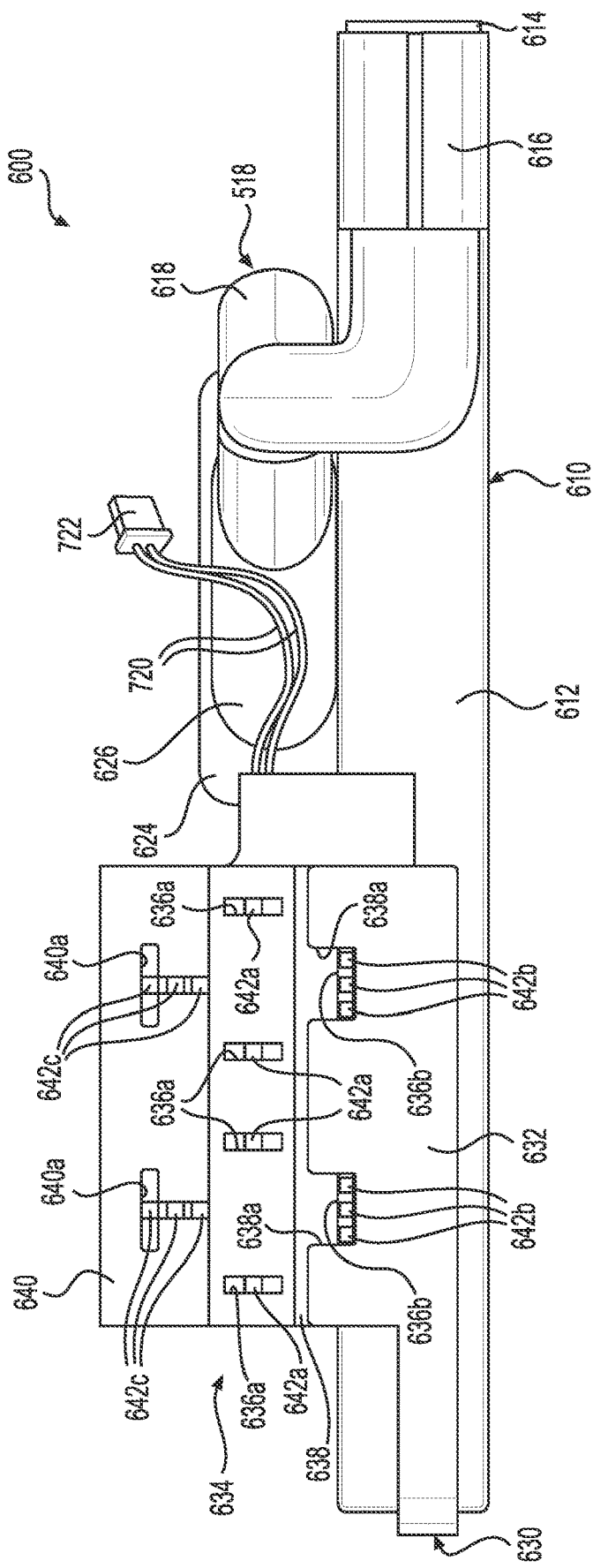
FIG. 11 is a side elevational view of the battery connector device shown in FIG. 9.
Figure 12:
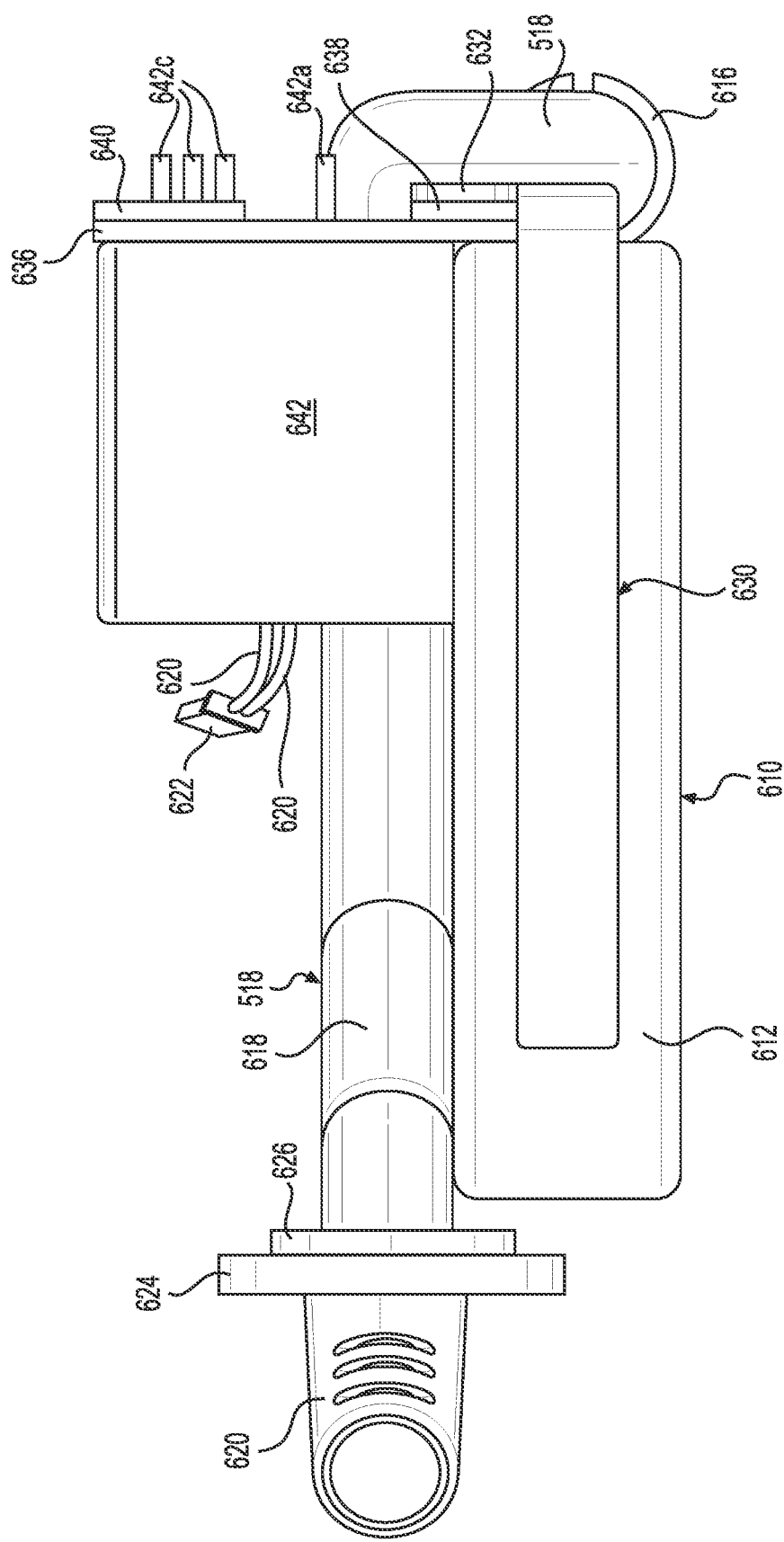
FIG. 12 is an end elevational view of the battery connector device shown in FIG. 9.

A pair of relays 642 are mounted on an opposite side of the circuit board 636. The relays 642 include relay anchoring pins 642a located in through holes 636a in the relay printed circuit board 636 (FIGS. 9 and 11). The relays 642 further comprise relay connector pins 642b extending through the through holes 636b provided in the circuit board 636 and slots 638a provided in the first conductor bar 638. The relays 642 even further comprise relay connector pins 642c located in the through holes 636c provided in the circuit board 636 and through holes 640a provided in the second conductor bar 640. The relay anchoring pins 636a are soldered in place to mechanically connect the relays 642 to the circuit board 636. The relay connecting pins 642b and 642c are soldered in place to mechanically and electrically connect the relays 642, respectively, to the circuit board conductor plates 638, 640.

The through holes 636a in the circuit board 636 are rectangular-shaped (FIGS. 9 and 11) and accommodate the relay anchoring pins 642a. Specifically, a base portion of the relay anchoring pins 642a are rectangular-shaped with square-shaped ends. The square-shaped ends are dimensionally less wide verses the base portions creating transverse edges oriented flush with the outer surface of the circuit board 636. When solder is applied to the exposed ends of the relay anchoring pins 642a, the solder connects to the sides of the square-shaped ends and transverse edges to anchor and lock the relay anchoring pins to the circuit board 636.

Figure 7:
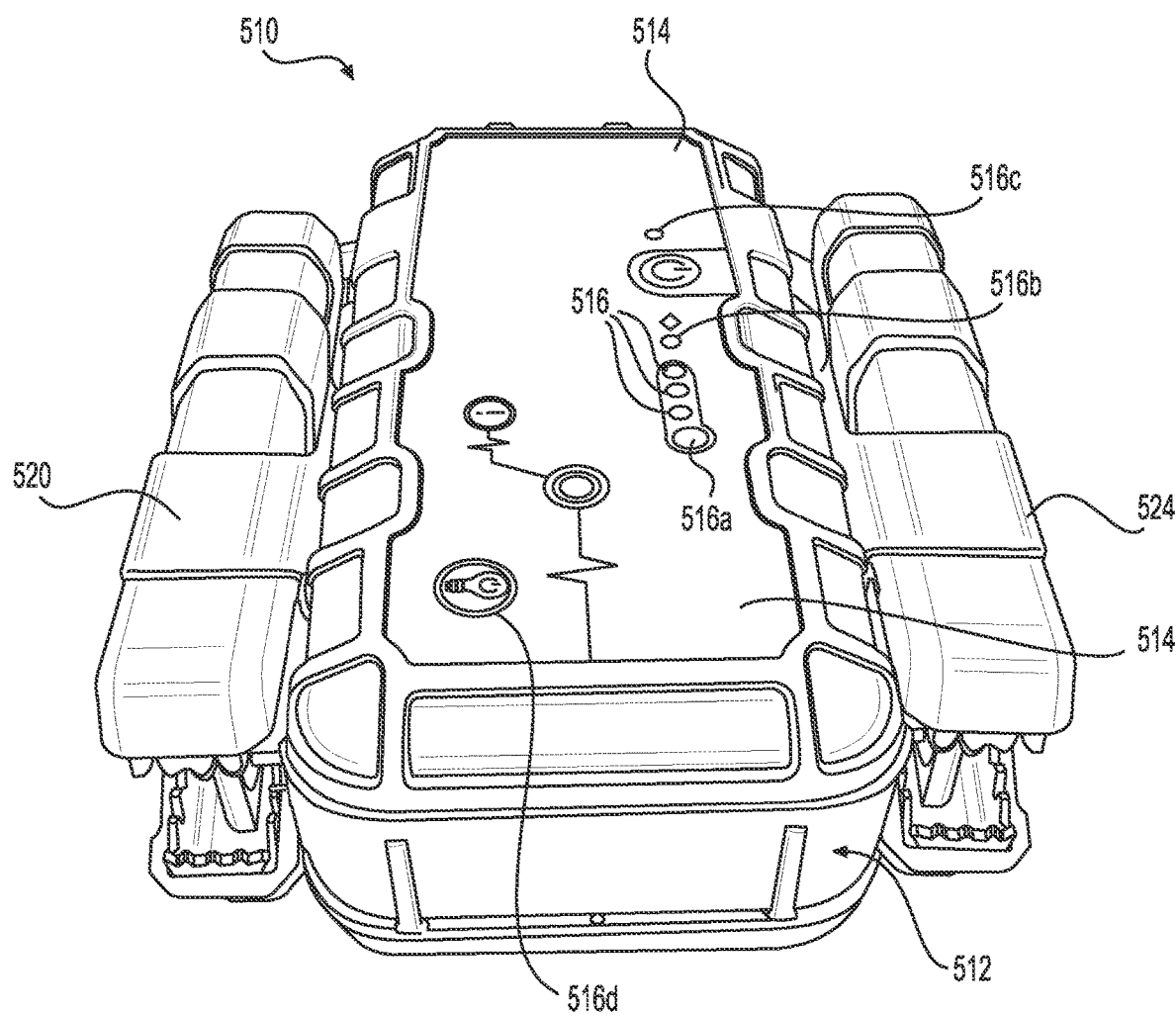
FIG. 7 is an end perspective view of the battery jump starting device shown in FIGS. 5 and 6.

The slots 632a provided in negative terminal conductor bar connector portion 632 are rectangular-shaped and the through holes 638a in the first circuit board conductor bar 638 (FIG. 7) are T-shaped to accommodate the three (3) horizontally oriented relay connector pins 642b, as shown in FIG. 7. The ends of the relay connector pins 642b are shown flush with the outer surface of the negative terminal conductor bar connector portion 632. When solder is applied to the exposed ends of the relay connector pins 642b, the solder fills in the slots 632a in the negative terminal conductor bar connector portion 632 and the through holes 638a of the first circuit board conductor bar 638, and connects the sides of the connector pins 642b with inner edges of the slots 632a and through holes 638a to anchoring the relays 642 to the circuit board 636 and negative terminal conductor bar connector portion 632. This applied solder also electrically connects the negative terminal conductor bar connector portion 632 to the first circuit board conductor bar 638.

The through holes 640a provided in the second circuit board conductor bar 640 are T-shaped to accommodate the three (3) vertically oriented relay connecting pins 642b, as shown in FIG. 7. The relay connector prongs 640a extend outwardly from the outer surface of the circuit board 636 to connect with the exposed conductor end 644a of the negative cable 644, and shown in FIG. 11. When solder is applied to the exposed conductor end 644a and the ends of the relay connector prongs 640a, the solder fills in the T-shaped slot and electrically connects the relay connector prongs 640a, second circuit board conductor 640, and exposed conductor end 644a of the negative cable 644.

Figure 13:
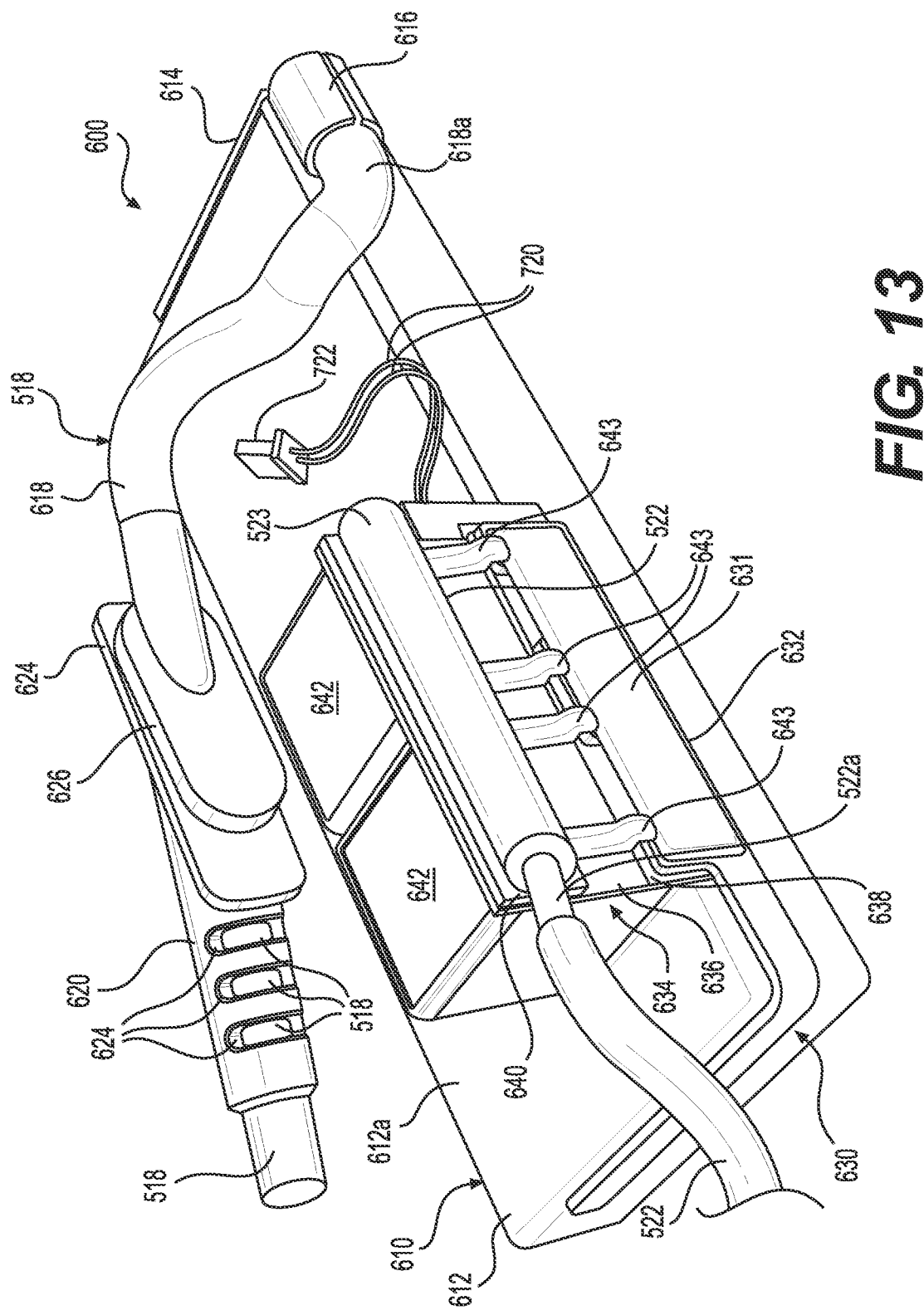
FIG. 13 is a perspective view of the battery connector device shown in FIG. 9, however, the negative cable in now connected to the battery connector device.

The negative terminal conductor bar connector portion 632 of the negative terminal conductor bar 630 is connected (e.g. by soldering) to the first circuit board conductor bar 638 of the circuit board 636. The exposed conductor end 522a (i.e. with the insulating sheath removed) of the negative cable 522 is connected (e.g. by soldering) to the second circuit board conductor bar 640, as shown in FIG. 13.

Figure 14:
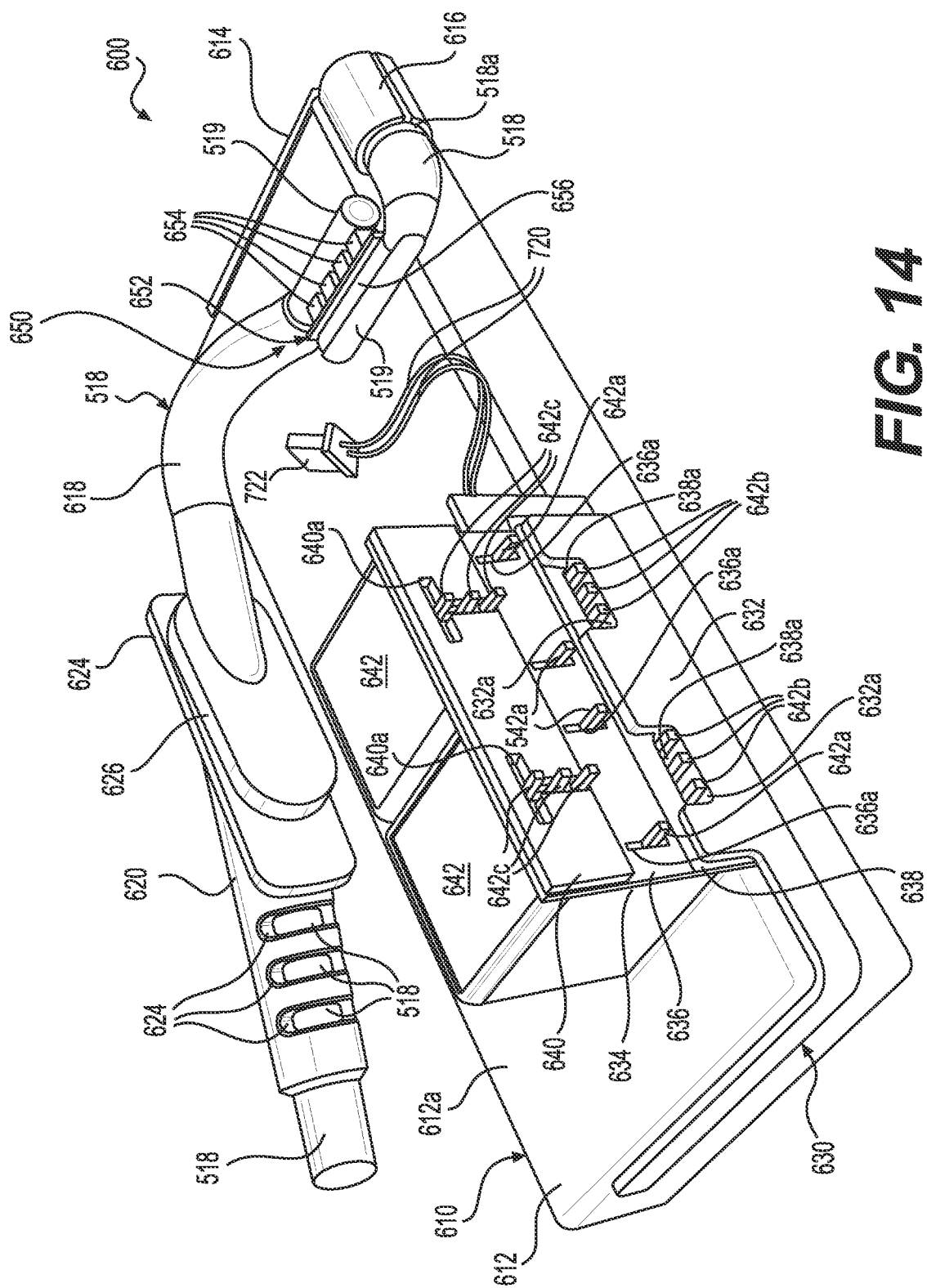
FIG. 14 is a view perspective view of the battery connector device shown in FIG. 9, however, with a diode connector installed on the positive cable.

The battery connector device 600 can be modified by providing the positive cable 518 with a diode connection 650, as shown in FIG. 14. For example, a diode connection 650 is installed (e.g. spliced) into the positive cable 518. The diode connection 650 comprises a diode printed circuit board (PCB) 652 provided with a set of back-charge diodes 654 (e.g. Schottky diodes) located on one side thereof, and a conductor bar 656 provided on an opposite side of the circuit board 652.

Assembly

Figure 15:
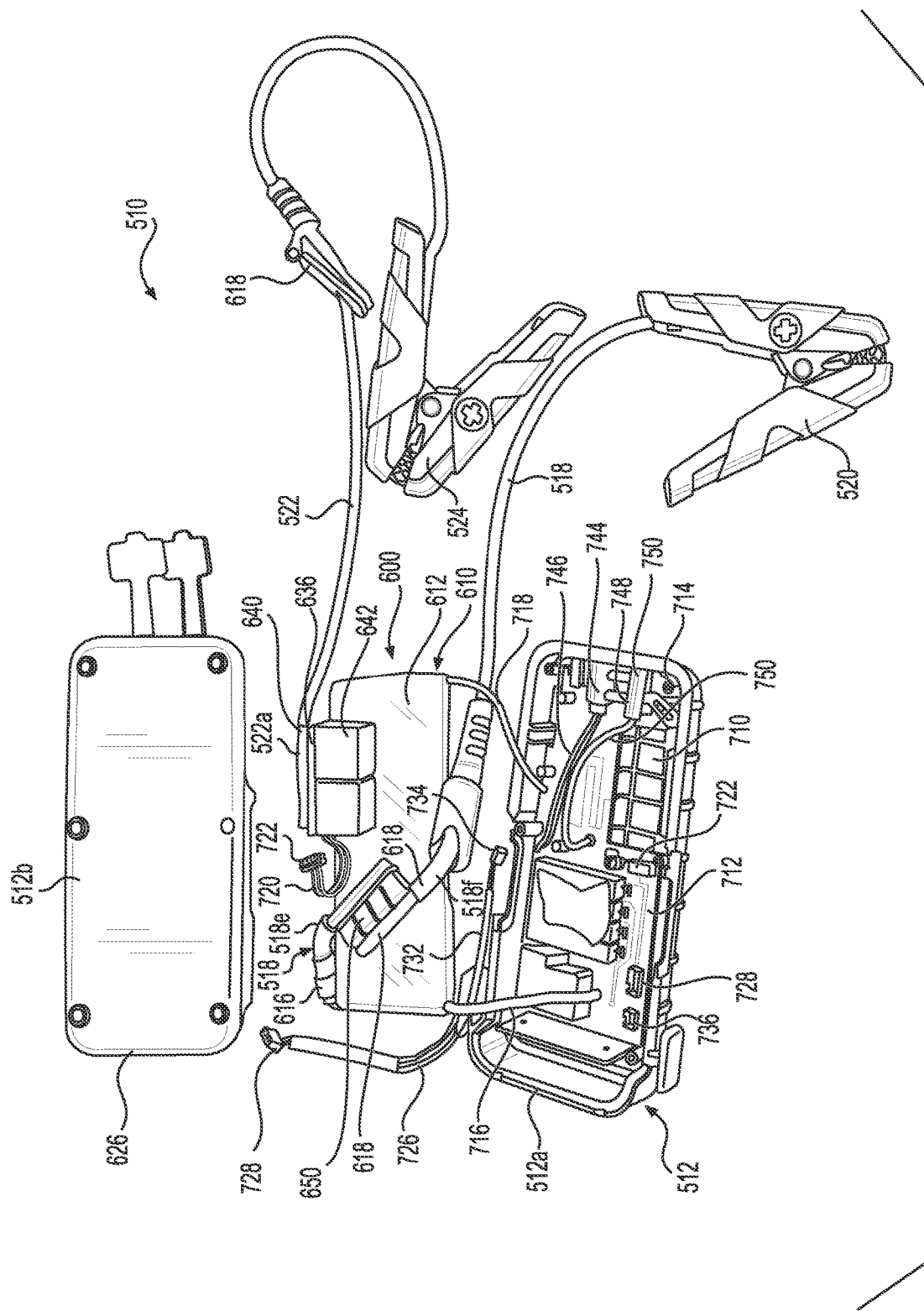
FIG. 15 is a perspective view of the battery connector device connected to other components or parts of the battery jump starting device.

The jump starting device 510 comprises the device casing 512 having an upper casing portion 512a and a lower casing portion 512b, as shown in FIG. 15. The upper casing portion 512a and the lower casing portion 512b are configured to be connected together when assembling the jump starting device 510.

The jump starting device 510 further comprises the battery connection device 600 and controller assembly 710 both disposed within the casing 512. The controller assembly 710 comprises a circuit board 712 located adjacent to another circuit board 714.

The positive terminal of the battery assembly 610 (FIG. 15) is connected to the circuit board 712 via a positive power wire 716. For example, one end of the positive power wire 716 is soldered to the positive terminal conductor bar 614 (FIG. 9) and the opposite end is soldered to the circuit board 712. The negative terminal of the battery assembly 610 is connected to the circuit board 714 via a negative power wire 718. For example, one end of the negative power wire 718 is soldered to the negative terminal conductor bar 630 (FIG. 9) and the opposite end is solder to the circuit board 714.

The relay circuit board 636 is provided with a wire set 720 having a connector 722 (FIGS. 14 and 15). The connector 722 is configured to connect with the relay board connector 722 located on the circuit board 712 of the controller assembly 710 during assembly of the battery jump starting device 510.

The battery assembly 610 further comprises a wire set 726 having a connector 728. The connector 728 is configured to connect with the battery cell charging/monitoring connector 728 located on the circuit board 712 of the controller assembly 710.

Figure 16:
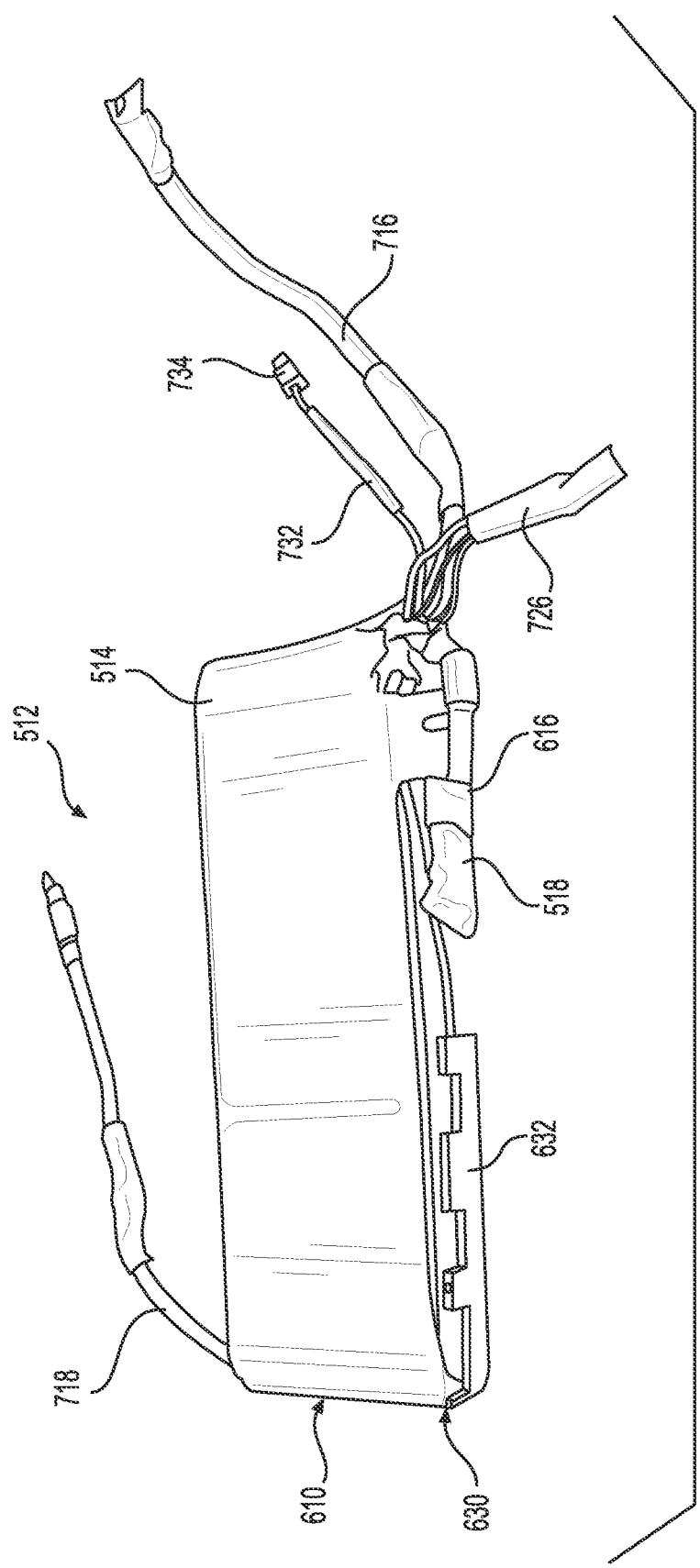
FIG. 16 is a perspective view of the battery assembly of the battery connector device shown in FIG. 9.

The battery assembly 610 also comprises a battery temperature sensor having a wire set 732 (FIG. 16) having a connector 734. The connector 734 is configured to connect with the temperature sensor connector 736 located on the circuit board 712 of the controller assembly 720.

The circuit board 712 is provided with in charge power resistors and an out relay. Further, the lower casing portion 512a is provided with a main user out connector 744 having a wire set 746 connected to the main circuit board 714, and a main user in connector 748 having a wire set 750 connected to the circuit board 714.

The battery assembly 610 is connected to jump starting device 510, as shown in FIG. 15. The battery connector device 610 is installed within the device casing 512 of the jump starting device 510 when assembled.

Enhanced Conductivity Battery Connector Device

An enhanced conductivity battery connector device 900 is shown in FIGS. 17-29. The enhanced conductivity battery connector device 900 provides a significantly increased conductivity compared to the battery connector device 600, as shown in FIGS. 9-16.

The amount of power to be conducted from the battery 912 to the battery terminal clamps connected to a vehicle battery of a vehicle to be jump started can be enhanced as follows:

1) Increase Wire Gauge
   For example, change the 4AWG (American Wire Gage) positive cable 518 and change the negative cable 522 (FIG. 13) to a 2AWG positive cable 818 and negative cable 822 (FIG. 19).
2) Increase Conductivity of Negative Cable Connection
   For example, the negative cable conductor end 822*a* (FIGS. 18 and 19) connection to the relays is extended all the way across the connector pins 922*c* of the relays 922.
3) Increase Conductivity of Positive Cable Connection
   For example, the positive battery tab 914 is lengthened so that the inner conductor 818*a* of the positive cable 818 is rolled up (FIGS. 21-26) within the positive battery tab 914 and soldered together thoroughly;
4) Increase Conductivity of Diode Connection
   For example, the diode connection 650 (FIG. 14) is replaced with the diode connection 950 (FIG. 27);
5) Redesign Resistor/Diode Printed Circuit Board (PCB)
   For example, the diode printed circuit board (PCB) 652 (FIG. 14) is replaced with the diode printed circuit board (PCB) 952 (FIG. 27); and
6) Reconnect Resistors
   For example, the resistors R134A&B, R135A&B located on the diode printed circuit board (PCB) 652 (FIG. 14) is reconnected again.

A detailed description of each of these enhanced conductivity features or arrangement is set forth below.

1) Increase Wire Gauge

Figure 17:
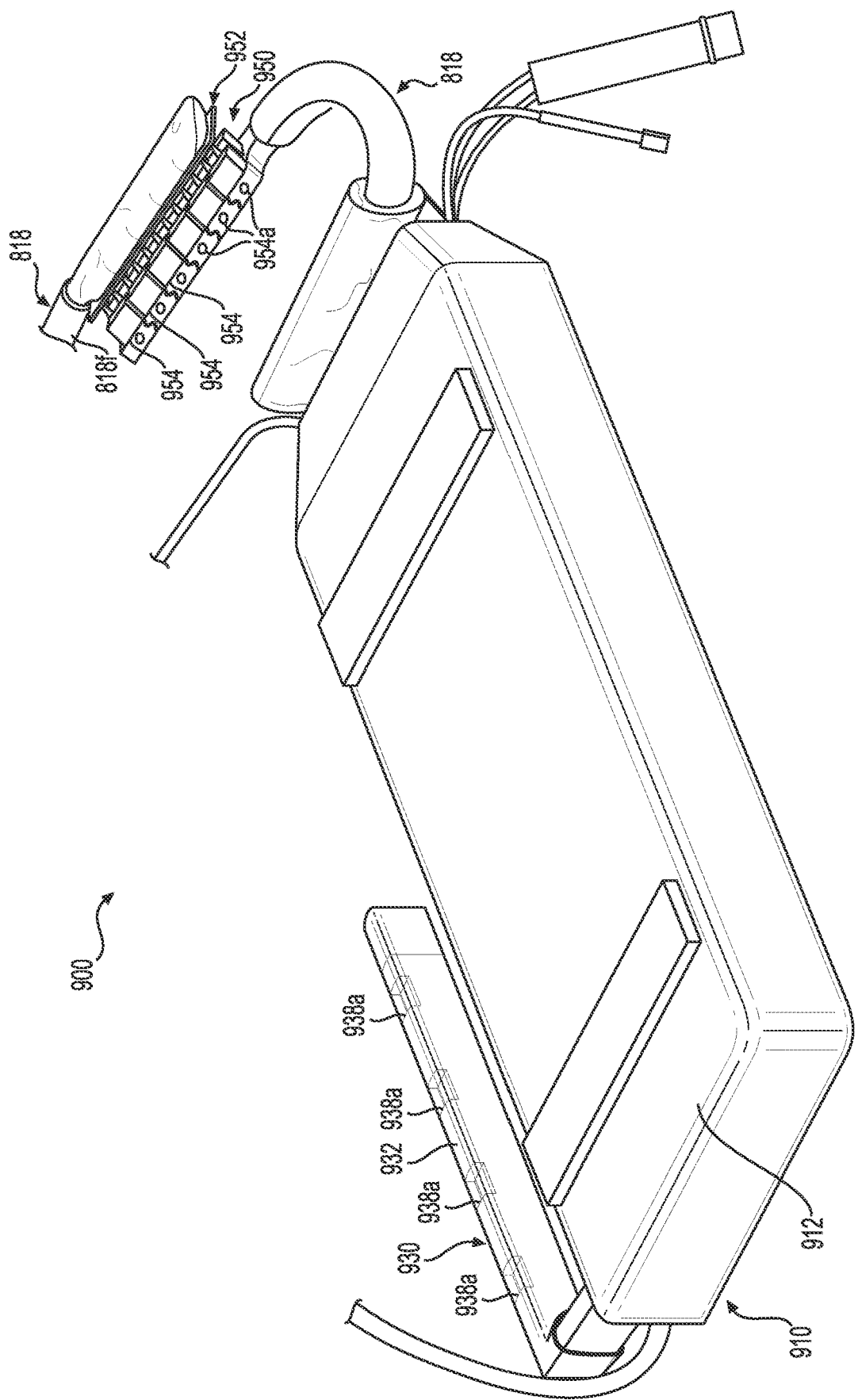
FIG. 17 is a front perspective view of another battery connector device for the battery jump starting device.
Figure 18:
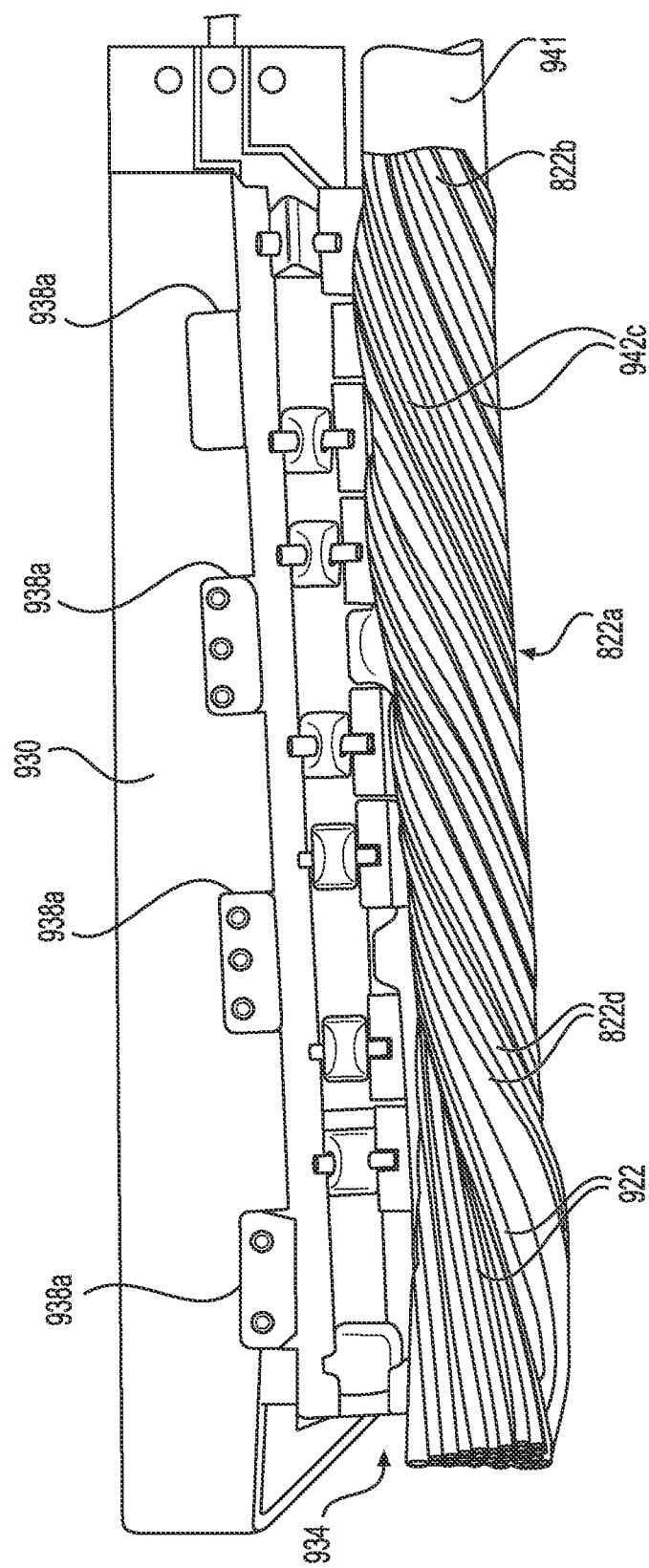
FIG. 18 is a detailed view of the positive cable connection with the relay printed circuit board prior to being soldered together.
Figure 19:
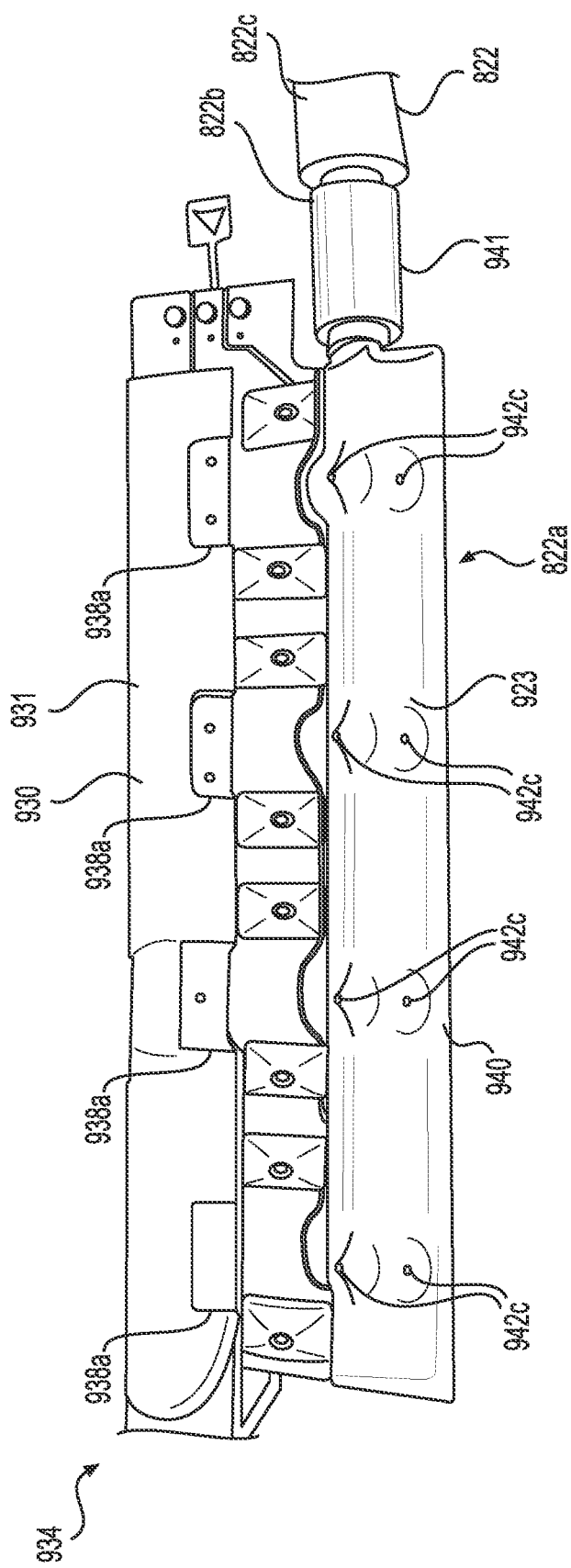
FIG. 19 is a detailed view of the positive cable connection with the relay printed circuit board after being soldered together.
Figure 20:
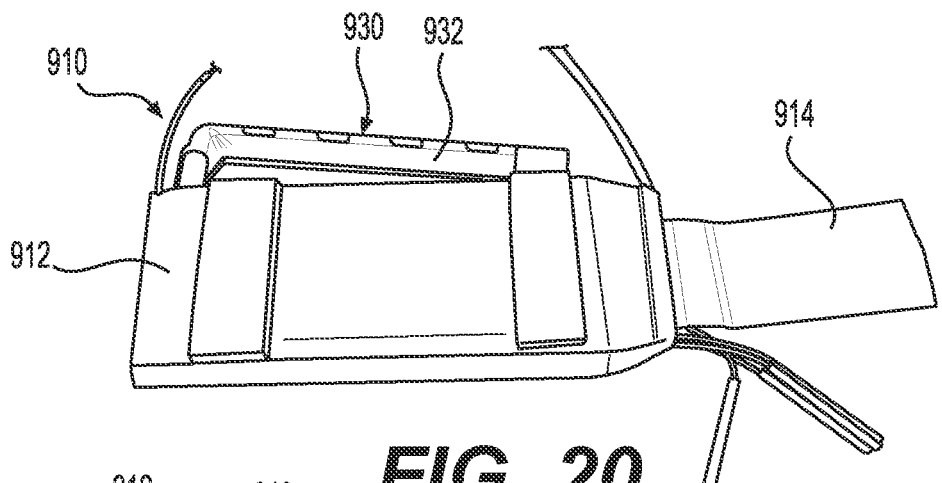
FIG. 20 is a front perspective view of the battery connector device shown in FIG. 17 prior to the connection with the positive cable and negative cable.
Figure 21:
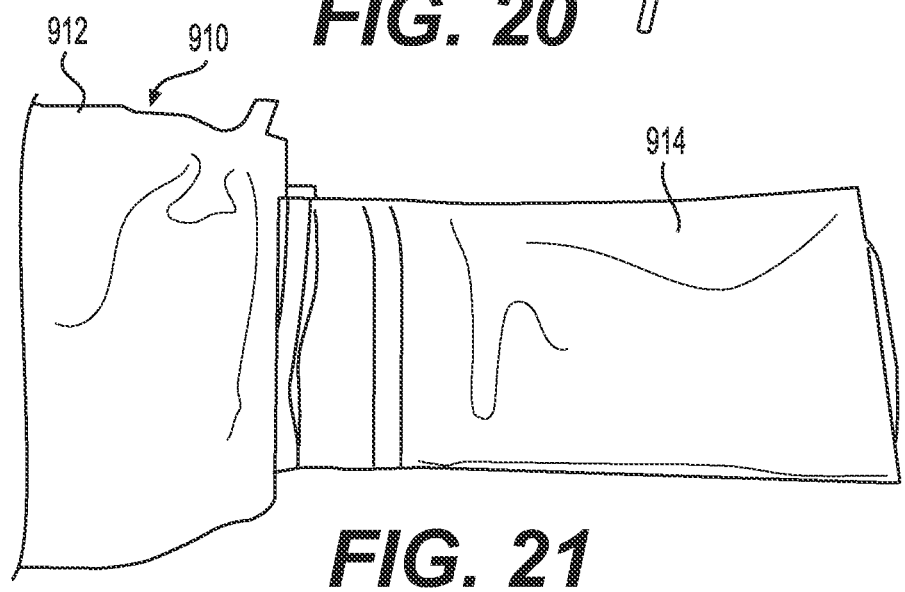
FIG. 21 is a partial top planar view of the battery assembly of the battery connector device shown in FIG. 20 showing the positive terminal conductor sheet in an unwound condition.
Figure 22:
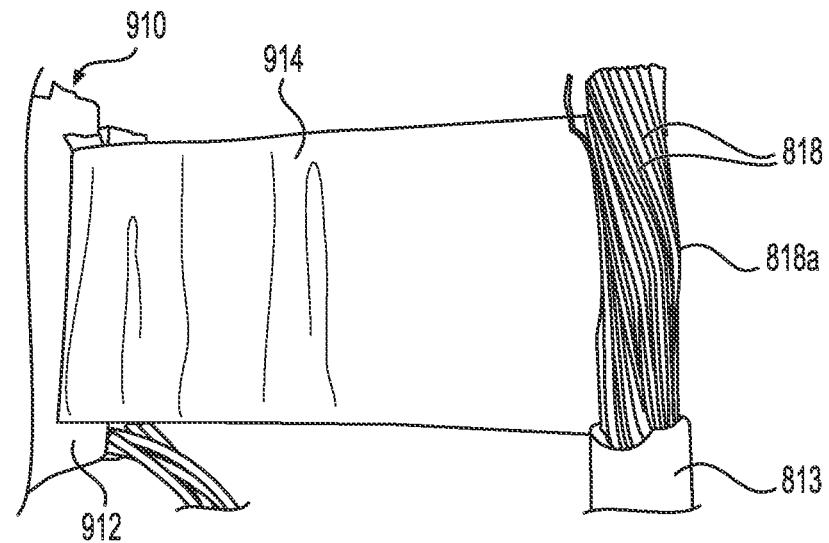
FIG. 22 is an end perspective view showing the positive terminal conductor shown in FIG. 21 with the conductor end of the positive cable positioned on the positive terminal conductor just prior to winding the positive terminal conductor around the conductor end of the positive cable.
Figure 23:
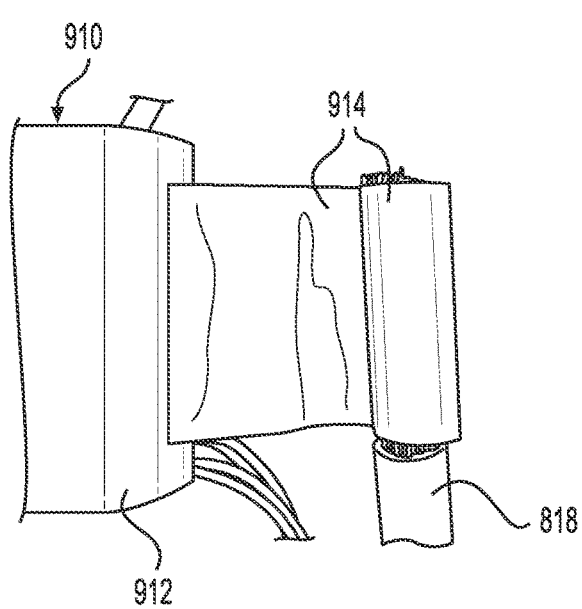
FIG. 23 is an end perspective view showing the positive terminal conductor shown in FIG. 22 partially wound around the conductor end of the positive cable.
Figure 24:
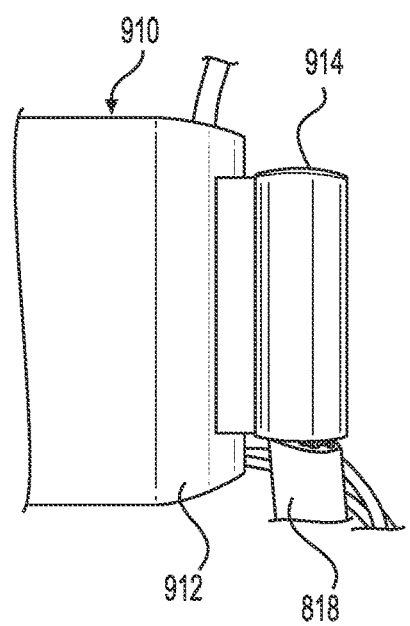
FIG. 24 is an end perspective view of the positive terminal conductor shown in FIG. 22 fully wound around the conductor end of the positive cable.
Figure 25:
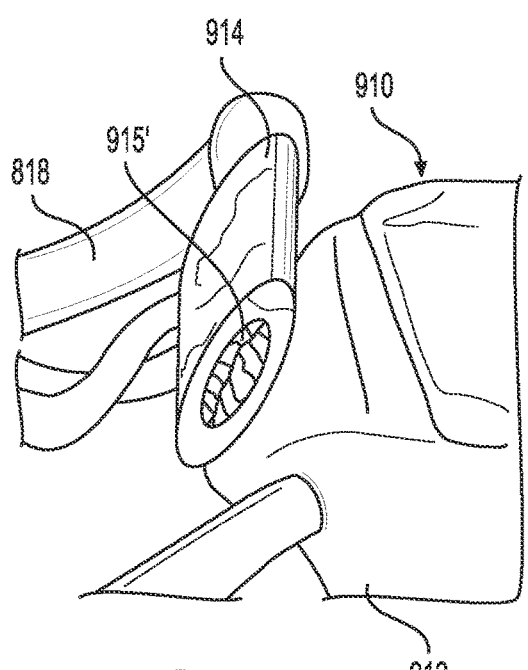
FIG. 25 is a side perspective view showing the positive terminal conductor fully wound around and soldered to the conductor end of the positive cable.
Figure 26:
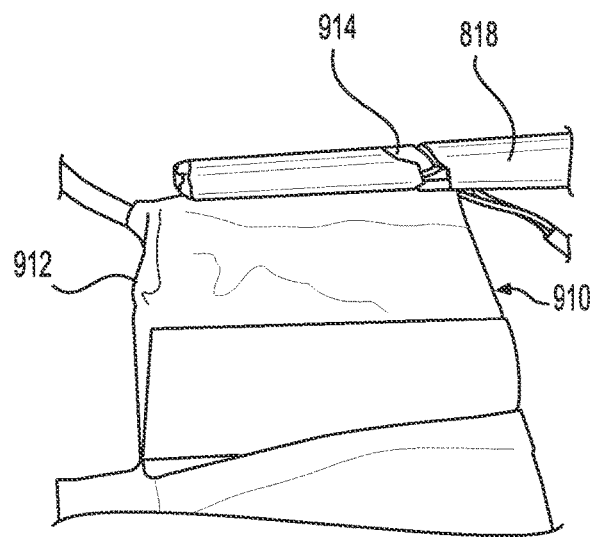
FIG. 26 is an opposite end perspective view of the positive terminal conductor fully wound around and soldered to the end of the positive cable.

The gauge of the positive cable 518 and negative cable 522 (FIG. 13), for example, can be increased from 4AWG (American Wire Gage) cable to a 2AWG cable for positive cable 818 and negative cable 822 (FIGS. 17-19). The comparative 30 specifications of the 4AWG cable and 2AWG cable are as follows:

|  | 2AWG | 4AWG |
| --- | --- | --- |
| Diameter | 0.2576 in | 0.2294 in |
|  | (6.544 mm) | (5.189 mm) |
| Turns of wire | 3.88/in | 4.89/in |
|  | (1.53/cm) | (1.93/cm) |
| Area | 66.4 kcmil | 41.7 kcmil |
|  | (33.6 mm²) | (21.2 mm²) |
| Resistance/length | 0.5127 mΩ/m | 0.8152 mΩ/m |
|  | (0.1563 mΩ/ft) | (0.2485 mΩ/m) |
| Ampacity | 95 (60° C.) | 70 (60° C.) |
|  | 115 (75° C.) | 85 (75° C.) |
|  | 130 (90° C.) | 95 (90° C.) |
| Fusing current | 1.3 kA (10 s) | 946 A (10 s) |
|  | 10.2 kA (1 s) | 6.4 kA (1 s) |
|  | 57 kA (32 ms) | 36 kA (32 ms) |

The 2AWG cable provides a significant increase of conductivity (i.e. ampacity) compared to the 4AWG cable (i.e. approximately 36% increase).

2) Increase Conductivity of Negative Cable Connection

The negative cable 822 (FIG. 19) can be connected to the battery 912 (FIG. 17) in a manner to increase the conductivity (i.e. ampacity) between the battery 912 and negative cable 822. For example, the negative cable conductor end 822*a* can be directly connected (e.g. soldered) to the connector prongs 942*c* (FIG. 19) of the relays 942. Specifically, the negative cable conductor end 822*a* can extend across and directly connect to all relays 942 (e.g. like relays 642) of the smart switch battery interface 934 (FIGS. 18 and 19). Further, the negative cable conductor end 822*a* can be connected to the conductor loop 941 (FIG. 19) of the circuit board conductor bar 940.

The negative cable 822, for example, can be made of stranded wire comprising an inner electrical wire conductor composed of an untwisted or twisted bundle of wires disposed within an outer electrical insulating sheath. The electrical insulating sheath of the negative cable 822 can be removed from the negative cable end exposing the inner conductor end 822*a*.

The exposed bundle of wires 822*d* (FIG. 18) of the inner conductor 822*a* can be forced over the ends of the exposed connector pins 942*c* of the relays 942 so that strands of wires 822*d* are captured between the adjacent connector pins 942*c*. The exposed bundles of wires 832*d* can be further forced into contact with the conductor bar 940 (e.g. made of copper). Solder 923 is applied to this assembly so that the solder flows between the exposed bundles of wires 922*d* to the connector pins 942*c* and the conductor bar 940 to complete the electrical connection between the negative cable 322 and the smart switch battery interface 934 connected to the battery 912.

The length of the exposed bundle of wires 822*d* is selected so that exposed bundle of wires 822*d* directly connects with each set of connector pins 942*c* of each and every relay 942 to provide the maximum electrical conductivity (i.e. maximum ampacity) between the negative cable 822 and the battery 912.

3) Increase Conductivity of Positive Cable Connection

The positive cable 818 can be connected to the battery 912 in a manner to increase the conductivity (i.e. ampacity) between the battery 912 and positive cable 818. For example, the positive cable 818 can be rolled up in the positive battery tab 914 of the battery 912 and soldered together thoroughly. The steps for connection between the positive cable 818 and the positive battery tab 914 of the battery 912 is shown in FIGS. 22-26.

The positive cable 818, for example, can be made of stranded wire comprising an inner electrical wire conductor composed of an untwisted or twisted bundle of wires disposed within an outer electrical insulating sheath. The electrical insulating sheath of the positive cable 818 can be removed from the positive cable conductor end 818*a* exposing the inner conductor end 818*a*.

The battery 912 is provided with a positive battery tab 914. The positive battery tab 914 is a metal sheet (e.g. copper sheet) connected to the positive terminal tab 914 of the battery 912.

The exposed bundle of wires 818*d* of the inner electrical conductor 818*b* can be soldered with tin, and then rolled up within the positive battery tab 812*a*. Solder 915 (FIG. 25) is applied to the exposed bundle of wires 818*d* and the positive battery tab 812*a*.

The length of the exposed bundle of wires of the positive cable conductor end 818*a* is selected so that exposed bundle of wires directly connects with the full width of the positive battery tab 914 to provide the maximum electrical conductivity (i.e. maximum ampacity) between the battery 712 and the positive cable 718.

4) Increase Conductivity of Diode Connection

Figure 27:
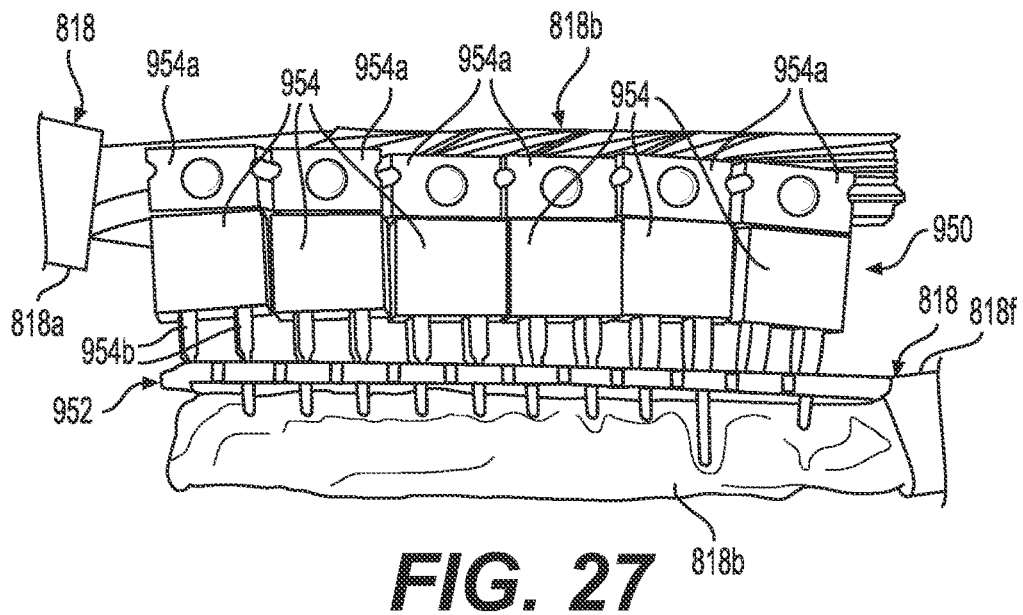
FIG. 27 is a perspective view of the diode connector installed between overlapping sections of the positive cable.
Figure 28:
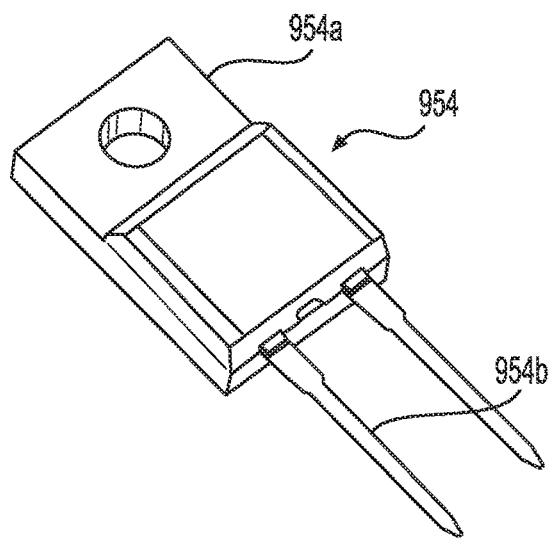
FIG. 28 is a perspective view of a Schottky diode used in the diode connector.
Figure 29:
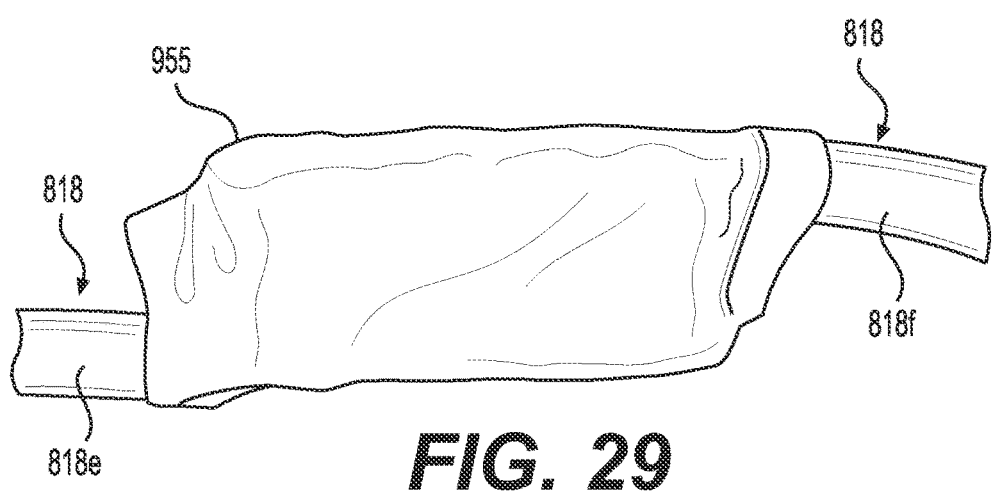
FIG. 29 is a perspective view of the diode connector insulated with a shrink wrap sleeve.

The positive cable 818 can be provided with a diode connection 950 configured to increase the conductivity along the positive cable 818, as shown in FIGS. 27-29.

The diode connection 950 comprises a plurality of diodes 954 connected between positive cable sections 818*a* and 818*f* (FIG. 29). For example, the diode connection 950 comprises six (6) back-charge type diodes (e.g. Schottky barrier diodes).

The diodes 954 are soldered between the positive cable conductor ends 818*b* and 818*b*. Specifically, the diode conductor tabs 954a are soldered to the upper positive cable conductor end 818b and the diode conductor prongs 954b are soldered to the positive cable conductor end 818b. More specifically, the diode conductor prongs 954b of the diodes 954 extend through the diode circuit board 952, extend into the bundle of wires of the lower positive cable conductor end 818b, and then are soldered in place completing assembly of the diode connection 950.

The diode connection 950 is then insulated, for example, using a shrink wrap insulator 955 (FIG. 29), which is applied around the diode connection 950, and then shrunk by applying heat (e.g. using heat gun).

5) Redesigned Resistor/Diode Printed Circuit Board (PCB)
   For example, the resistor/diode PCB are redesigned to eliminate the diodes extending therefrom;
6) Reconnected Resistors
   For example, the resistors R134A&B, R135A&B that are on the Resistor/Diode printed circuit board (PCB) 952 are reconnected to be connected again.

Test #1

Figure 30:
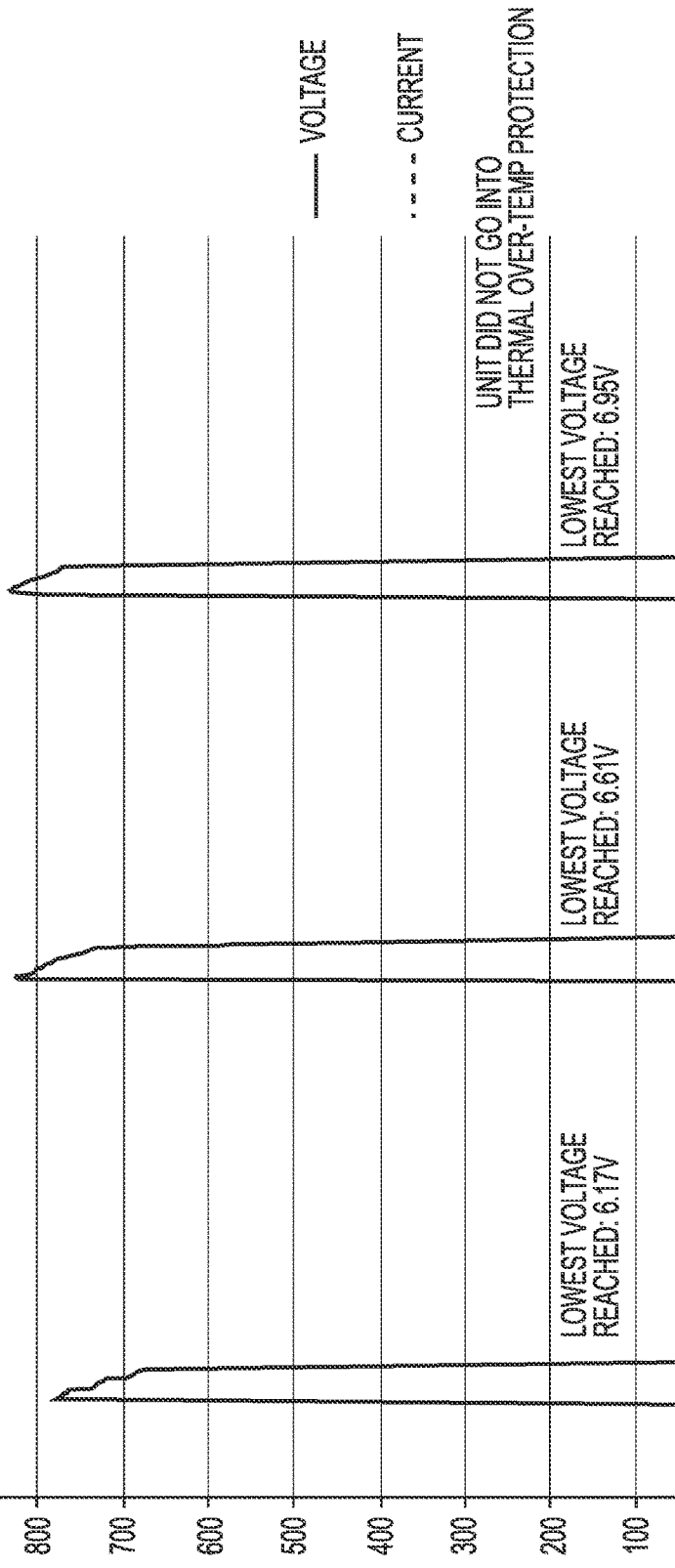
FIG. 30 is a graphical illustration showing a load test of the battery connection shown in FIGS. 9-14.

The battery connection device 600 shown in FIG. 13 was subjected to a 1250A Load Test. The results are shown in FIG. 30, and as follows:

| Pulse #1 | Average Power of 4799.01 W |
| Pulse #2 | Average Power of 5528.99 W |
| Pulse #3 | Average Power of 6101.63 W |

Test #2

Figure 31:
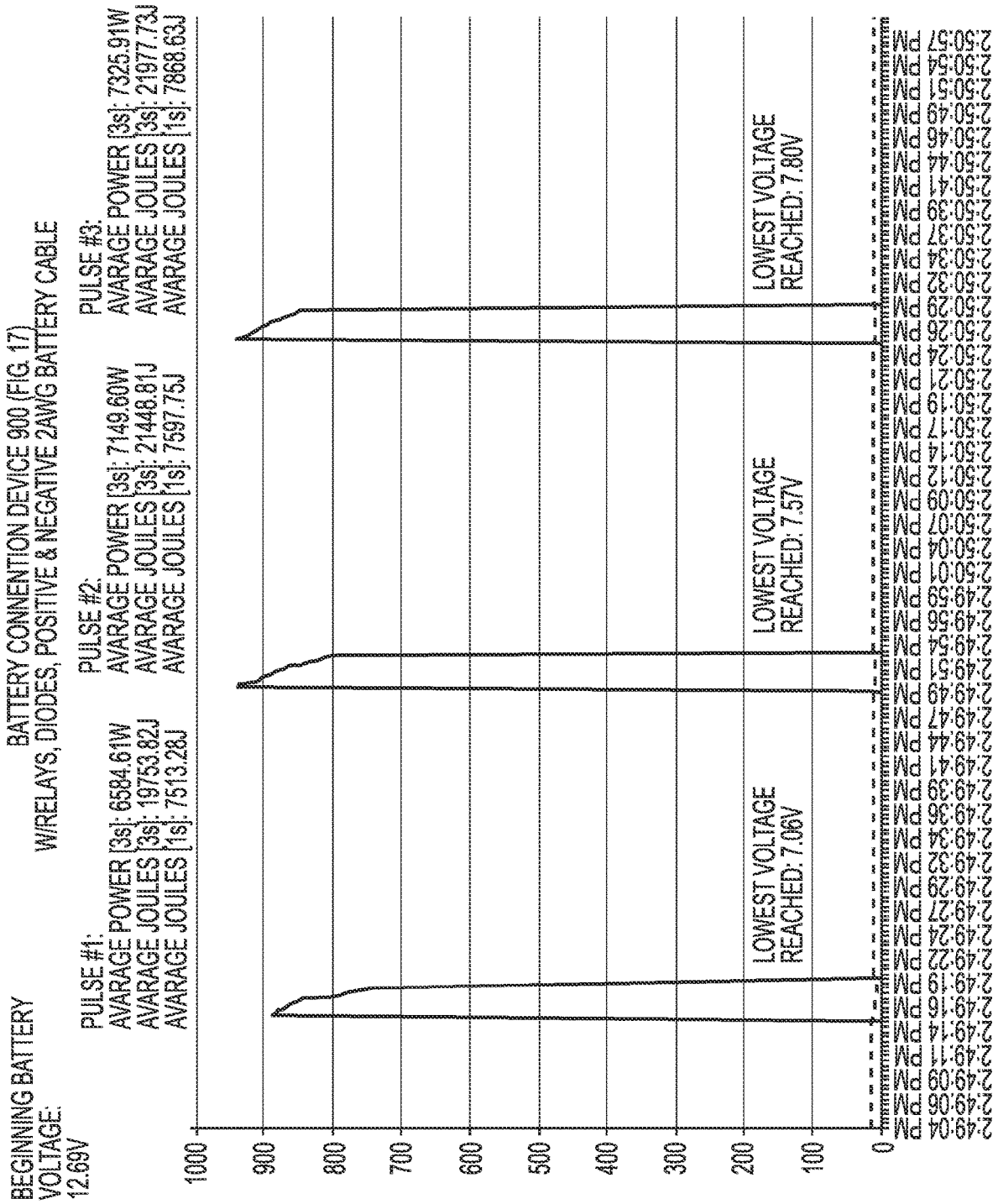
FIG. 31 is a graphical illustration showing a load test of the battery connection shown in FIGS. 17-29.
Figure 32:
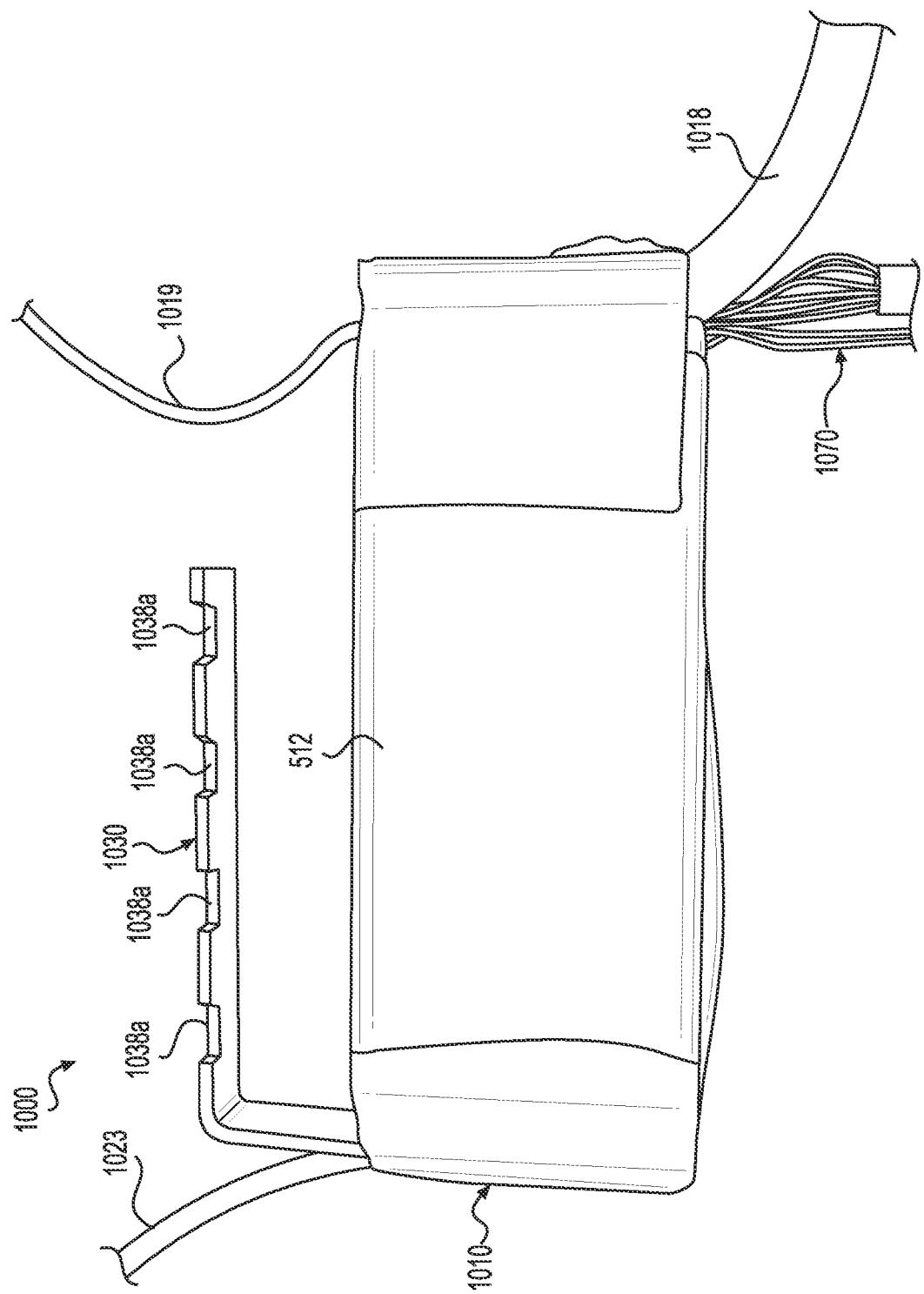
FIG. 32 is a front view of a further battery connector device for the battery jump starting device.

The battery connection device 900 shown in FIG. 17 was subjected to a 1250A Load Test. The results are shown in FIG. 31, and as follows:

| Pulse #1 | Average Power of 6584.61 W |
| Pulse #2 | Average Power of 7149.60 W |
| Pulse #3 | Average Power of 7325.91 W |

These test results show a significant increase of approximately twenty percent (20%) for peak power for TEST #2 compared to the results of TEST #1.

Another enhanced conductivity battery conductor device 1000 is shown in FIGS. 32-41. The enhanced conductivity battery connector device 1000 provides a significantly increased conductivity compared to the battery connector device 600 shown in FIGS. 9-14.

The battery conductor device 1000 comprises the battery assembly 1010, including the battery 1012 connected to the positive cable 1018 and the negative terminal conductor plate 1030. A positive wire 1019 is connected directly or indirectly to the positive tab or positive cable 1018 of the battery 1012, and a negative wire 1023 is connected directly or indirectly to the negative tab or negative terminal conductor plate 1030. The battery conductor device 1000 can further include a bundle of wires 1070 connected to or associated with the operation of the battery 1012 (e.g. battery temperature sensor, power supply, etc.).

The battery 1012 can comprise a single battery cell 1012c (FIG. 34), or multiple battery cells 1012c connected end-to-end in series. For example, three (3) separate battery cells 1012c have respective tabs 512d to be connected together (FIG. 33).

The battery cells 1012c each have respective positive and negative tabs 1012d located at opposite ends of each battery cell 1012c. The battery cells 1012c are connected together in series by welding (e.g. sonically and/or thermally welding) and/or soldering respective positive and negative tabs 1012d together. For example, the tabs 1012d are positioned so as to overlap each other (e.g. edges overlapping opposite tab 1012d, or edge-to-edge).

Figure 34:
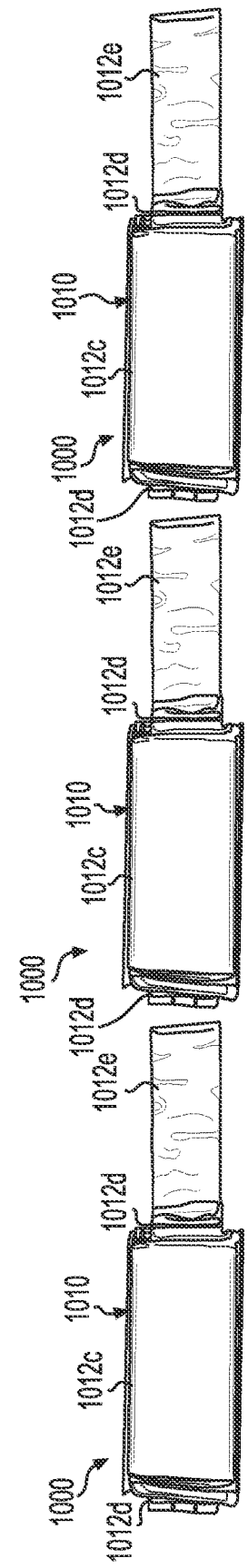
FIG. 34 is a planar view of the battery connector device comprising battery cells being prepared with separate tabs for lengthening the tabs.

The tabs 1012d are metal plates (e.g. relative thin metal foils) extending outwardly from the body and opposite edges of each battery cell 1012c. As shown in FIG. 34, the positive and negative tabs 1012d extend along opposite edges along the width dimension of each battery cell 1012c. The positive and negative tabs 1012d are each centered and extend most of the width dimension of each opposite edge of each battery cell 1012c.

Figure 33:
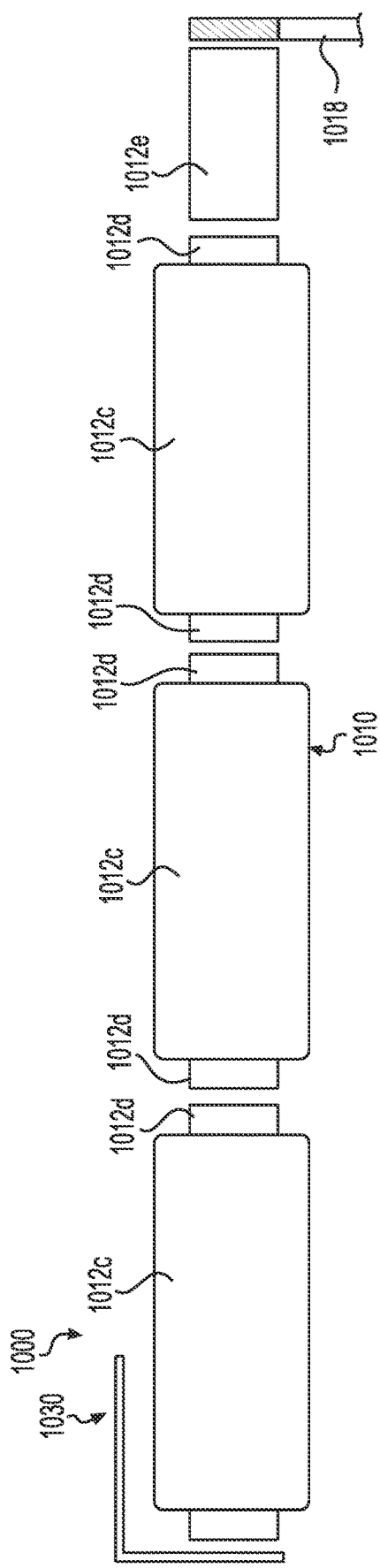
FIG. 33 is a planar view of the battery connector device comprising a plurality of battery cells having separate tab and conductors (e.g. plate conductors) prior to assembly.

As shown in FIG. 33, a separate tab 1012e is added or connected to the right side of the battery cell 1012c (i.e. battery cell on right side in FIG. 33) to extend the length of the tab 1012d. The separate tab 1012e is shown as having the same width dimension as the tab 1012d; however, this width can be different. To assemble the separate tab 1012e to the tab 1012d, for example, the separate tab 1012e is positioned to overlap over the tab 1012d, and then welded (e.g. sonically and/or thermally welded) and/or soldered together.

Figure 35:
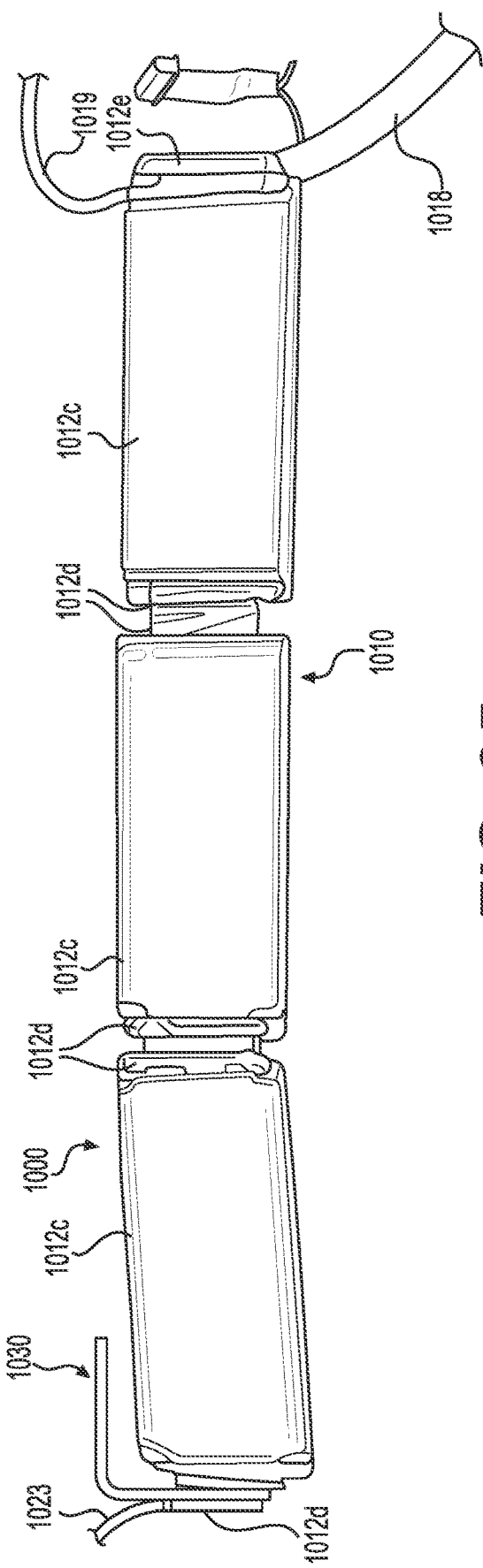
FIG. 35 is a front view of the battery connector device comprising the plurality of battery cells having separate tab and conductors shown in FIG. 33, after assembly.
Figure 37:
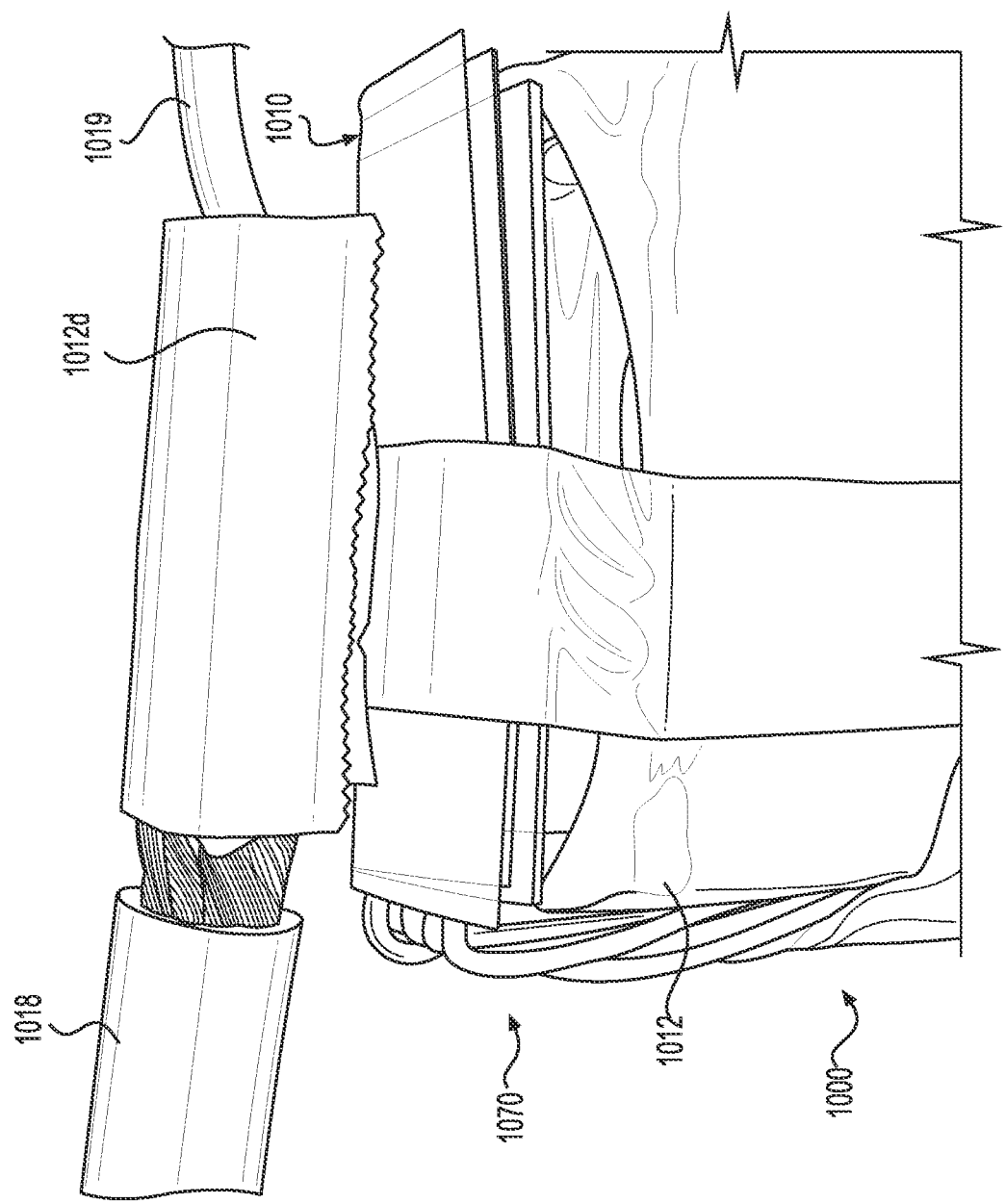
FIG. 37 is an end perspective view of the battery connector device showing the separate tab wrapped or wound around an exposed conductor end of the positive cable, and soldered together.

The exposed conductor end of the positive cable 1018 is then wound up inside the separate tab, as shown in FIGS. 35 and 37. For example, the initially flat separate tab 1012e is wrapped around the exposed conductor end of the positive cable 1018, and then connected to the exposed end by welding (e.g. sonically and/or thermally welding) and/or soldering. For example, a layer of solder is applied to one or both sides of the separate tab 1012e, and then after wrapping the separate tab 1012e around the exposed end of the positive wire 1018, the assembly is heated to melt the layered solder and solder the assembly together.

Figure 36:
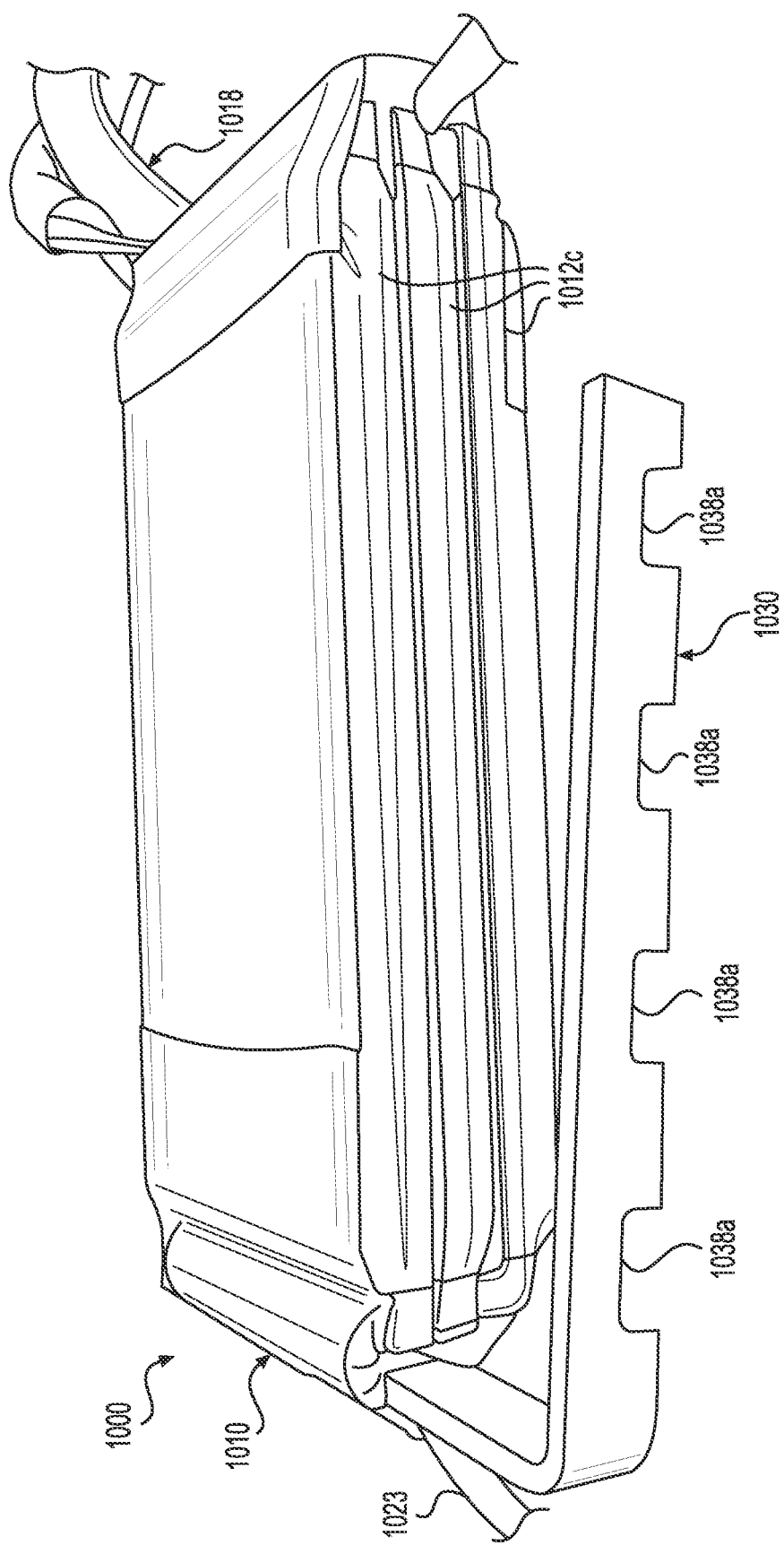
FIG. 36 is a elevational view of the battery connector device comprising the battery cell assembly shown in FIG. 35, after folding the battery cells on top of each other.

The three (3) battery cells 1012c once connected together are then folded over each other into the layered battery cell arrangement shown in FIG. 36. The layered battery cell arrangement can be packaged (e.g. the three (3) battery cells can be taped or shrink wrapped together), or placed within a battery cover or casing 1012, as shown in FIG. 38.

Figure 38:
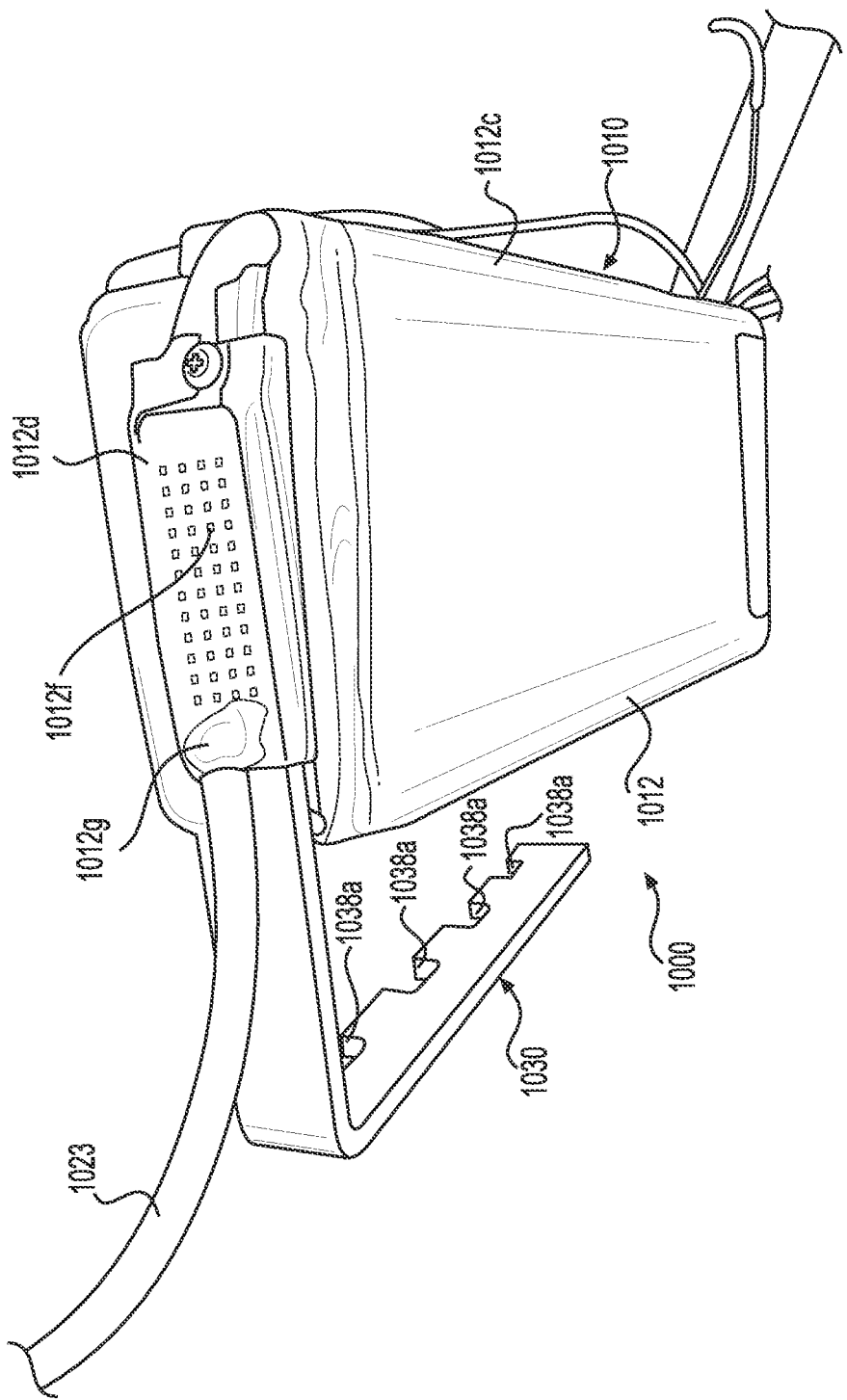
FIG. 38 is an opposite end perspective view of the battery connector device showing a negative battery tab wrapped or wound around the negative terminal conductor plate and welded and/or soldered together.
Figure 39:
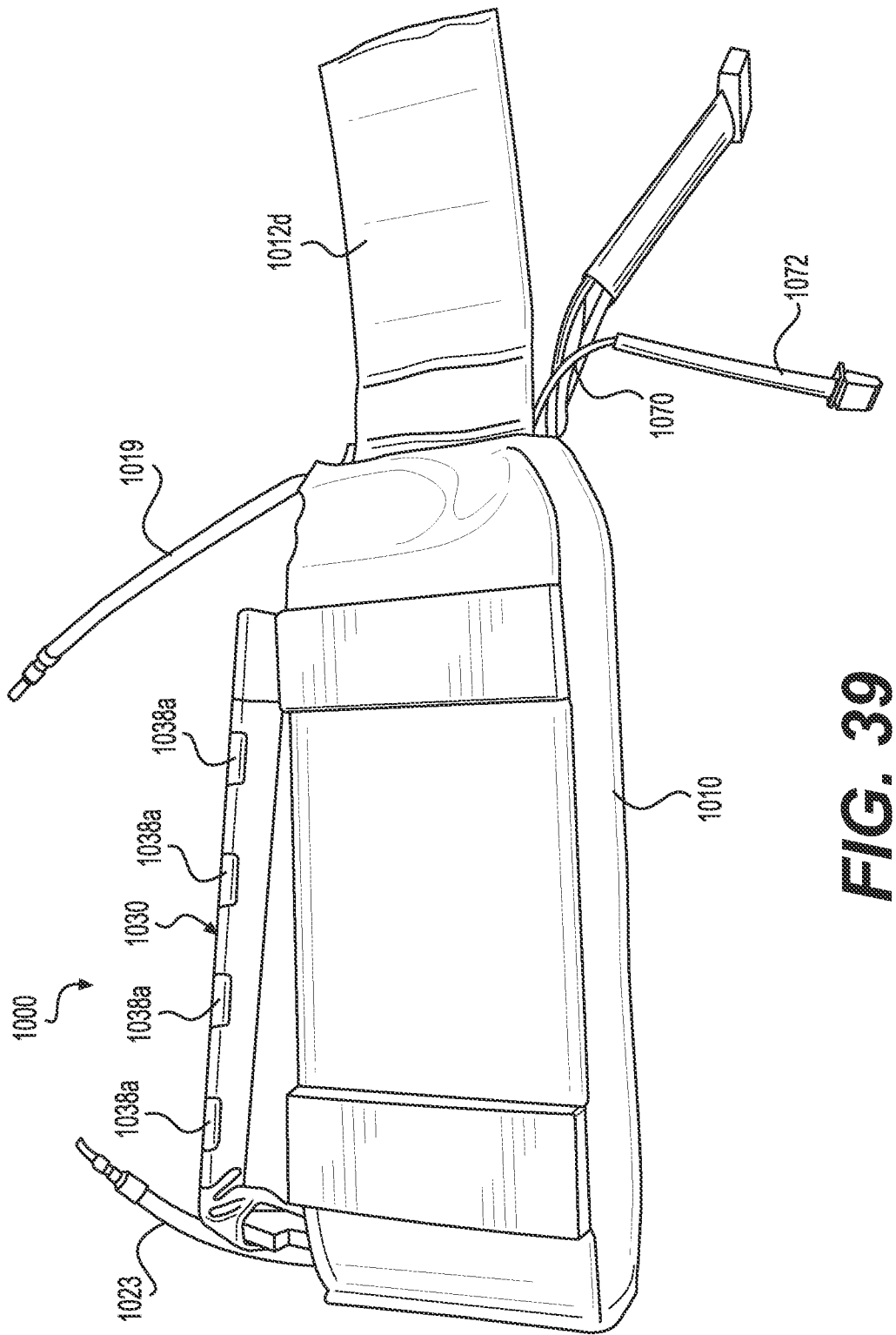
FIG. 39 is a perspective view of the battery connector device showing the flat separate tab connected to the positive battery tab and extending outwardly prior to connection with the conductive end of the positive cable.

As shown in FIG. 38, the negative tab 1012d can be attached to the negative terminal conductor plate 1030. For example, the negative tab 1012d can be wrapped partially or fully, as shown, around the negative terminal conductor plate 1030. The negative tab 1012d can be provided with a plurality of through holes 1012f to facilitate welding and/or soldering the negative tab 1012d to the negative terminal conductor plate 1030. For example, the through holes 1012f can be square-shaped through holes arranged into a matrix, as shown in FIG. 39. The negative wire 1023 is shown connected (e.g. soldered) to the negative tab 1012d.

Another separate tab 1012e (see FIG. 33) can be connected to the negative tab 1012d to lengthen the negative tab 1012d, so that the lengthened negative tab can be wrapped or wound around the negative terminal conductor plate 1030 more than one time (e.g. 2, 3, 4, or more times). In this manner, the electrical connection between the negative tab 1012d and the negative terminal conductor plate 1030 can be enhanced. The separate tab 1012e can be provided with a layer of solder on one or both sides, so that after the separate tab 1012e is wrapped or wound around the negative terminal conductor plate 1030, this assembly can be heated up to solder the separate tab 1012e onto the negative terminal conductor plate 1030.

Figure 40:
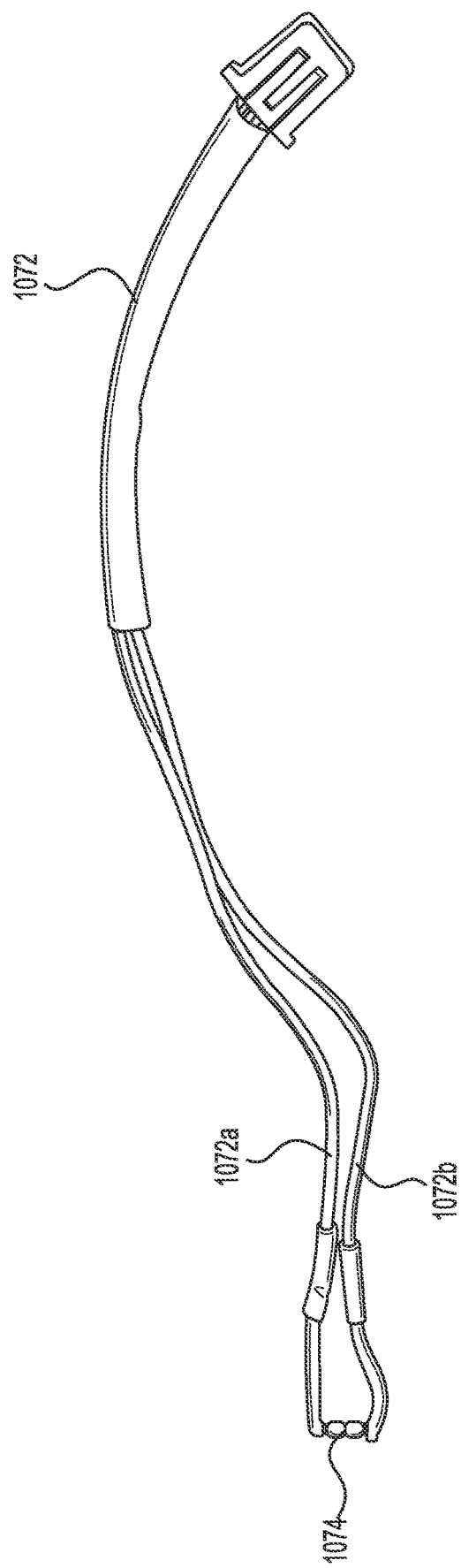
FIG. 40 is a side view of the temperature sensor assembly with wires and connector.

The completed assembly of the battery conductor device 1000 with the connected separate positive tab 1012e ready to be wrapped or wound an exposed conductor end of the positive cable 1018 (FIG. 32) can be seen in FIG. 39. The bundle of wires 1070 shown in FIG. 39, includes wires 1072 for a temperature sensor embedded within the battery 1012 (e.g. temperature sensor located near battery tab or between battery cells.). The temperature sensor 1074 connected between two (2) wires 1072a and 1072b is shown in FIG. 40.

Figure 41:
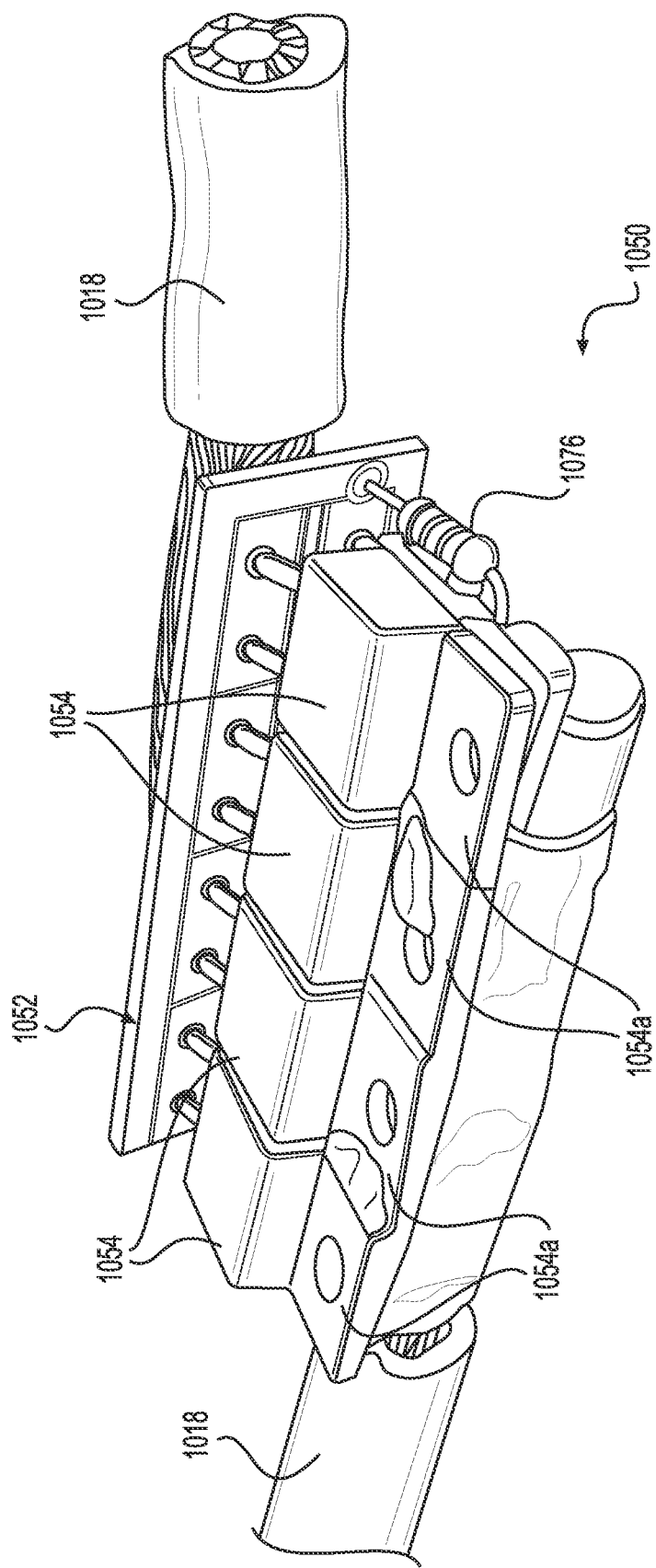
FIG. 41 is a perspective view of the diode circuit board assembled or connected or spliced inline into the positive cable.

The battery conductor device 1000 can be connected to the positive cable 1018 provided with a diode connector 1050 connected inline or splice into the positive cable 1018, as shown in FIG. 41.

The diode connector 1050 comprises a diode circuit board 1052 having a plurality of diodes 1054 assembled thereon. The diodes 1054 each have a diode conductor tab 1054a connected (e.g. soldered) to an exposed conductor end of the positive cable 1018. The prongs of the diodes 1054 extend through holes in the diode circuit board 1052, and are soldered to both the conductive traces and the exposed conductor end of the positive cable 1018 along with a resistor 1076 to complete the assembly.

The invention having been thus described, it will be apparent to those skilled in the art that the same may be varied in many ways without departing from the spirit or scope of the invention. Any and all such variations are intended to be encompassed within the scope of the following claims.

What is claimed is:

1. A jump starting apparatus configured for boosting or charging a depleted or discharged battery having a positive polarity battery terminal and a negative polarity battery terminal, the jump starting apparatus comprising:
    a rechargeable battery;
    an output port;
    a battery cable assembly comprising:
        a positive battery cable having a positive polarity battery terminal connector for connecting the jump starting apparatus to the positive polarity battery terminal of the depleted or discharged battery,
        a negative battery cable having a negative polarity battery terminal connector for connecting the jump starting apparatus to the negative polarity battery terminal of the depleted or discharged battery, and
        a plug connector coupled to the positive battery cable and the negative battery cable, the plug connector configured to plug into the output port, wherein the output port and the plug connector are dimensioned so that the plug connector will fit into the output port only in one specific orientation; and
    a safety control system or circuit configured for detecting when the jump starting apparatus is properly connected to the depleted or discharged battery and then switching on power from the rechargeable battery to the depleted or discharged battery only when the jump starting apparatus is properly connected to the depleted or discharged battery.

2. The apparatus according to claim 1, further comprising a USB output connector configured for electrically connecting the rechargeable battery of the jump starting apparatus to one or more external electronic devices.

3. The apparatus according to claim 2, further comprising a USB output circuit electrically connecting the rechargeable battery to the USB output connector.

4. The apparatus according to claim 3, wherein the USB output circuit is configured to down-convert a voltage of the rechargeable battery to a voltage at the USB output connector.

5. The apparatus according to claim 4, wherein an output voltage of the rechargeable battery is 12.4 VDC and the down-converted input and output voltage of the USB output connector is 5V.

6. The apparatus according to claim 1, wherein the jump starting apparatus is properly connected to the depleted or discharged battery when the positive and negative polarity battery terminal connectors are connected with proper polarity to the positive and negative polarity battery terminals of the depleted or discharged battery.

7. The apparatus according to claim 1, wherein the jump starting apparatus is properly connected to the positive and negative polarity battery terminals of the depleted or discharged battery when the positive and negative polarity battery terminal connectors are physically and electrically connected and connected with proper polarity to the positive and negative polarity battery terminals of the depleted or discharged battery.

8. The apparatus according to claim 1, wherein the safety control system or circuit comprises a microcontroller.

9. The apparatus according to claim 8, wherein the safety control system or circuit further comprises one or more sensors connected to the microcontroller configured for determining whether the depleted or discharged battery is properly connected to the jump starting apparatus prior to connecting power from the rechargeable battery to the depleted or discharged battery.

10. The apparatus according to claim 9, wherein the one or more sensors connected to the microcontroller are configured to determine whether the depleted or discharged battery has a proper polarity connection with the jump starting apparatus prior to connecting power from the rechargeable battery to the depleted or discharged battery.

11. The apparatus according to claim 10, wherein the one or more sensors is two or more separate sensors connected to the microcontroller.

12. The apparatus according to claim 11, wherein the two or more sensors include a presence sensor to determine whether the depleted or discharged battery is electrically connected between the positive and negative polarity battery terminal connectors and a reverse polarity sensor to determine whether the depleted or discharged battery has proper polarity connection with the positive and negative polarity battery terminal connectors.

13. The apparatus of claim 1, wherein the rechargeable battery is a lithium ion battery.

14. The apparatus of claim 1, further comprising a plurality of power diodes coupled between the positive or negative battery terminal connector and the rechargeable battery to prevent back-charging of the rechargeable battery from the depleted or discharged battery or an electrical system connected to the depleted or discharged battery.

15. The apparatus of claim 1, further comprising a temperature sensor configured to detect temperature of the rechargeable battery and to provide a temperature signal to the safety control system or circuit.

16. The apparatus of claim 1, further comprising a voltage measurement circuit configured to measure output voltage of the rechargeable battery and to provide a voltage measurement signal to the safety control system or circuit.

17. The apparatus of claim 1, further comprising a voltage regulator configured to convert output voltage of the rechargeable battery to a voltage level appropriate to provide operating power internal components of the jump starting apparatus.

18. The apparatus of claim 1, further comprising a flashlight circuit configured to provide a source of light to a user.

19. The apparatus of claim 18, wherein the source of light is at least one LED.

20. The apparatus of claim 19, wherein the safety control system or circuit is configured to control the at least one LED to provide a visual alarm indicating an emergency situation.

21. The apparatus of claim 1, further comprising a plurality of visual indicators configured to display remaining capacity status of the rechargeable battery.

22. The apparatus of claim 21, wherein the plurality of visual indicators comprises a plurality of LEDs providing output light of different colors.

23. The apparatus of claim 1, further comprising a visual indicator configured to warn a user when the depleted or discharged battery is connected to the jump starting apparatus with reverse polarity.

24. The apparatus of claim 1, further comprising separate visual indicators configured to display a power-on status of the jump starting apparatus, and a jump start boost power status of power supplied to an output device.

25. The apparatus of claim 1, further comprising a manual override switch configured to activate a manual override mode to enable a user to connect jump start power to an output port when the safety control system or circuit is unable to detect presence of a vehicle battery.

26. The apparatus of claim 25, wherein the safety control system or circuit is configured to detect actuation of the manual override switch for at least a predetermined period of time before activation of the manual override mode.

27. The apparatus according to claim 3, further comprising a USB output control circuit connected to a microcontroller, the USB output control circuit is configured to allow the USB output to be turned on and off by software control to prevent the internal lithium battery from getting too low in capacity.

28. The apparatus according to claim 27, wherein the USB output connector includes a voltage divider for enabling charge to certain electronic devices.

29. The apparatus according to claim 1, including an operation indicator LED to provide visual indication of the power supply capacity status.

30. The apparatus according to claim 1, including an operation indicator LED to provide visual indication of a switch activation status indicating power is being provided to the depleted or discharged battery.

31. The apparatus according to claim 1, wherein the rechargeable battery is a lithium ion battery having a positive tab and a negative tab.

32. The apparatus according to claim 31, further comprising a positive electrical conductor connecting the positive tab of the lithium ion battery to a positive battery cable and/or a negative electrical conductor connecting the negative tab of the lithium ion battery to a negative battery cable.

33. The apparatus according to claim 32, wherein the positive tab of the lithium ion battery is at least partially wrapped around and connected to a positive battery cable of the jump starting apparatus.

34. The apparatus according to claim 33, wherein a separate tab is connected to the positive tab to extend a length of the positive tab.

35. The apparatus according to claim 34, wherein the positive electrical conductor is a positive conductive bar, and the at least one negative electrical conductor is negative conductive bar.

36. The apparatus according to claim 35, wherein one end of the positive electrical connector at least partially wraps around and connected to an exposed end of a positive battery cable.

37. The apparatus according to claim 1, wherein the safety control system or circuit comprises a switch used for switching on the power from the rechargeable battery.

38. The apparatus according to claim 37, wherein the switch is an electronic switch.

39. The apparatus according to claim 38, wherein the safety control system or circuit further comprises a microcontroller configured for controlling the electronic switch.

40. The apparatus according to claim 39, wherein the safety control system or circuit further comprises one or more electronic sensors configured for providing input signals to the microcontroller.

41. The apparatus according to claim 40, wherein the one or more electronic sensors comprising a battery presence sensor and a reverse polarity sensor.

* * * * *